United States Patent
Chong et al.

(10) Patent No.: US 11,479,906 B2
(45) Date of Patent: Oct. 25, 2022

(54) PORTABLE TEXTILE TREATMENT DEVICE WITH IMAGE SENSOR AND THERMAL INSULATION MEANS

(71) Applicant: KONINKLIJKE PHILIPS N.V., Eindhoven (NL)

(72) Inventors: Wee Ann Chong, Singapore (SG); Yao Hean Chiah, Woodlands (SG); Mun Kong Soo, Singapore (SG); Victor Martinus Gerardus Van Acht, Veldhoven (NL); Rico Paolo Ochoa Ramirez, Singapore (SG); Palani Pandurangan, Singapore (SG); Boon Teck Tan, Singapore (SG); Luck Wee Png, Singapore (SG); Joo Pheng Toh, Singapore (SG); Prakash S S, Singapore (SG); Joldert Maria Boersma, Groningen (NL); Timotheus Johannes Maria Van Aken, Emmen (NL); Joris Pieter Oosterhuis, Eindhoven (NL); Antonius Johannes Joseph Wismans, Sevenum (NL); Thomas Petrus Hendricus Warmerdam, Veldhoven (NL); Arnoldus Johannes Martinus Jozeph Ras, Mierlo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/289,262

(22) PCT Filed: Jun. 10, 2020

(86) PCT No.: PCT/EP2020/066002
§ 371 (c)(1),
(2) Date: Apr. 28, 2021

(87) PCT Pub. No.: WO2020/254157
PCT Pub. Date: Dec. 24, 2020

(65) Prior Publication Data
US 2022/0145527 A1 May 12, 2022

(30) Foreign Application Priority Data

Jun. 17, 2019 (EP) .................................. 19180482

(51) Int. Cl.
*D06F 75/26* (2006.01)
*D06F 75/12* (2006.01)
(Continued)

(52) U.S. Cl.
CPC .............. *D06F 75/26* (2013.01); *D06F 73/00* (2013.01); *D06F 75/12* (2013.01); *D06F 75/18* (2013.01);
(Continued)

(58) Field of Classification Search
CPC .......... D06F 75/26; D06F 75/12; D06F 75/18; D06F 75/38; D06F 75/265; D06F 73/00; G06V 10/764; G05B 113/027
See application file for complete search history.

(56) References Cited

U.S. PATENT DOCUMENTS 4,980,981 A * 1/1991 Naidoo ................... D06F 69/00
38/144
5,345,060 A 9/1994 Hazan
(Continued)

FOREIGN PATENT DOCUMENTS

| CN | 106283584 | 1/2017 |
| DE | 102013210996 | 12/2014 |

(Continued)

OTHER PUBLICATIONS

International Search Report and Written Opinion dated Sep. 17, 2020 for International Application No. PCT/EP2020/066002 Filed Jun. 10, 2020.

*Primary Examiner* — Ismael Izaguirre
(74) *Attorney, Agent, or Firm* — Maschoff Brennan

(57) ABSTRACT

The invention relates to a portable textile treatment device comprising a heatable soleplate (4) intended to be in contact with a textile (TXT) for treating the textile. The heatable soleplate (4) comprises a soleplate opening (H). The device comprises a module (MD) comprising an image sensor (5)

(Continued)

for taking an image of the textile to be treated through the soleplate opening (H), and a control unit (8) configured for a) executing an algorithm stored in said portable textile treatment device, using the taken image as an input of the algorithm, to obtain a classification of the textile, and for b) controlling, based on the classification, at least one operating parameter of the portable textile treatment device. The module (MD) and the control unit (8) are integrated within the portable textile treatment device. The image sensor comprises an active surface sensitive to light which is oriented with respect to the surface of the heatable soleplate (4), with an absolute value of an orientation angle being in the range from 15 to 70 degrees. The portable textile treatment device further comprises thermal insulation means arranged in-between the heatable soleplate (4) and the module (MD) for insulating the module (MD) from heat dissipated by the heatable soleplate (4).

15 Claims, 36 Drawing Sheets

(51) Int. Cl.
*D06F 75/18* (2006.01)
*D06F 75/38* (2006.01)
*D06F 73/00* (2006.01)
*G05B 13/02* (2006.01)
*G06V 10/764* (2022.01)

(52) U.S. Cl.
CPC ........... *D06F 75/38* (2013.01); *G05B 13/027* (2013.01); *G06V 10/764* (2022.01)

(56) References Cited

U.S. PATENT DOCUMENTS

| | | | |
|---|---|---|---|
| 5,475,201 A | 12/1995 | Pike | |
| 5,642,578 A | 7/1997 | Hazan | |
| 9,879,373 B2* | 1/2018 | Janakiraman | D06F 75/26 |
| 9,945,066 B1* | 4/2018 | Mutton | D06F 75/26 |
| 2008/0313936 A1* | 12/2008 | Ho | D06F 75/38 38/81 |
| 2015/0218746 A1* | 8/2015 | Clowes | B23K 26/032 250/492.1 |
| 2016/0145794 A1 | 5/2016 | Janakiraman | |
| 2018/0030646 A1 | 2/2018 | Kumar | |
| 2018/0258580 A1* | 9/2018 | Vliyambath Krishnan | D06F 75/10 |

FOREIGN PATENT DOCUMENTS

| | | |
|---|---|---|
| EP | 2418317 | 2/2012 |
| EP | 3279392 | 2/2018 |
| KR | 20180137145 | 12/2018 |
| WO | 2004/009898 | 1/2004 |
| WO | 2012020352 | 2/2012 |
| WO | 2015185953 | 12/2015 |
| WO | 2016145794 | 9/2016 |

* cited by examiner

PORTABLE TEXTILE TREATMENT DEVICE WITH IMAGE SENSOR AND THERMAL INSULATION MEANS

CROSS REFERENCE TO RELATED APPLICATIONS

This application is the U.S. National Phase application under 35 U.S.C. § 371 of International Application No. PCT/EP2020/066002 filed Jun. 10, 2020, which claims the benefit of European Patent Application Number 19180482.2 filed Jun. 17, 2019. These applications are hereby incorporated by reference herein.

FIELD OF THE INVENTION

The invention relates to the field of garment care, in particular to a textile treatment device.

BACKGROUND OF THE INVENTION

It is known that ironing devices are provided with temperature sensors. The temperature sensors are used to control operation of the ironing device and to avoid damaging the textile (of the garments) due to inappropriate operating parameters. If the user uses the ironing device for treating different textiles, it is still necessary for the user to manually adjust at least one setting, such as the temperature of the soleplate of the ironing device, in order to achieve efficient treatment of the textile. For an optimal ironing result, the temperature should be at the maximum temperature that flattens the wrinkles but not damages the fabric. In order to omit manual control, it has been suggested to reduce the maximum temperature. The disadvantage of this approach is that the ironing of tougher materials, such as jeans and linen, require more time.

Usually, in order to determine the appropriate temperature setting, the user relies on care labels which are attached to the garments. This manual approach is not convenient for the user. Moreover, it has been shown that with years of use, these labels attached to garments often get lost leaving the user with no information regarding the kind of fabric or the required temperature for treating the textile.

US 2016/0145794 discloses an iron having an image sensor so that digital image processing enables a fabric type to be detected, and the iron settings to be controlled.

DE 10 2013 210 996 discloses a smartphone app by which an image of clothing is analysed to determined washing machine settings or garment treatment products to be used.

CN106283584A discloses an electric iron that comprises: an image acquisition unit configured to acquire images, a processor configured to obtain material information of articles to be ironed according to the acquired images and determine initial ironing parameters corresponding to the material information of articles to be ironed, and an ironing controller configured to control current ironing parameters of the electric iron according to the initial ironing parameters.

WO2004/009898A2 discloses an electric iron having a housing and a soleplate in which at least one outlet opening is provided, means for generating a fine liquid spray or foam or steam, and means for delivering said generated fine liquid spray or foam or steam through said outlet opening. The iron is provided with detection means for detecting the presence of a surface in the proximity of the soleplate and for generating a detection signal in response to said detection, and with control means for controlling the delivery of said fine liquid spray or foam or steam in response to said detection signal.

EP2418317A1 discloses an iron comprising a water reservoir configured to hold liquid water, a heatable soleplate including at least one water outlet opening, a water atomization and distribution means configured to atomize water from the water reservoir and to distribute the atomized water to the at least one water outlet opening, sensor means, configured to monitor at least one motion dependent variable of the iron and to generate a reference signal reflecting said variable, and control means operatively connected to both the water atomization and distribution means and the sensor means, and configured to control a water outflow rate of the at least one water outlet opening by controlling the operation of the water atomization and distribution means in dependence of the reference signal generated by the sensor means.

EP 3 279 392 A1 discloses an apparatus and method for cleaning a fabric.

OBJECT AND SUMMARY OF THE INVENTION

It is an object of the invention to propose an improved portable textile treatment device that avoids or mitigates the above-mentioned problems.

The invention is defined by the independent claims. The dependent claims define advantageous embodiments.
To this end, the invention proposes a portable textile treatment device comprising:
  a heatable soleplate intended to be in contact with a textile for treating the textile, said heatable soleplate comprising a soleplate opening,
  a module comprising an image sensor for taking an image of the textile to be treated through said soleplate opening.
The portable textile treatment device also comprises a control unit configured for:
  a) executing an algorithm stored in said portable textile treatment device, using the taken image as an input of said algorithm, to obtain a classification of the textile, and
  b) controlling, based on said classification, at least one operating parameter of the portable textile treatment device.
The module and the control unit are integrated within the portable textile treatment device.
The image sensor comprises an active surface sensitive to light which is oriented with respect to the surface of the heatable soleplate, with an absolute value of an orientation angle being in the range from 15 to 70 degrees.
The portable textile treatment device further comprises thermal insulation means arranged in-between said heatable soleplate and said module for insulating said module from heat dissipated by said by heatable soleplate.
The image capture is based on capture of an image from an angle to the textile surface, wherein the angle is in the range 15 to 70 degrees. Thus, rather than illuminating the textile perpendicularly from above and capturing an image from above, an angled arrangement is used. This is found to enable a better classification of the textile type, by partly imaging the textile from above (hence viewing the fabric pattern) as well as partly from the side (hence viewing a height profile of the fabric).

Considering the relative proximity of the module and the heatable soleplate which may reach temperature as high as 220 degree Celcius, the thermal insulation means prevent an over-heating of the module, and in particular an over-heating of the image sensor. The image sensor is thus kept below a safe working temperature, for example 70 degree Celcius, which prevents damaging it when the device is in use.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
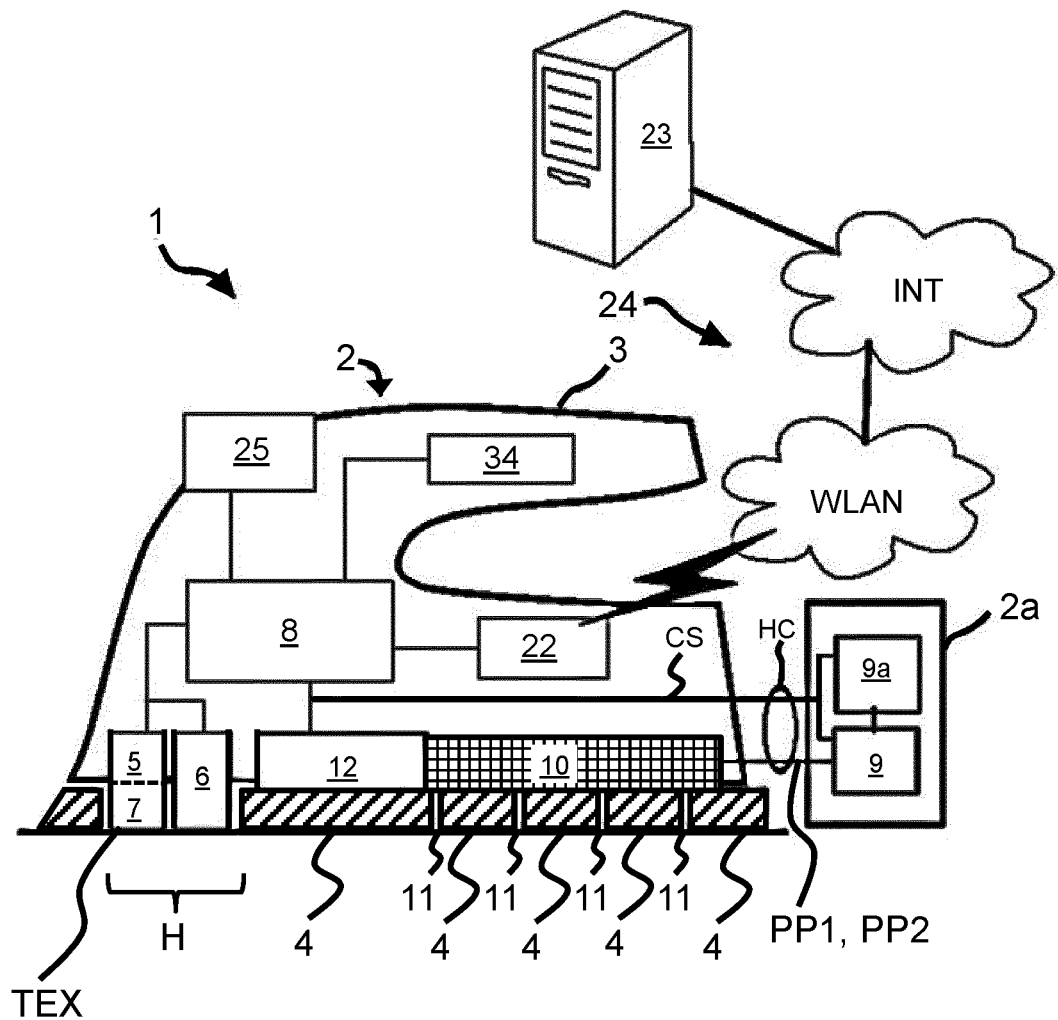
FIG. 1 schematically illustrates a textile treatment device according to a first exemplary embodiment of the invention, FIG. 1A schematically illustrates a textile treatment device according to a second exemplary embodiment of the invention, FIG. 1B schematically illustrates a textile treatment device according to a third exemplary embodiment of the invention, FIG. 1C schematically illustrates a textile treatment device according to a fourth exemplary embodiment of the invention, FIG. 1D schematically illustrates a textile treatment device according to a fifth exemplary embodiment of the invention, FIG. 1E schematically illustrates a textile treatment device according to a sixth exemplary embodiment of the invention, FIG. 1F schematically illustrates a textile treatment device according to a seventh exemplary embodiment of the invention, FIG. 1G schematically illustrates a textile treatment device according to an eight exemplary embodiment of the invention.

FIG. 1 illustrates a textile treatment device 1 according to a first exemplary embodiment.

The textile treatment device 1 corresponds to a pressurized steam ironing system with boiler in the base 2a.

The textile treatment device 1 comprises a handheld ironing device having a first casing 2. The first casing 2 includes a handle 3 for the user to hold the textile treatment device 1. The handheld ironing device is a portable device which is portable by a single user treating the textile (TEX).

The textile treatment device 1 also includes a second casing 2a in which is arranged a steam generator 9 of the "boiler" type. A water supply 9a is also arranged in the second casing 2a for supplying water to the steam generator 9.

The textile treatment device 1 further includes a control unit 8 integrated within the portable textile treatment device. This integration allows that all necessary control and signal processing is done on the textile treatment device itself, without any need to interact with external devices or use external computation resources.

Preferably, the control unit 8 is in signal communication with the water supply 9a and the steam generator 9 via control signal CS. For example, the water supply 9a corresponds to a water tank at the exit of which an output valve or a pump (shown as P1 in FIGS. 9A to 9D) is controllable by the control unit 8 via signal CS.

The first casing 2 and the second casing 2a communicate via a (flexible) hose cord HC.

The hose cord HC comprises a first pipe PP1 for carrying steam from the steam generator 9 to the steam chamber 10.

The hose cord HC also comprises a second pipe PP2 for carrying water from the water supply 9a to the steam chamber 10, for example via an output valve or a pump (shown as P2 in FIGS. 9A to 9D) which is controllable by signal CS of the control unit 8, as it will be further described in the following.

The first pipe PP1 and the second pipe PP2 are preferably connected to two different inlets of the steam chamber 10, as illustrated.

The first casing 2 comprises a steam chamber 10 adapted to receive steam from the steam generator 9. The first casing 2 also comprises a heatable soleplate 4 comprising steam vents 11. Through the steam vents 11, the steam is supplied from the steam chamber 10 to the textile TXT under treatment. The steam chamber 10 is in thermal contact with a heating element 12. The heating element 12 is intended to heat the heatable soleplate 4, and to heat the steam chamber 10 so that steam received from the steam generator 9 does not condensate. The heating element 12, the heatable soleplate 4, and the steam chamber 10 are in thermal contact. The heating element 12 is controlled by the control unit 8 in order to vary the thermal energy supplied by the heating element 12. By way of example, the heating element 12 includes at least one resistive heating element (not shown) which are in heat transfer communication with the heatable soleplate 4 being intended to contact the textile under during treatment.

When treating the textile (TEX), the user moves the textile treatment device over the textile to be treated while a heatable soleplate 4 of the textile treatment device 1 is in planar contact with the textile. Additionally or alternatively, it is conceivable that the textile treatment device is be configured as a garment steamer.

The textile treatment device 1 includes an image sensor 5 for taking an image of the textile to be treated.

By way of example, the image sensor 5 is arranged such as looking in a soleplate opening H made in the heatable soleplate 4. The soleplate opening H is a through-hole or in a through-recess. In that case, the image sensor 5 can be arranged either inside the thickness of the heatable soleplate 4, or preferably arranged above the heatable soleplate 4. The soleplate opening H is preferably arranged at a front part of the heatable soleplate.

This arrangement allows the acquisition of an image of the textile by the image sensor 5, while the heatable soleplate 4 is in planar contact with the textile.

Figure 5:
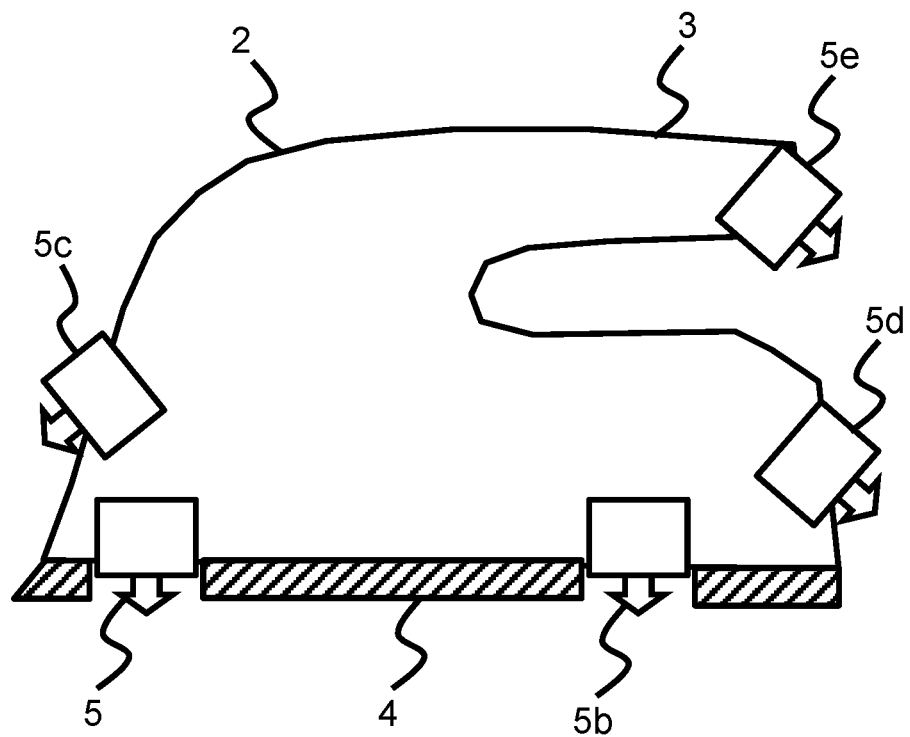
FIG. 5 illustrates various implementation of an image sensor in a textile treatment device according to the invention.

However, it is also possible that the image sensor is arranged at different locations in cooperation with the textile treatment device 1, such as:
arranged at a rear part of the soleplate, as the image sensor 5b illustrated in FIG. 5,
arranged at a front part of the textile treatment device 1, looking outside of the textile treatment device 1, as the image sensor 5c illustrated in FIG. 5,
arranged at a rear part of the textile treatment device 1, such as a heel area of the textile treatment device 1, and looking outside of the textile treatment device 1, as the image sensor 5d illustrated in FIG. 5,
arranged in cooperation with a handle 3 of the textile treatment device 1, as the image sensor 5e illustrated in FIG. 5.

Preferably, the image sensor has an active surface sensitive to light, which is oriented with respect to the surface of the heatable soleplate 4 being in contact with the textile, with an absolute value of an orientation angle a5 being in the range 0-85 degrees, preferably within 15-70 degrees. This is illustrated in FIG. 7 illustrating a first implementation of a device according to the invention.

This orientation angle allows a more flexible implementation of the image sensor in the textile treatment device 1 in terms of resulting in a more compact space.

The textile treatment device 1 may include an optical system 7. The optical system 7 comprises at least one optical element, such as lens(es), mirror(s) and/or aperture(s) and is configured to generate a focused image of a surface portion of the textile TEX on an active surface of the image sensor 5. However, it is also conceivable that the image sensor 5 receives light directly emitted from the textile, i.e. light which has not passed through an optical system.

Figure 7:
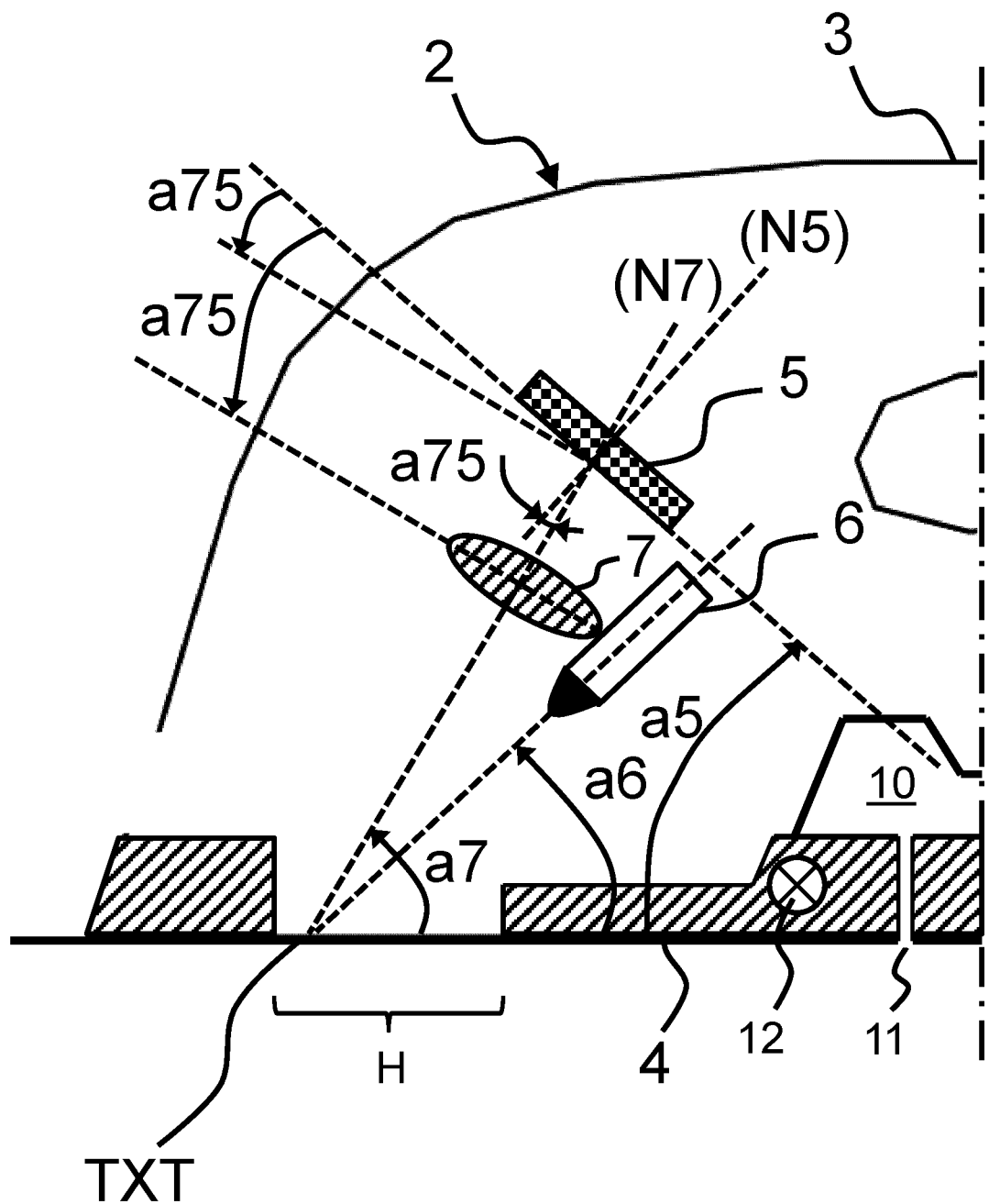
FIG. 7 depicts a first implementation of a device according to the invention.

As illustrated in FIG. 7, the optical system 7 comprises a first symmetrical axis N7 defining a first optical path between the surface portion of the textile TXT and the optical system 7. The first symmetrical axis N7 is perpendicular to the planar surface of the optical system 7.

Preferably, the first symmetrical axis N7 is inclined with an absolute angle a7 with respect to the surface of the heatable soleplate 4 being in contact with the textile. The orientation angle a7 is in the range 15-90 degrees.

The image sensor 5 (and similarly the image sensors 5b, 5c, 5d, 5e as illustrated in FIG. 5) comprises a second symmetrical axis N5 defining a second optical path between the optical system 7 and the image sensor. The second symmetrical axis N5 is perpendicular to the planar surface of the image sensor 5.

The first symmetrical axis N7 and the second symmetrical axis N5 forms an angle a75
less or equal than the maximum value of the angle a5 between the active surface sensitive to light of the image sensor and the surface of the heatable soleplate 4, so in the range] 0; 70] degrees.

By having a certain non-null angle value for a75, it can be made sure that the focus plane of the image sensor is exactly in the plane of the textile. That means that both "far away" as well as "close by" content in the image are in focus. Having an image in focus taken by the image sensor is advantageous for the convolutional neural network to obtain a more accurate classification of the fabric type.

The textile treatment device 1 may further include an illumination system 6 for illuminating a portion of the textile which is imaged using the image sensor 5.

The illumination system 6 may include a light source, such as a LED (light emitting diodes) and/or a laser beam.

The light source allows acquiring images under proper illumination conditions, thereby making textile classification more reliable.

Preferably, the light source of the illumination system 6 is oriented with respect to the surface of the heatable soleplate 4 being in contact with the textile, with an absolute value of an orientation angle a6 being in the range 0-85 degrees, preferably within 15-70 degrees. This is illustrated in FIG. 7.

This orientation angle a6 of the light source allows to capturing more details of the textile characteristics.

However, it is also conceivable that many of the technical effects and advantages described herein can still be obtained using a textile treatment device which has no illumination system 6.

When angle a7 is very close (or equal) to angle a6, a very "flat" image of the textile TXT is obtained, not much 'depth information' can be seen in the image, whereas when angle a7 is much different from angle a6, a lot of 'depth information' will be revealed in the image because of the shadows that are casted by the surface of the textile TXT. This depth information is advantageous for the convolutional neural network to obtain a more accurate classification of the fabric type.

The angles a7, a5, a75 verify the relation a7+a5−a75=90 degrees.

For example:
a7=65 degrees,
a5=35 degrees,
a75=10 degrees,
a6=49 degrees.

Preferably, the illumination system 6 comprises at least one light emitting diode arranged next to said first symmetrical axis N7.

Figure 8:
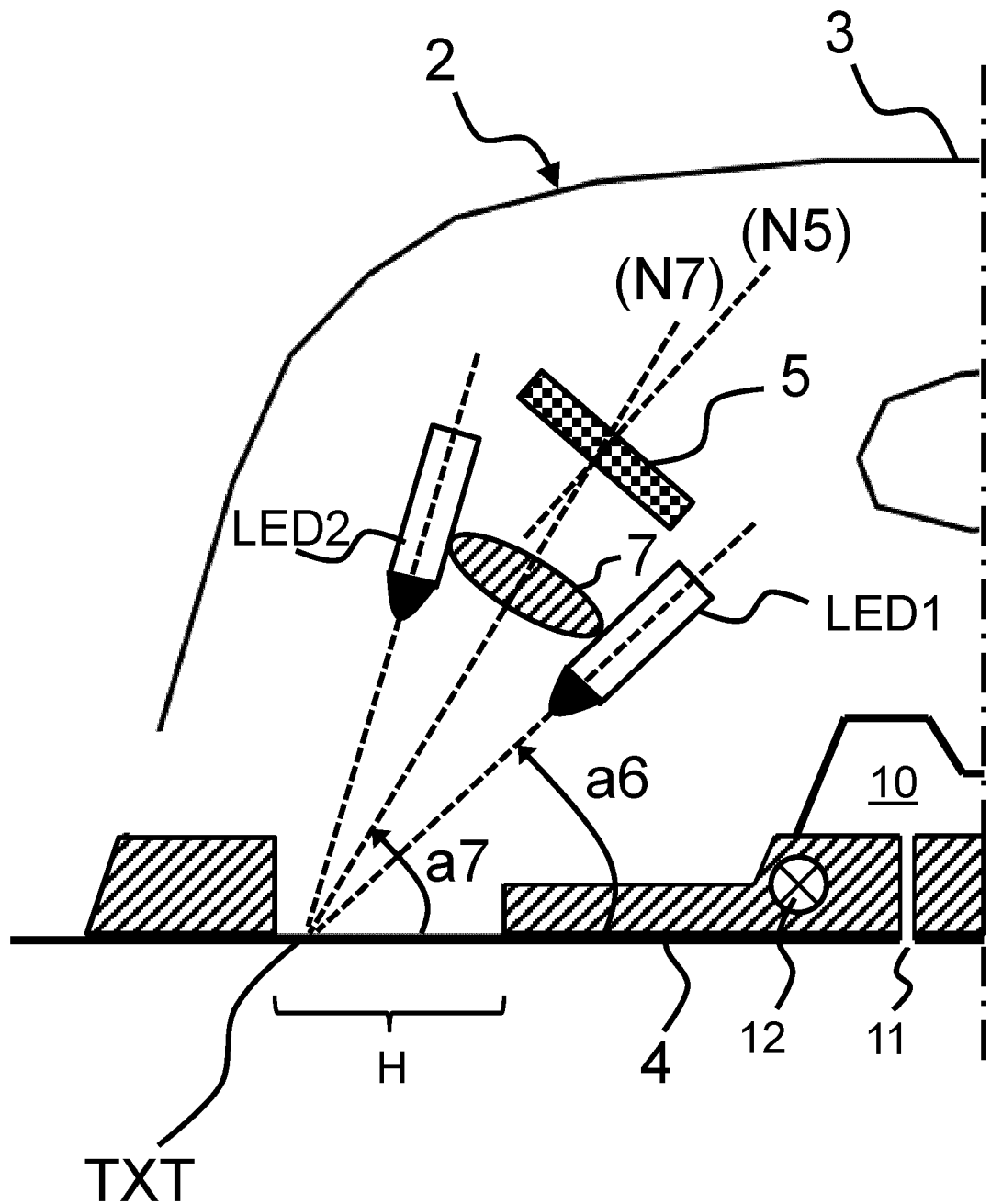
FIG. 8 depicts a second implementation of a device according to the invention.

For example, the at least one light emitting diode comprises two light emitting diodes (LED1, LED2) arranged symmetrically around the first symmetrical axis N7, as illustrated in FIG. 8 depicting a second implementation of a device according to the invention.

In another example (not shown), the at least one light emitting diode comprises three light emitting diodes (LED1, LED2, LED3) arranged symmetrically around the first symmetrical axis N7. The three light emitting diodes (LED1, LED2, LED3) form a conical arrangement around the first symmetrical axis N7.

Preferably, the light emitting diodes are operated in pulsed operation by the control unit 8 to prevent motion blur and prevent rolling shutter effect. The light emitting diodes are given a very bright flash of light during approximately 30 microseconds, and then are off during approximately 30 milliseconds (1/1000 duty cycle). During the flash of light a current of approximately 1 ampere flows through the LEDs. The average power dissipation per light emitting diode is approximately 0.001*1A*2.5V=2.5 mW.

Preferably, the illumination system 6 is adapted to generate a light beam in the Infrared (IR) wavelengths.

For example, light emitting diodes (LED1, LED2, LED3) emitting in the Infrared wavelengths can be used.

The reason to use Infrared light is because many fabric dies are transparent for infrared light. That means that a red textile and a blue textile and a white textile and a black textile all look exactly the same using infrared light. All textiles look as if they were white.

In the context of the invention, not being able to distinguish colors is not a problem as such, because the algorithm used according to the invention does not use color to obtain the classification of the textile. Indeed, color does not contain any information on fabric type (wool, silk, cotton): All fabric types can have any colors.

By using Infrared, because all the textiles look as having the same "color", it is thus not needed to change the exposure time or illumination intensity when going from one textile to the other. This simplifies the control of the illumination system 6, as well as contributes to faster image acquisition. And in the case the textile is woven with yarns that have different colors, in infrared light these colors all appear as white, so the fabric recognition algorithm is not disturbed by any 'print' on the textile.

The control unit 8 is in signal communication with the image sensor 5 and the illumination system 6. The control unit 8 is configured to execute an algorithm stored in the textile treatment device 1. The algorithm determines, using the taken image as an input of the algorithm, a classification of the textile.

The classification of the textile may include assigning at least one output class to the textile.

This solution of obtaining a classification of the textile allows deriving suitable values for some operating parameters of the textile treatment device. Thereby, efficient treatment of the textile and reliable prevention of damage to the textile can be achieved.

The classes may be provided by or generated using output classes of an artificial neural network (ANN).

By way of example, the classes may be classes of a fabric type of the textile, or classes of a level of delicateness of the fabric for ironing the textile.

Those classifications are advantageous because they provide a sufficiently detailed level of classification, for controlling accordingly at least one operating parameter of the textile treatment device.

The classes of fabric type, such as material, may include classes, such as "wool", "nylon", "linen", "jeans" and "cotton".

The classes of fabric level of delicateness may include classes, such as "delicate" (including for example, but not limited to the list of material defined by acetate, elastane, polyamide, polypropylene, cupro, silk, polyester, triacetate, viscose, and wool) or "tough" (including for example, but not limited to the list of material defined by linen, jeans, cotton).

Delicate fabrics are considered fabrics that are sensitive to heat, and hence are usually recommended to be ironed with 1-dot and 2-dots settings, as per standard IEC 60311, while tough fabrics are considered to require higher temperature to obtain acceptable ironing results and are usually recommended to be ironed with 3-dots settings. However, it is noted that this is only a recommendation from standard IEC 60311, so not mandatory.

Below table extracted from standard IEC 60311 summarizes this correspondence:

| Marking | Sole-plate temperature T ° C. | Material, for example |
| --- | --- | --- |
| • (1 dot) | 70 < T < 120 | Acetate, elastane, polyamide, polypropylene |
| • • (2 dots) | 100 < T < 160 | Cupro, polyester, silk, triacetate, viscose, wool |
| • • • (3 dots) | 140 < T < 210 | Cotton, linen |

NOTE 1
The measurements of 7.2, 7.3 and 7.6 may all be carried out at the same time.
NOTE 2
ISO 3758 has introduced textile care markings for maximum ironing temperatures. The textile care labelling of the ISO standard is indicated by one, two and three dots placed within an iron symbol. This standard takes those recommendations into account but to obtain improved ironing results the temperatures have been adjusted as shown in the following table.
With the thermostat set to the middle of each of these dot markings the sole-plate temperatures are measured after steady conditions have been reached.
The sole-plate temperature for the setting (T) is the average of the five highest temperatures ($T_a$) and the five lowest temperatures ($T_b$) of the mid-point of the sole-plate during five successive cycles of temperature variation.

For example, a textile which is classified to the class "delicate" is treated using a relatively lower temperature of the heatable soleplate 4, for example in the range 70-160 degree Celsius.

For example, a textile which is assigned to the class "tough" is treated using a relatively higher temperature of the heatable soleplate 4, for example in the range 140-210 degree Celsius.

In the embodiment of FIG. 1, the control unit 8 is configured to control, based on the obtained classification of the textile, at least one operating parameter of the textile treatment device 1. The at least one operating parameter may include, but are not limited to:
a temperature of the heatable soleplate 4 in the textile treatment device being intended to be in contact with the textile, and/or an amount of steam applied to the textile. The amount of steam applied to the textile can for example be varied by opening/closing a steam valve (shown as V1 and V2 in FIGS. 9A to 9D) arranged at the exit of the steam generator 9, under the control of the control unit 8. The amount of steam applied to the textile can also be varied by varying the temperature of the steam generator 9, under the control of the control unit 8.

FIGS. 9A, 9B, 9C, 9D depict various implementations of a device as depicted in FIG. 1.

Figure 9A:
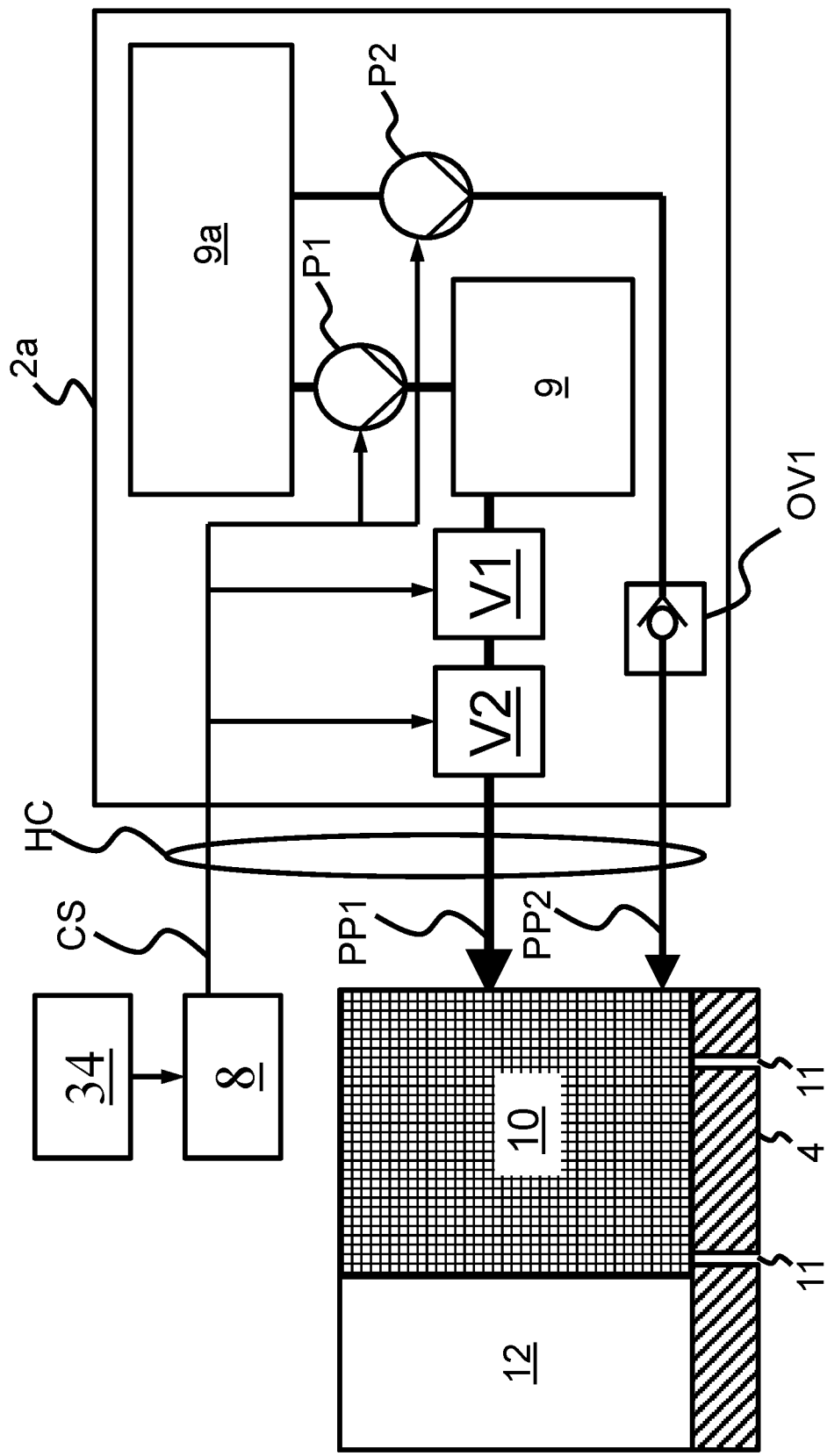
FIGS. 9A, 9B, 9C, 9D depict various embodiments of a device as depicted in FIG. 1.

A first embodiment of this invention is as shown in FIG. 9A where two electro-valves V1 and V2 are connected in series along the first pipe PP1.

The valve V1 in this embodiment is a standard electro-valve with one open (ON) and one closed (OFF) position. The open/close states of the valves V1 and V2 are controlled by control signal CS from the control unit 8.

The valve V2 in this embodiment is a customized electro-valve which does not have a real closed position. For valve V2, it has a large diameter (for example 4 mm) when being in open (ON) position, and a small diameter orifice (for example 2 mm) when being in closed (OFF) position.

The valve V1 controls steam on/off (release steam/not release steam), while valve V2 controls high (when ON) steam rate and low steam rate when OFF.

The different combinations and the resultant steam rates at the exit of the first pipe PP1 are listed in the below table 1:

TABLE 1

|  |  | V1 State (Controls release of steam) | |
|---|---|---|---|
|  |  | On (Open) | Off (Close) |
| V2 State (Controls steam rate) | On (Open - large orifice) | High Steam | No Steam |
|  | Off (Close - small orifice) | Low Steam | No Steam |

In this first embodiment, the valve V2 in open (ON) position preferably has an orifice diameter larger than valve V1 orifice diameter in open (NO) position. For example, valve V2 has orifice diameter of 4 mm when being in open (ON) position, and valve V1 has orifice diameter of 3 mm when being in open (ON) position. This is for the purpose of minimizing losses caused by valve V1.

In this first embodiment, the order of valve V1 (control release of steam) and valve V2 (controls steam rate) can also be exchanged to produce similar results.

Figure 9B:
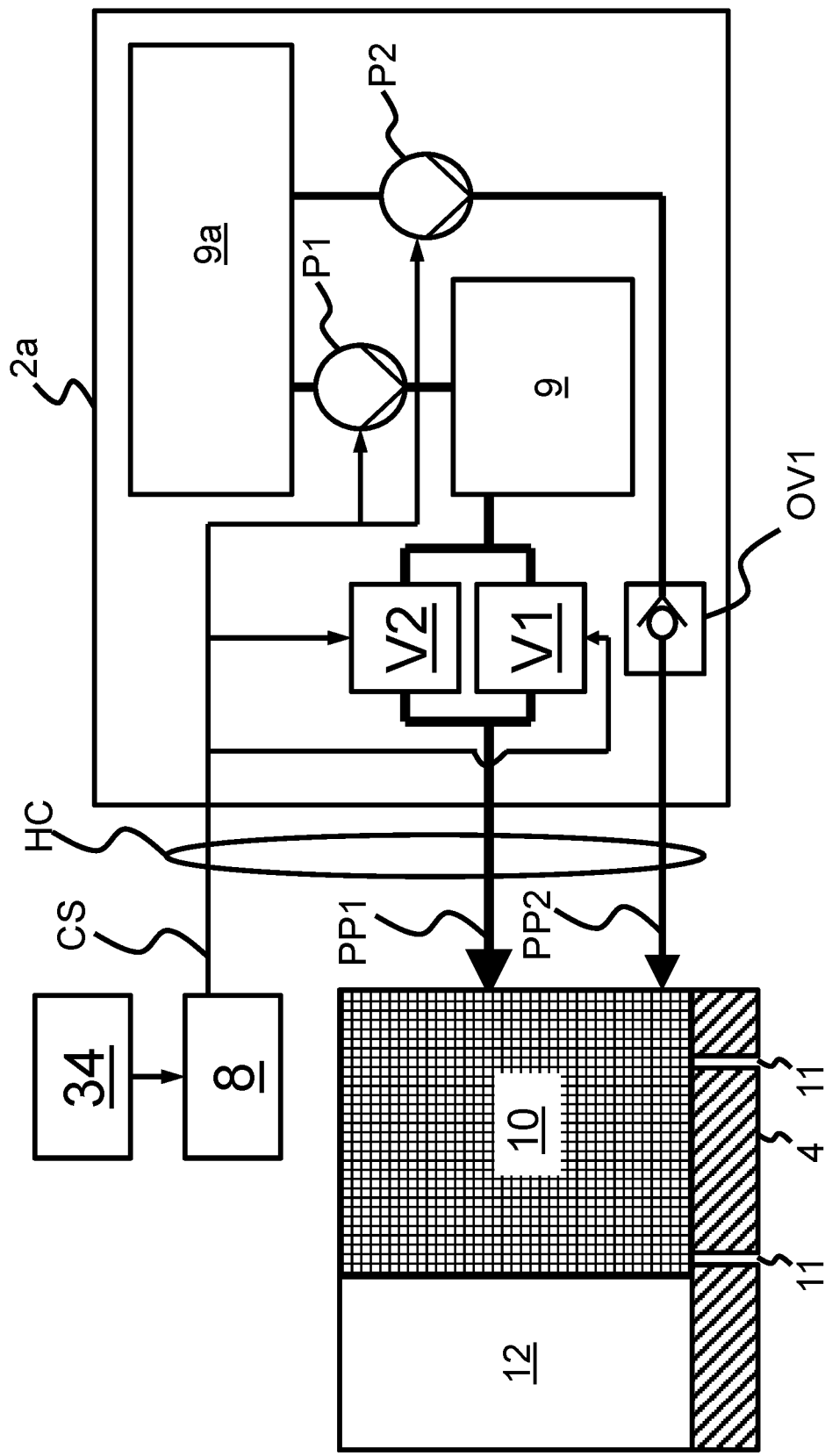

The second embodiment of this invention is as shown in FIG. 9B, where two electro-valves (V1 and V2) are connected in parallel. Valves V1 and V2 in this embodiment can have the same orifice diameter or different orifice diameters depending on the requirements of the application.

Different steam rates at the exit of the first pipe PP1 can be obtained using a combination of E-valve states. This is shown in the below table 2:

TABLE 2

|  |  | V1 State (Small - 2 mm orifice) | |
|---|---|---|---|
|  |  | On (Open) | Off (Close) |
| V2 State (Large - 3 mm orifice) | On (Open) | High Steam | Medium Steam |
|  | Off (Close) | Low Steam | No Steam |

Figure 9C:
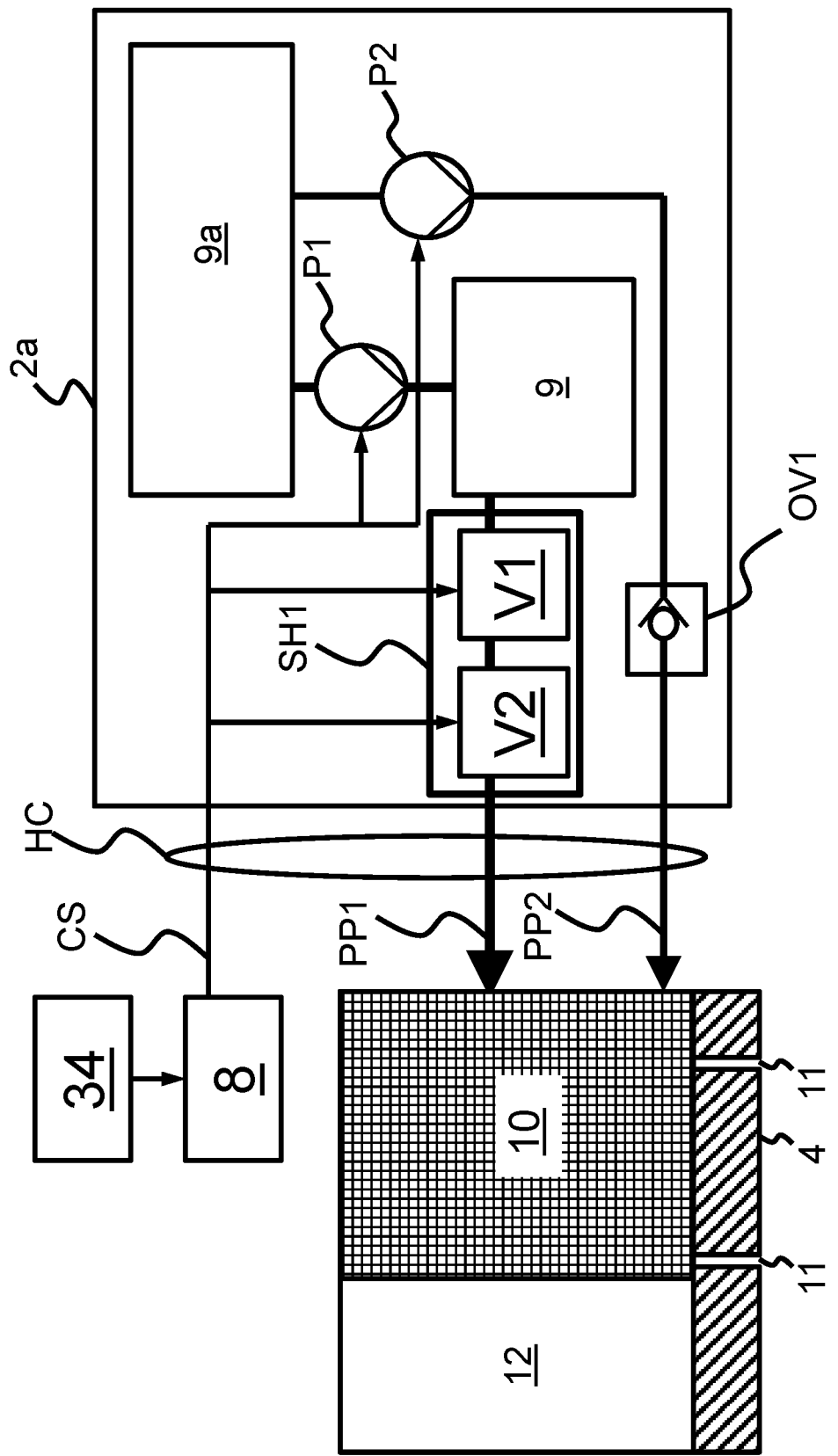

The third embodiment of this invention is as shown in FIG. 9C. In this embodiment, valves V1 and V2 are the same as V1 and V2 in second embodiment except that they are built into a single housing SH1 as one component. The high steam rate and low steam rate are delivered in the same manner as in the second embodiment.

The third embodiment of this invention reduces the amount of external tube connections, reducing the size of the E-valve configuration required to deliver this function.

Another benefit of the third embodiment is the reduction in condensation of steam to water in the E-valve configuration during the start of ironing or if the steam function has not been triggered for an extended period of time, thus reducing carryover water, which can result in a so-called "spitting" problem at the steam vents 11 of the heatable soleplate 4. This is due to the reduction of the overall thermal mass of the E-valve configuration.

Figure 9D:
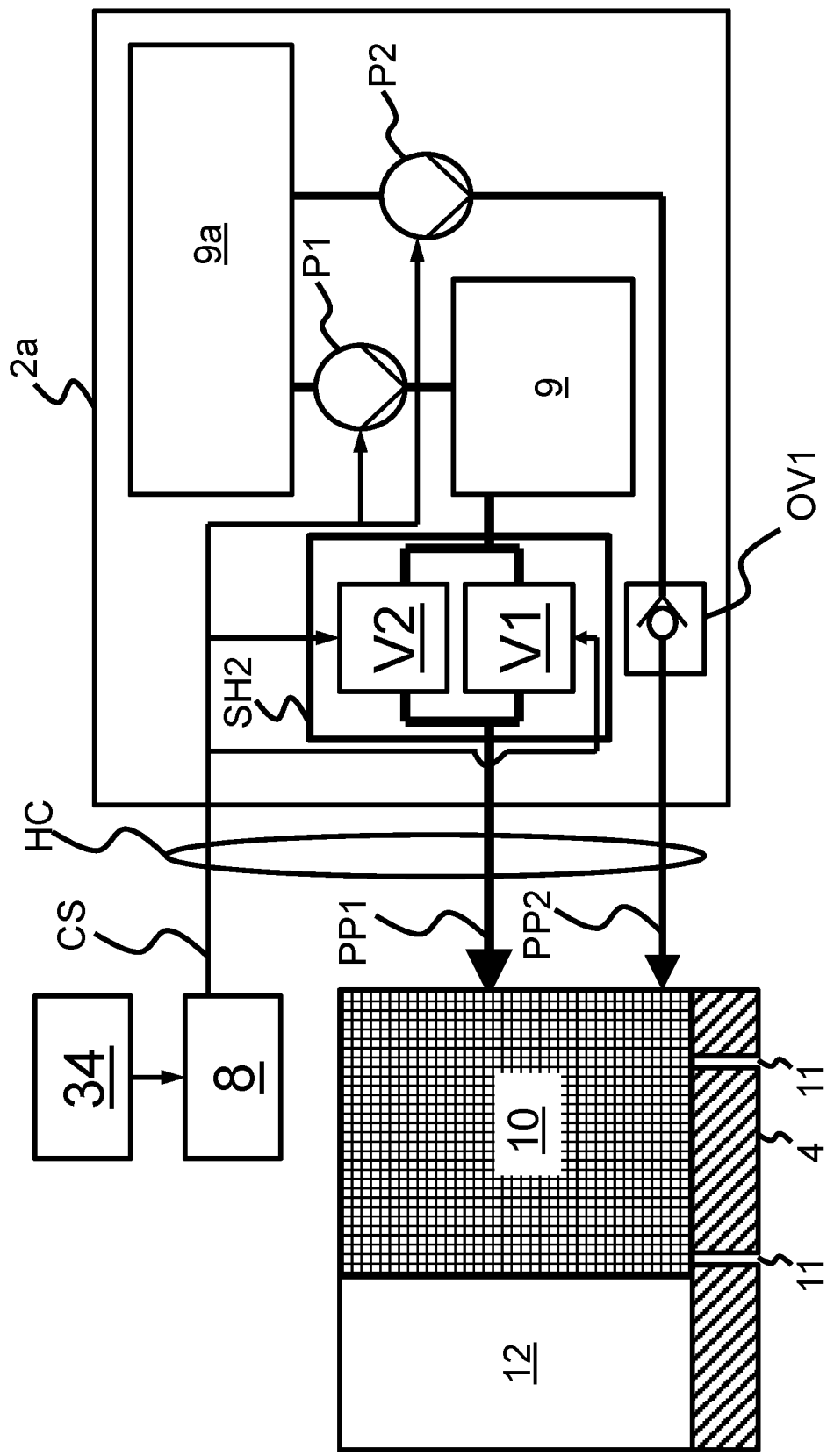

The fourth embodiment of this invention is as shown in FIG. 9D. In this embodiment, valves V1 and V2 are the same as valves V1 and V2 in the first embodiment except that they are built into a single housing SH2 as one component. The high steam rate and low steam rate are delivered in the same manner as in the first embodiment.

The benefits of size reduction of E-valve configuration and reduction in carrying over water and thus spitting described in the third embodiment are also valid in the fourth embodiment.

Figure 1A:
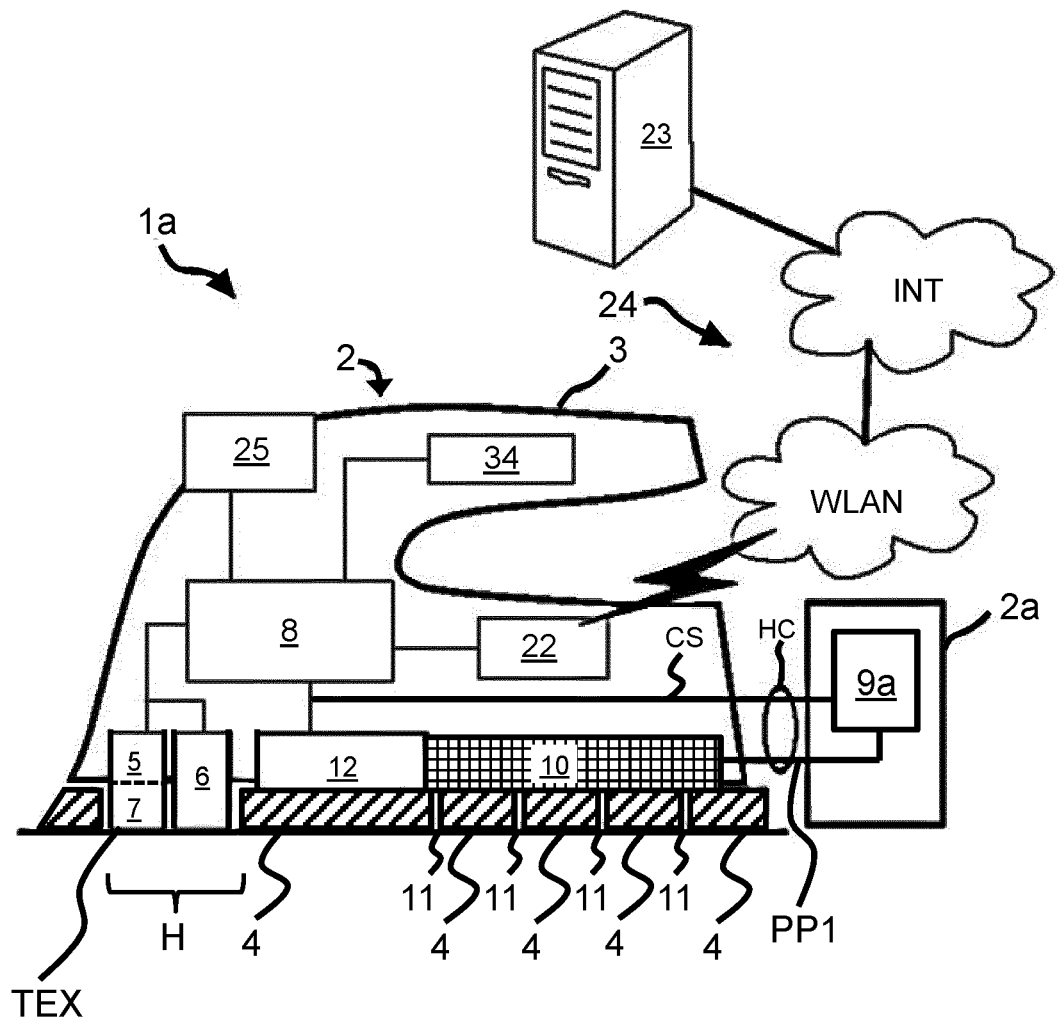
FIG. 1H schematically illustrates a textile treatment device according to a ninth exemplary embodiment of the invention, FIG. 2A schematically illustrates an artificial neural network (ANN) which is executed by a control unit of the textile treatment device of FIG. 1, FIG. 2B schematically illustrates an exemplary process for training the ANN illustrated in FIG. 2A, FIG. 3 schematically illustrates a portion of a convolutional neural network (CNN) which is executed by a control unit in a textile treatment device according to the invention, FIG. 3A schematically illustrates an example of a convolutional neural network (CNN) which is executed by a control unit of the textile treatment device according to the invention, FIG. 4 schematically illustrates examples of images which have been acquired using an image sensor of the textile treatment device as illustrated in FIG. 1.
Figure 1B:
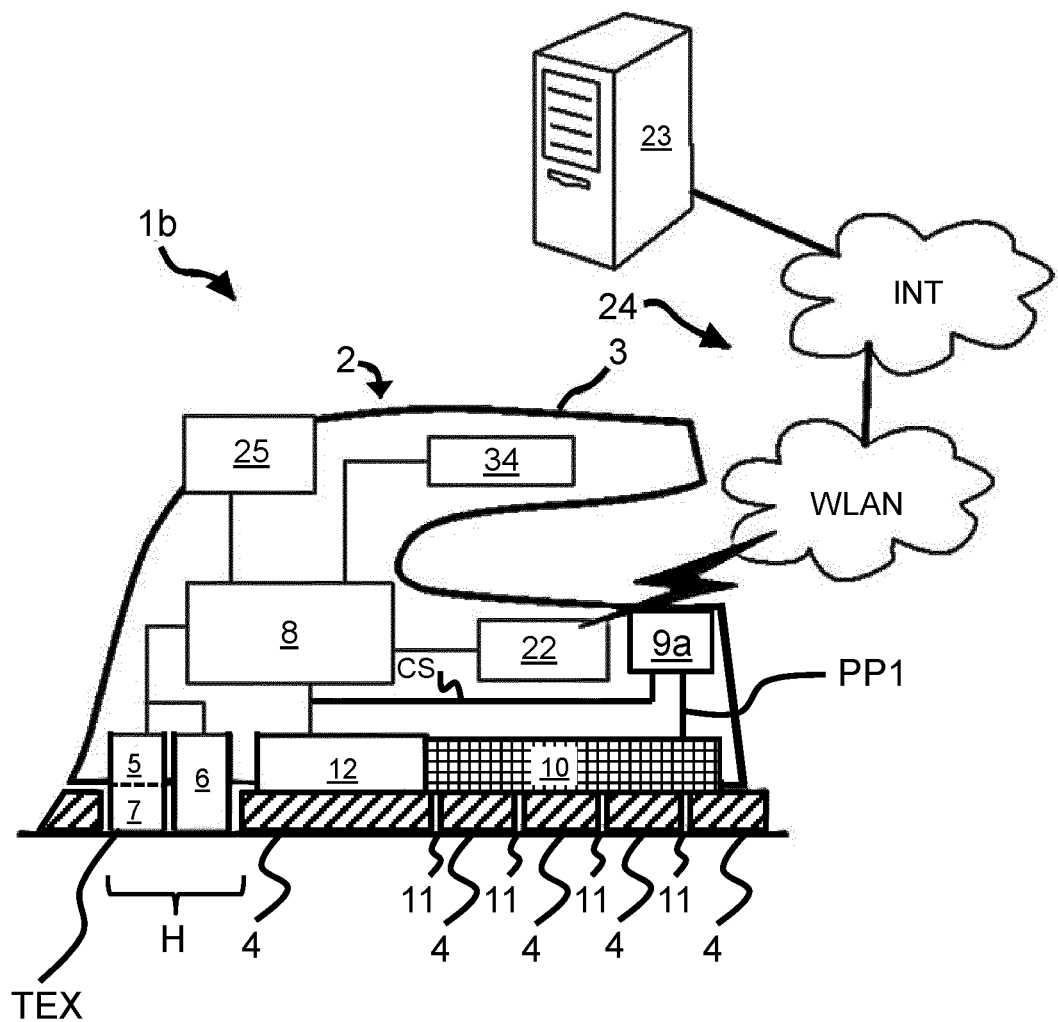
Figure 1C:
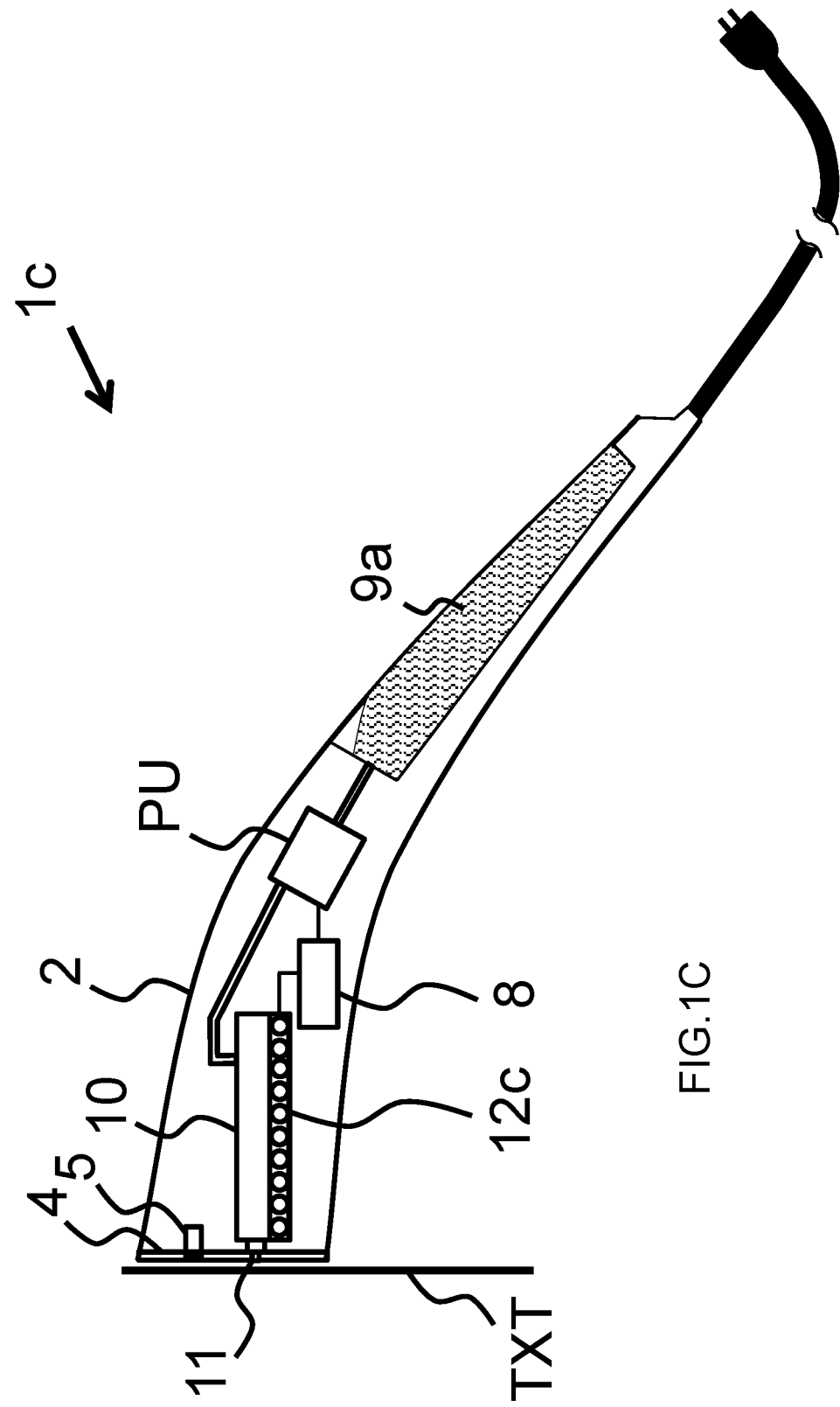
Figure 1D:
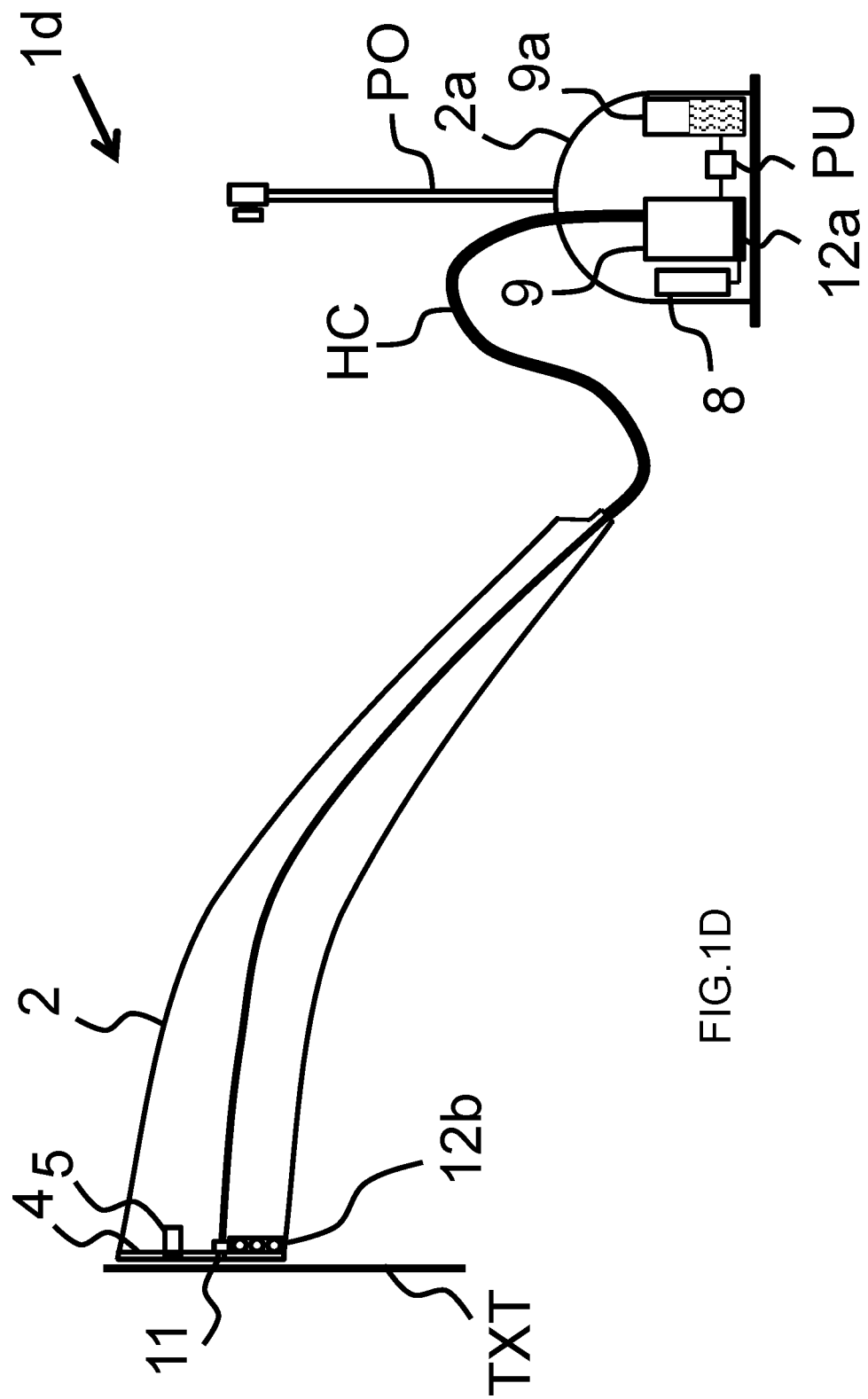
Figure 1E:
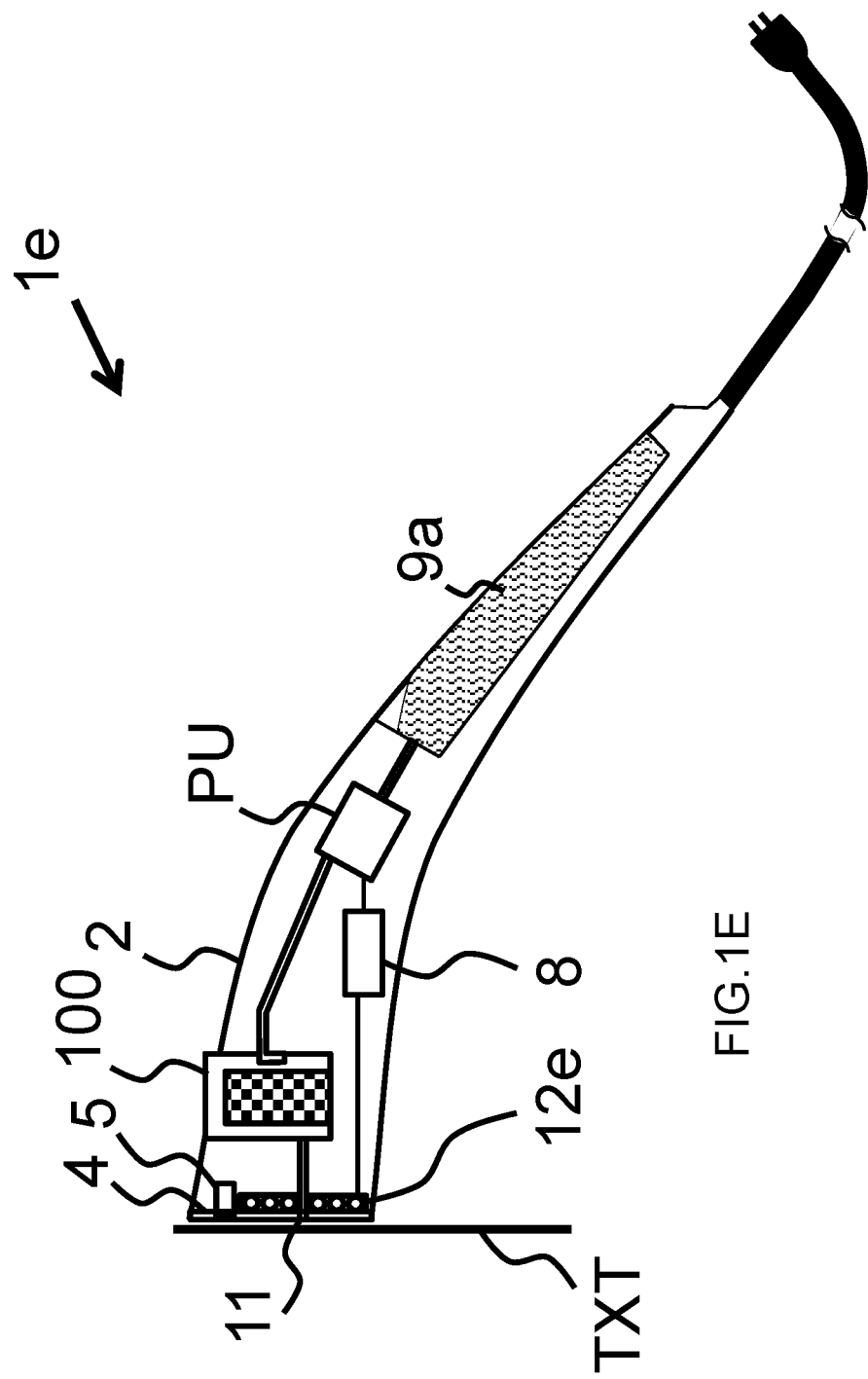
Figure 1F:
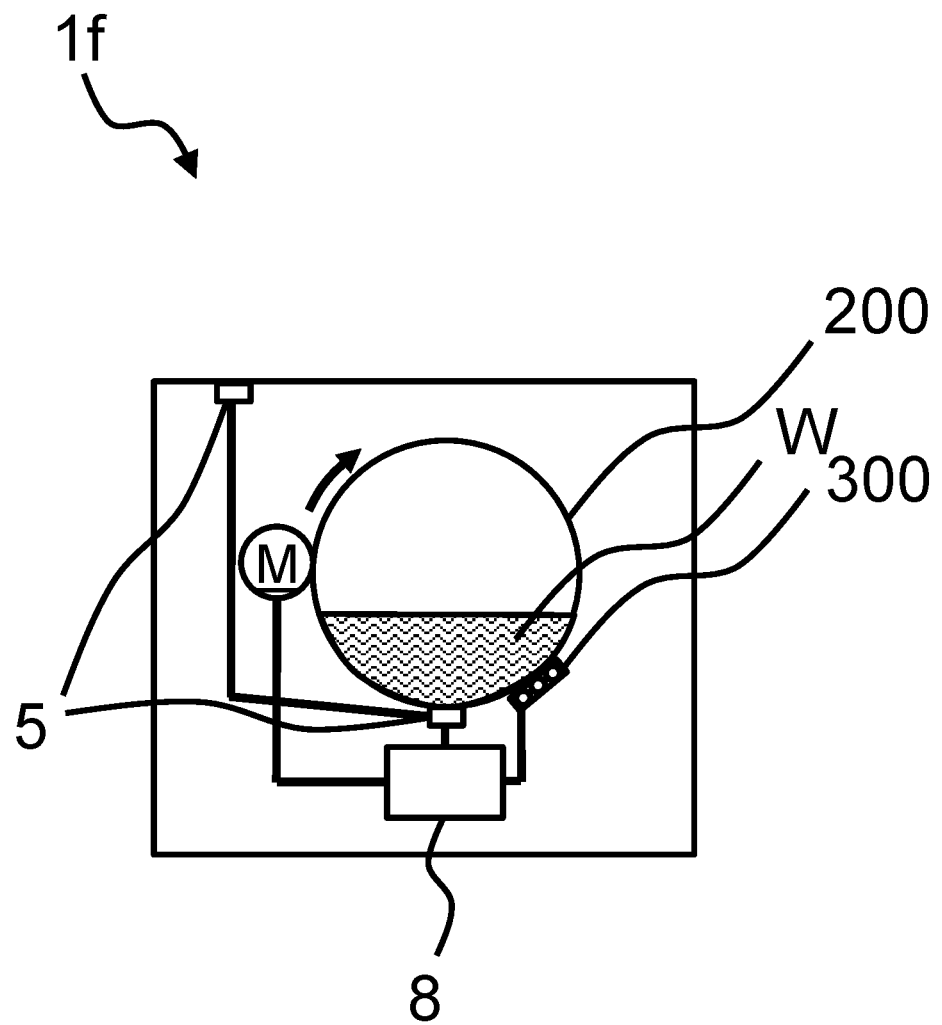
Figure 1G:
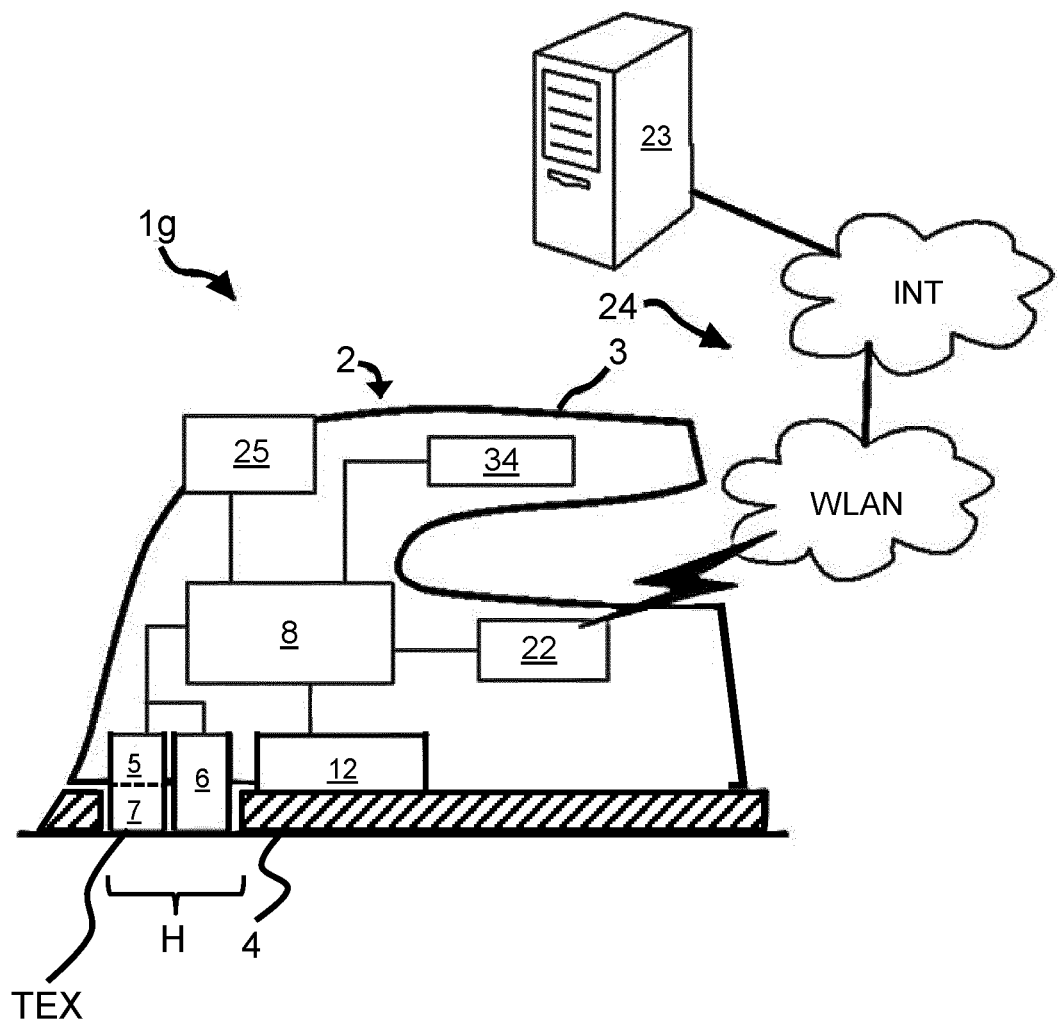
Figure 1H:
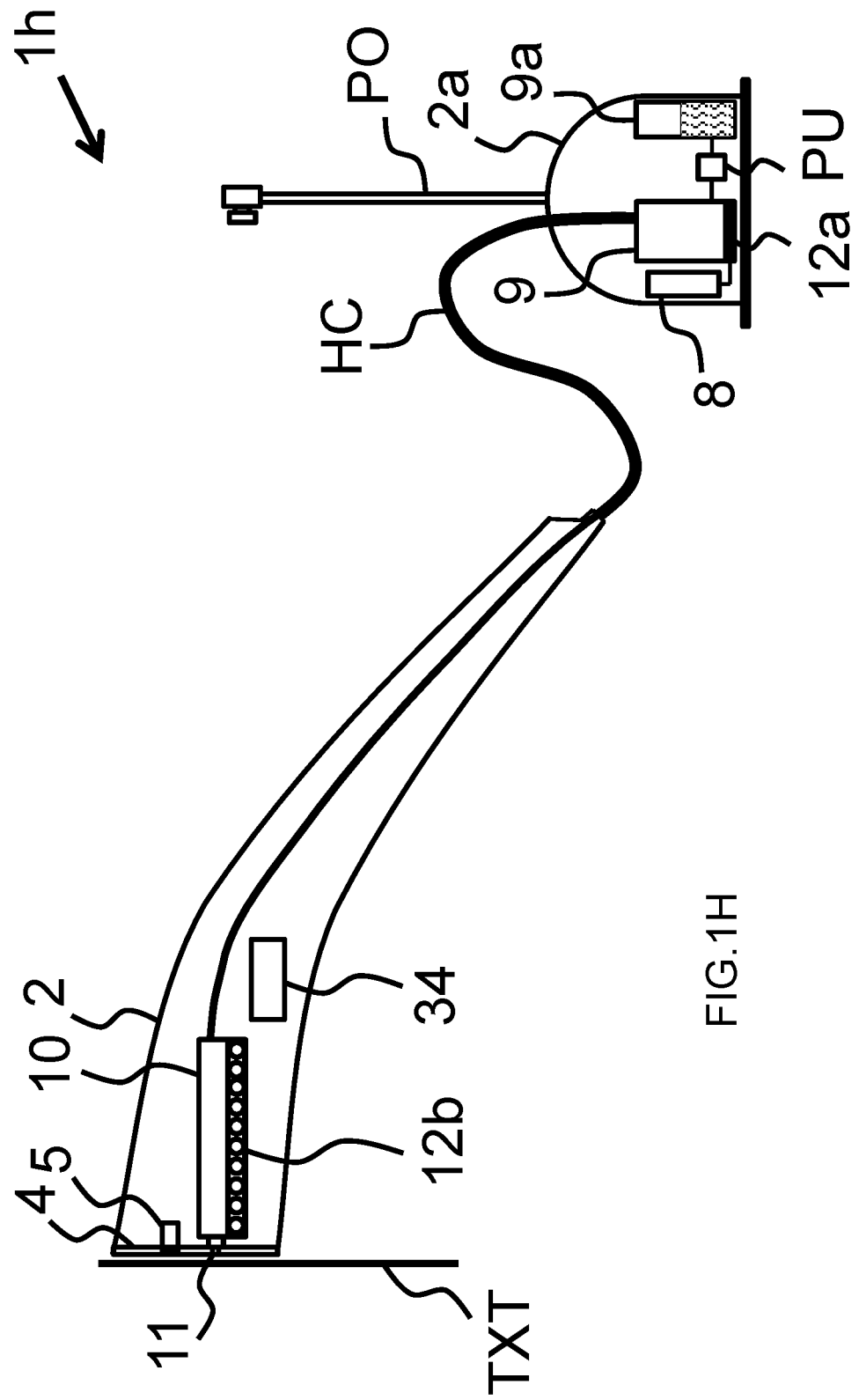

It is noted that similar valve arrangement of valves V1 and V2 can be arranged at the exit of the steam generator of the device of FIG. 1H.

FIG. 1A schematically illustrates a textile treatment device Ta according to a second exemplary embodiment of the invention.

The textile treatment device 1a corresponds to a pressurized steam generator without boiler in the base 2a.

This embodiment differs from the embodiment described along with FIG. 1 in that the second casing 2a only comprises a water supply 9a. Water is thus supplied from the water supply 9a via the hose cord HC to the steam chamber 10 for conversion into steam.

In the embodiment of FIG. 1A, the control unit 8 is configured to control, based on the obtained classification of the textile, at least one operating parameter of the textile treatment device 1. The at least one operating parameter may include, but are not limited to:
- a temperature of the heatable soleplate 4 in the textile treatment device being intended to be in contact with the textile, and/or
- an amount of steam applied to the textile. The amount of steam can for example be varied by changing the pumping rate of an electrical water pump (not shown) arranged between the water supply 9a and the steam chamber 10, under the control of the control unit 8.

FIG. 1B schematically illustrates a textile treatment device 1b according to a third exemplary embodiment of the invention.

The textile treatment device 1b corresponds to a steam ironing device (or steam iron).

This embodiment differs from the embodiment described along with FIG. 1 in that there are no second casing 2a arranged. Instead, the water supply 9a is arranged inside the casing 2. Water is thus supplied from the water supply 9a to the steam chamber 10 for conversion into steam.

In the embodiment of FIG. 1B, the control unit 8 is configured to control, based on the obtained classification of the textile, at least one operating parameter of the textile treatment device Tb. The at least one operating parameter may include, but are not limited to:

a temperature of the heatable soleplate 4 in the textile treatment device being intended to be in contact with the textile, and/or an amount of steam applied to the textile. The amount of steam can for example be varied by opening/closing a water valve (not shown) arranged between the water supply 9a and the steam chamber 10, under the control of the control unit 8. The amount of steam can also be varied by changing the pumping rate of an electrical water pump (not shown) arranged between the water supply 9a and the steam chamber 10, under the control of the control unit 8.

FIG. 1C schematically illustrates a textile treatment device 1c according to a fourth exemplary embodiment of the invention.

The textile treatment device 1c corresponds to a handheld garment steamer.

The textile treatment device 1c comprises a casing 2 in which are arranged a water supply 9c for supplying water to a steam chamber 10, for example via an electrical water pump PU. The steam chamber 10 is heated by heating element 12c. Steam generated by the steam chamber 10 is applied on the textile (i.e. garment) TXT via steam vent(s) 11 arranged in a heatable soleplate 4. The heatable soleplate 4 is heated by heating element 12c. A control unit 8 allows controlling the pumping rate of pump PU and the electrical power supplied to the heating element 12c. For sake of representation, the communication system 22 and the interface 25 are not represented. The image sensor 5 can be arranged in a soleplate opening of the heatable soleplate 4, similarly as the embodiment of FIG. 1.

The control unit 8 is configured to control, based on the obtained classification of the textile, at least one operating parameter of the textile treatment device 1c. The at least one operating parameter may include, but are not limited to:

a temperature of the heatable soleplate 4 in the textile treatment device being intended to be in contact with the textile, and/or an amount of steam applied to the textile. The amount of steam can for example be varied by changing the pumping rate of the electric water pump PU arranged between the water supply 9a and the steam chamber 10, under the control of the control unit 8.

FIG. 1D schematically illustrates a textile treatment device 1d according to a fifth exemplary embodiment of the invention.

The textile treatment device 1d corresponds to a stand garment steamer.

The textile treatment device 1d comprises a casing 2a in which are arranged a water supply 9c for supplying water to a steam chamber 10, for example via an electrical water pump PU. The steam chamber 10 is heated by heating element 12a. Steam generated by the steam chamber 10 is carried via a hose cord HC to a handheld casing 2. The handheld casing 2 is represented bigger than in reality, for sake of clarity. The casing 2a may comprise a pole PO to rest the handheld casing 2. Steam is applied on the textile (i.e. garment) TXT via steam vent(s) 11 arranged in a heatable soleplate 4. The heatable soleplate 4 is heated by heating element 12b. A control unit 8 allows controlling the pumping rate of pump PU, the electrical power supplied to the heating element 12a and 12b. For sake of representation, the communication system 22 and the interface 25 are not represented. The image sensor 5 can be arranged in a soleplate opening of the heatable soleplate 4, similarly as the embodiment of FIG. 1.

The control unit 8 is configured to control, based on the obtained classification of the textile, at least one operating parameter of the textile treatment device 1d. The at least one operating parameter may include, but are not limited to:

a temperature of the heatable soleplate 4 in the textile treatment device being intended to be in contact with the textile, and/or an amount of steam applied to the textile. The amount of steam can for example be varied by changing the pumping rate of the electric water pump PU arranged between the water supply 9a and the steam chamber 10, under the control of the control unit 8.

FIG. 1H schematically illustrates a textile treatment device 1h according to a ninth exemplary embodiment of the invention.

The textile treatment device 1h corresponds to a stand garment steamer. Is has the same elements as the textile treatment device 1d described above.

In addition, the textile treatment device 1h also comprises a steam chamber 10 adapted to receive steam from the hose cord HC.

The steam chamber 10 is in thermal contact with a heating element 12b. Steam received from the hose cord HC enters the steam chamber 10, and is re-heated inside the steam chamber 10, and water droplets that would be in this flow of steam are evaporated. The re-heated steam then exits the steam chamber 10 at the steam vents 11.

The textile treatment device 1h has the advantage that steam exiting the steam vents 11 does not contain water droplets.

FIG. 1E schematically illustrates a textile treatment device 1e according to a sixth exemplary embodiment of the invention.

The textile treatment device 1e corresponds to a stain removal device.

The textile treatment device 1e comprises a casing 2 in which are arranged a water supply 9c for supplying water to a container 100 containing a stain removal material in solid or liquid form, for example via an electrical water pump PU. Stain removal material solution which exits the container 100 is applied on the textile (i.e. garment) TXT via a vent(s) 11 arranged in a heatable soleplate 4, for removing a stained area on the textile. The heatable soleplate 4 is heated by heating element 12e. The heat generated by the heatable soleplate 4 allows accelerating the stain removal process, the efficiency of the stain removal, and drying the treated stained area. A control unit 8 allows controlling the pumping rate of pump PU and the electrical power supplied to the heating element 12e. For sake of representation, the communication system 22 is not represented. The image sensor 5 can be arranged in a soleplate opening of the heatable soleplate 4, similarly as the embodiment of FIG. 1.

The control unit 8 is configured to control, based on the obtained classification of the textile, at least one operating parameter of the textile treatment device 1e. The at least one operating parameter may include, but are not limited to:

a temperature of the heatable soleplate 4 in the textile treatment device being intended to be in contact with the textile.

FIG. 1F schematically illustrates a textile treatment device 1f according to a seventh exemplary embodiment of the invention.

The textile treatment device 1f corresponds to a washing machine device.

The textile treatment device 1f comprises a tumbler 200 for receiving textile (i.e. garments) to wash. The tumbler 200 is brought into rotation by motor M. The tumbler 200 is adapted to receive water W from a water supply (not shown). A heating element 300 is arranged in contact with the tumbler 200 to heat the water W in the tumbler. A control unit 8 allows controlling the rotation speed of the motor M, and the electrical power supplied to the heating element 300. For sake of representation, the communication system 22 and the interface 25 are not represented. The image sensor 5 can be arranged in a bottom inside part of the tumbler 200, or arranged in a top part of the textile treatment device 1f.

The control unit 8 is configured to control, based on the obtained classification of the textile, at least one operating parameter of the textile treatment device 1f. The at least one operating parameter may include, but are not limited to:
- a temperature of the water used to washing the textile (i.e. garments): for example lower temperature for textiles classified as delicate, and higher temperature for textiles classified as tough, and/or
- a duration of the washing cycle: for example shorter duration for textiles classified as delicate, and longer duration for textiles classified as tough, and/or
- a rotational speed of the tumbler during spin dry cycle: The rotational speed of the tumbler can for example be varied by varying the rotation speed of motor M bringing the tumbler in rotation. For example low rotation speed for textiles classified as delicate, and high rotation speed for textiles classified as tough.

FIG. 1G schematically illustrates a textile treatment device Ig according to an eight exemplary embodiment of the invention.

The textile treatment device Ig corresponds to a dry ironing device.

This embodiment differs from the embodiment described along with FIG. 1B in that it does not implement the water supply 9c, nor the steam chamber 10. The heatable soleplate 4 also does not comprise vents anymore.

The control unit 8 is configured to control, based on the obtained classification of the textile, at least one operating parameter of the textile treatment device 1e. The at least one operating parameter may include, but are not limited to:
- a temperature of the heatable soleplate 4 in the textile treatment device being intended to be in contact with the textile.

In the embodiments described above comprising a steam engine for generating steam to be supplied to the textile, such as the steam generator 9 and/or the steam chamber 10, the amount of steam can be set based on the obtained classification of the textile.

Preferably, a textile which is classified to the class "delicate" is treated using a lower amount of steam, for example in the range 50-99 g/mn.

Preferably, a textile which is assigned to the class "tough" is treated using a higher amount of steam, for example in the range 100-160 g/mn.

Increasing the steam rate if the fabric is deemed as more tough (or less delicate), improves the ironing and/or steaming results in terms of removing creases on the textile/garments.

It has been shown that using the classification of the textile, it is possible to efficiently adapt operation of the textile treatment device 1 to the textile under treatment. Thereby, this contributes to a convenient and optimal result of the textile treatment, and also prevents damaging the textile due to improper settings of the textile treatment device 1. It is possible for the textile treatment device 1 to automatically adjust at least one operating parameter of the textile treatment device 1 during treatment of a textile if the textile treatment device 1 detects a change in the textile classification. Thereby, a time-efficient treatment of the textile (or garment made of a textile) is made possible.

In the exemplary textile treatment device 1, which is shown in FIG. 1, the algorithm which is executed by the control unit 8 includes an artificial neural network (ANN).

The term artificial neural network may be defined to mean a collection of neural processing units. The ANN has connections between the neural processing units which have a connection weight. The ANN may include a plurality of layers. The layers may include an input layer, one or more hidden layers (also denoted as intermediate layers), and an output layer. The ANN may be a feedforward neural network or a recurrent neural network.

Figure 2A:
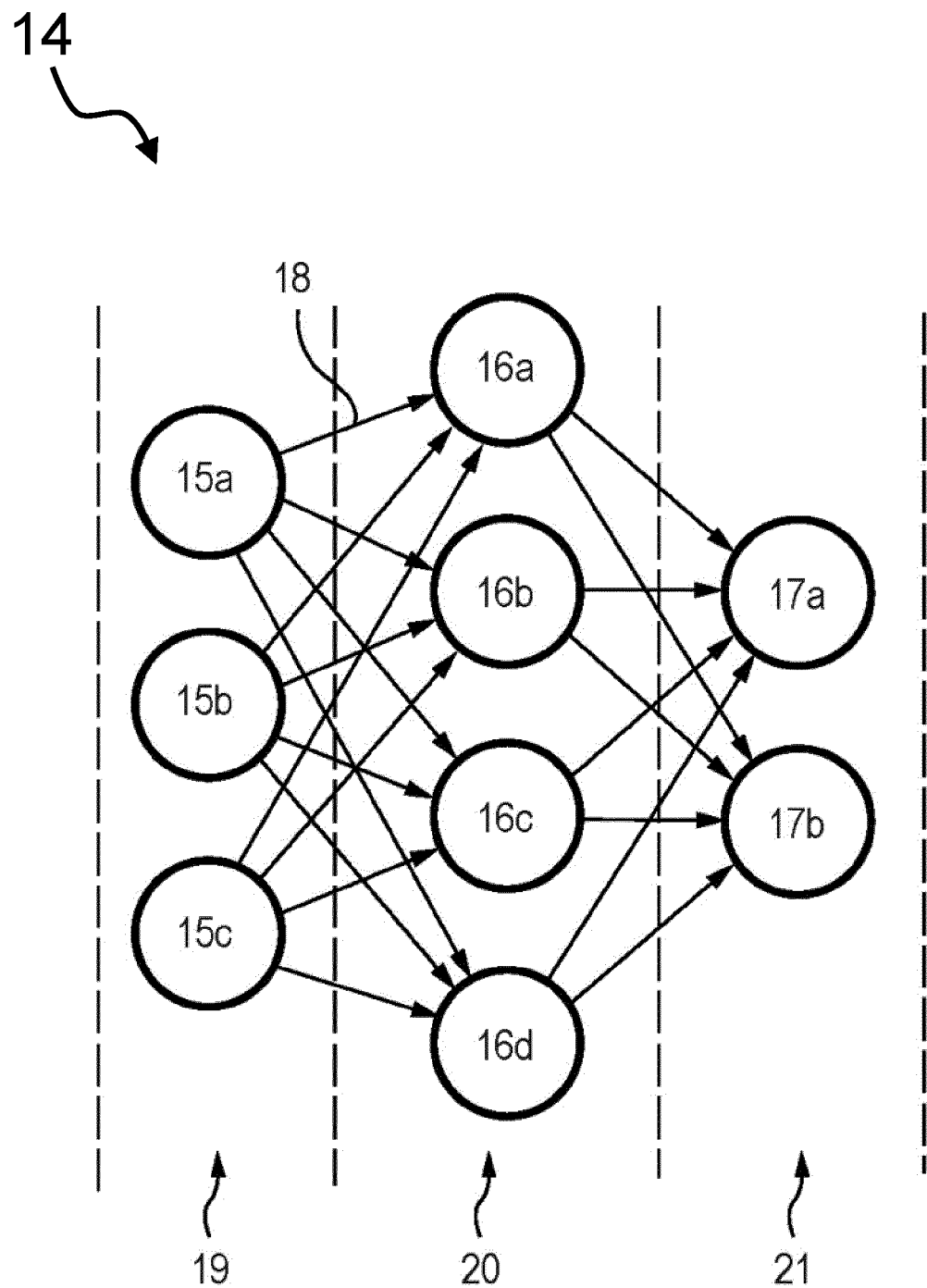

FIG. 2A is a schematic illustration of an ANN 14. The ANN 14 includes a plurality of neural processing units 15a, 15b, 17b. The neural processing units 15a, 15b, 17b are connected to form a network via a plurality of connections, each having a connection weight 18. Each of the connections connects a neural processing unit of a first layer of the ANN 14 to a neural processing unit of a second layer of the ANN 14, which immediately succeeds the first layer. Thereby, the ANN 14 has a layer structure which includes an input layer 19, at least one intermediate layer 20 (also denoted as hidden layer) and an output layer 21.

It has been shown that using the ANN 14, it is possible to efficiently and reliably classify textiles which are under treatment, so that operating parameters can be adapted for ensuring proper treatment of the textile, and which eliminate the risk of damaging the textile.

In the exemplary embodiment, the ANN 14 is preferably previously trained by an external computing system, using images from a database and associated their known textile classifications. The trained ANN is then stored in the textile treatment device 1.

The higher the number of images used for the training of the ANN, the better the performance of the ANN for classifying a given textile from which an image is taken by the image sensor arranged in the textile treatment device 1.

Figure 2B:
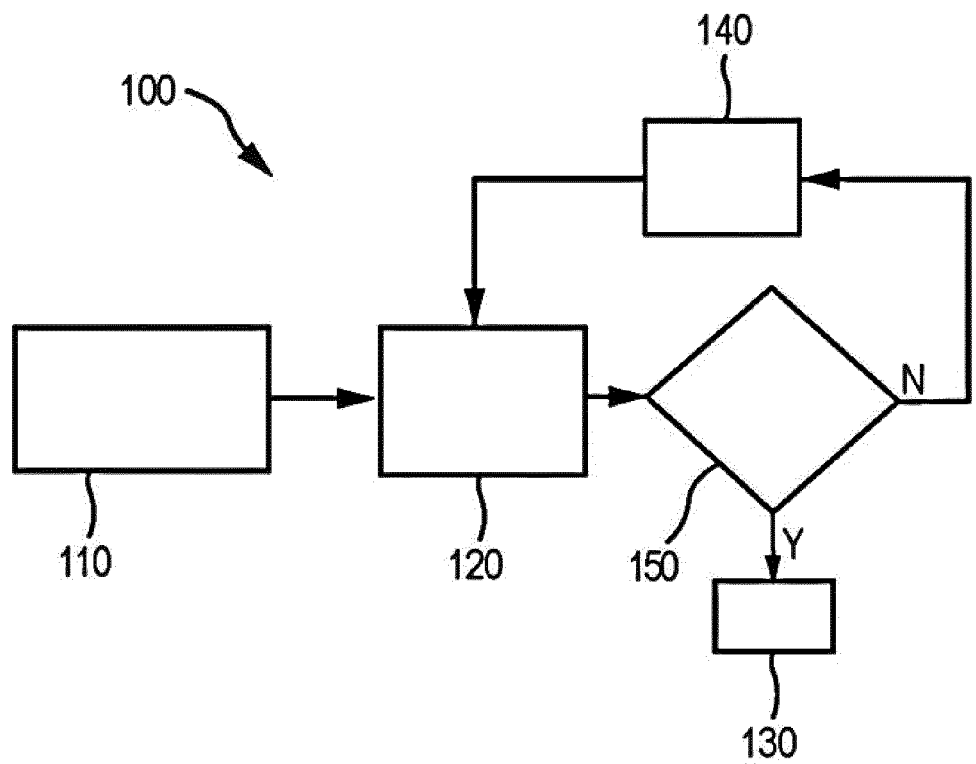

An exemplary training process 100 for training the ANN is schematically illustrated in FIG. 2B.

The training process 100 leads to a weight correction of the connection weights 18 (shown in FIG. 2A) of the ANN 14. The training process 100 is iterative.

In a first iteration, the connection weights of the ANN are initialized to small random values. An input of sample images of known textiles is provided in step 110 as an input to the ANN.

The ANN classifies the input in step 120. Based on a comparison between the classification of the input and the known textiles, it is determined in decision step 150, whether the classification is performed with a sufficient accuracy.

If the classification is performed with a sufficient accuracy (decision step 150:Y), the training process 100 is ended in step 130.

If the classification is not performed with a sufficient accuracy (decision step 150:N), the connection weights of the ANN are adjusted in step 140. After the adjustment of the connection weights, a further classification 120 of the same or of different known input samples is performed.

In the illustrated exemplary embodiment, the operations of the training process is preferably performed in an external computing system 23 (shown in FIG. 1), which is external to the textile treatment device 1. The external computing system 23 may include, but is not limited to:

at least one remote computer: for example a computer to which a user does not have physical access. By way of example, the user accesses the remote computer via a network.
at least one network computer,
at least one cloud computer,
a mobile phone,
a smart phone, or
a desktop computer.

Using the external computing system 23, it is possible to perform a faster and more accurate training of the ANN, compared to conducting this same training on the textile treatment device 1. However, it is also possible that the training process is performed by the textile treatment device 1, if the control unit 8 has sufficient computational resources.

As is illustrated in FIG. 1, the textile treatment device 1 includes a communication system 22, for connecting the textile treatment device 1 to the external computing system 23, for example via a network 24.

Further, the network 24 may include the Internet (INT) and an Intranet which is a wired or wireless local area network (WLAN).

It is also possible that the textile treatment device 1 is connectable to the external computing system 23 via any other transmission medium defining a wireless and/or wire-based transmission.

The textile treatment device 1 is adapted to transmit to the external computing system 23, using the communication system 22, images taken by the image sensor, as well as an associated textile classification.
In case the user is of the opinion that the algorithm did not correctly identify the classification of the textile, the user can manually enter a user input (via an interface that will be described later) corresponding to a corrected textile classification. The user input corresponds to a different classification of the textile which deviates from the classification of the textile obtained by the control unit 8. The corrected textile classification (also called user-specified classification) can not only be used by the device 1 to control an operating parameter of the device accordingly, but also be sent by the communication system 22 and used by the external computing system 23 as input for a new training of the algorithm, as similarly described along with FIG. 2B.

The textile treatment device 1 includes a user interface 25 (shown in FIG. 1) for receiving a user input from a user who is treating the textile. As previously described, the user input corresponds to a corrected textile classification.
For example, the user interface 25 allows the user:
entering letters and/or numbers for writing the name of the corrected textile classification user is considering, and/or
pressing at least one button (or key) associated to the corrected textile classification user is considering, and/or
selecting the corrected textile classification user is considering, among a list of proposed textile classifications displayed on a screen.

The user-specified classification may include an assignment of the textile to at least one pre-defined class as described previously.

The user-specified classification may correspond to a classification of the textile determined based on the user's knowledge only, or user's own appreciation, or based on a guidance from various indications such as content of the care label (also denoted as laundry tag) of the textile, such as "wool", "nylon", "linen" or "cotton".

Preferably, any of the textile treatment devices according to the invention is adapted to store a plurality of user-specified classifications (i.e. corresponding to different classifications compared to the initial textile classifications obtained by the textile treatment device), and each of the associated taken images, before transmission to the external computing system 23.

Sending a plurality of manually corrected textile classification can advantageously be used by the external computing system as input for a new training of the algorithm.

Preferably, the textile treatment device is adapted to receive, from the external computing system (23), using the communication system 22, an updated version of the algorithm.

If the updated version of the algorithm is an improved version of the algorithm initially stored, for example an improved version obtained after a new training, the textile classification is more accurate and robust.

In the exemplary embodiment, which is illustrated in FIG. 1, the ANN is configured as a convolutional neural network (CNN).

Figure 3:
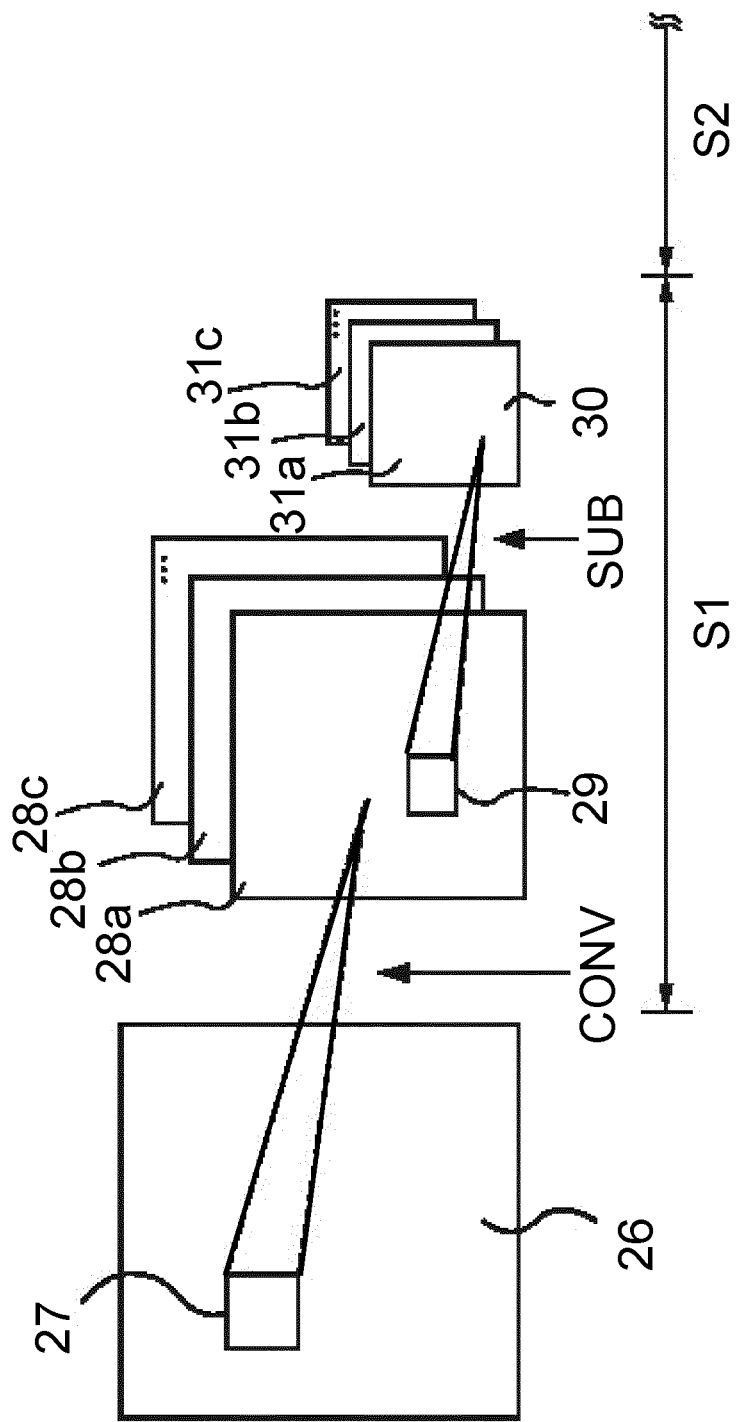

FIG. 3 shows an exemplary configuration of the CNN. A convolutional layer is configured to perform a convolution CONV of an input image 26 provided to the convolutional layer.

Using a CNN as a classifier is relatively computationally less demanding. In particular, substantially instant classifications can be generated by a CNN running on low-computational resources hardware. This also contributes to make possible the integration of the image sensor and the control unit within the portable textile treatment device, for textile classification.

As mentioned above, an advantage of executing a CNN is that the computational resources are relatively low compared to more traditional image processing algorithms, which makes its execution in the textile treatment device easier, without the need to have a control unit having very high computational resources. The term "convolutional neural network" may be defined to mean an ANN having at least one convolutional layer. A convolutional layer may be defined as a layer which applies a convolution to a layer which immediately precedes the convolutional layer. The convolutional layer may include a plurality of neural processing units, wherein each of the neural processing units receives inputs from a pre-defined section of the preceding layer. The pre-defined section may also be called a local receptive field of the neural processing unit. The distribution of weights within the pre-defined section may be the same for each neural processing unit in the convolutional layer. In addition to the convolutional layers, the CNN may include one or more subsampling layers and/or one or more normalization layers.

In the textile treatment device according to the invention, a field of view of the image sensor is in the range 1×1 mm to 5×5 mm. This field of view corresponds to the minimal dimension, taken on the textile, and that needs to be imaged to capture sufficient details of the textile structure.

More generally, a field of view of the taken image is in the range of 1 mm$^2$ to 25 mm$^2$ of a rectangular or squared area with at least 1 mm in one dimension. However, a larger field of view could also be considered.
Choosing the field of view in this range allows taking an image containing sufficient details of the textile, in particular the weaving pattern and/or size of yarn and interlacing fibers.
Taking a picture with a field of view smaller than the lower value of this range would not allow capturing sufficient details of the textile.
On the contrary, taking a picture with a field of view larger than the upper value of this range would only allow capturing redundant information on the details of the textile, given the periodic structure of the weaving pattern of the textile. This would result in increasing the computational resources for no significant added benefits in terms of textile classification.

Alternatively, images having field of view in this range can be obtained from an image having a larger field of view, followed by an appropriate down-sampling or downsizing.

Preferably, a resolution of the input image 26 given as input of the algorithm defines a square array of pixels in the range 64×64 pixels and 320×320 pixels.

Choosing the resolution in this range allows sampling a given field of view with sufficient details of the textile, while limiting the computational resources.

Preferably, a resolution proportional to the field of view can be chosen.

Images having resolution in this range can directly be obtained from the image sensor having the same resolution.

Alternatively, images having resolution in this range can be obtained from an image sensor having a better resolution, followed by an appropriate down-sampling or downsizing.

A convolutional layer applies a convolution operation to the input, passing the result to the next layer. A convolution layer includes a plurality of neural processing units. Each of the neural processing units receives inputs from an input section 27 of the input image 26, which is shifted during the convolution operation.

The input section 27 may correspond to a two-dimensional array of pixels, for example a rectangular or squared section of the input image 26, such as, for example, a cluster of 3×3 or 4×4 or 5×5 pixels.

The input section 27 may also be denoted as a local receptive field for the neural processing unit. The neural processing unit may be configured to process the a section 27 of the input image 26 using weights that form a convolution matrix or kernel matrix which is multiplied with the input section 27. In other words, the convolutional layer performs an element-wise multiplication of the values in the kernel matrix with the pixel values of the input section. The multiplications are all summed up to obtain a single number. Each neural processing unit of the convolutional layer may have the same weight values within the kernel matrix. This concept is known as weight sharing. The convolution layer may have one or more dimensions. For each dimension, the convolution layer outputs a two-dimensional array 28a, 28b and 28c of values representing an output image.

The CNN may also include one or more subsampling layers SUB. Each of the subsampling layers may be arranged between two neighboring convolutional layers. The subsampling layer may be configured to perform a non-linear down-sampling on each of the output images 28a, 28b, 28c of the preceding convolutional layer which are input images of the subsampling layer. Thereby, the subsampling layer forms, for each of the input images 28a, 28b and 28c, a down-sampled output image 31a, 31b, and 31c.

Specifically, the subsampling layer partitions each of the input image 28a, 28b, 28c into a set of non-overlapping rectangular sub-regions and, for each of these sub-regions, outputs an output value which is determined by applying a non-linear function on each of the rectangular sub-regions. Several non-linear functions are conceivable to implement a subsampling layer. One of these functions is the so-called "max pooling" or generally pooling function. Using the "max pooling" function, the subsampling layer determines the maximum pixel value contained in a rectangular or squared sub-region.

In the exemplary CNN, which is illustrated in FIG. 3, the first two layers are a convolutional layer and a subsampling layer, which together form a first stage S1 of the CNN. This 1st stage is followed by one or more combinations of a convolutional layer and a subsampling layer.

This first stage S1 is followed by a second stage S2 during which final textile classification is performed.

Figure 3A:
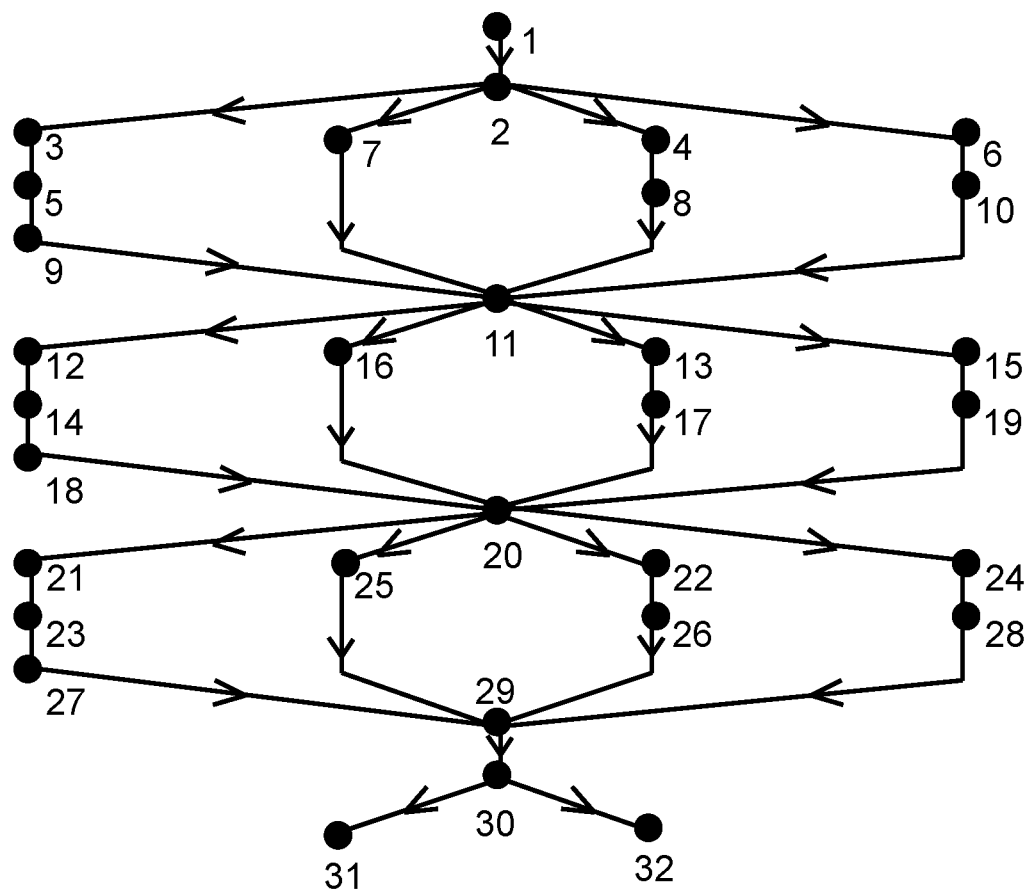

FIG. 3A schematically illustrates an example of a convolutional neural network (CNN) which is executed by a control unit of the textile treatment device according to the invention.

Every dot is a layer of the neural network. In total the network has 32 layers. The layer number is indicated by the first part of the name of every layer.

Layer 1 is simply the input image taken by the image sensor. The input image has a resolution of 96×96 pixels, and there is only 1 input image. This is indicated by "_96×96×1" in the name of layer 1.

Layer 2 is a convolutional layer that applies 20 different convolutions to its input. Its input is the output of layer 1 (so the 96×96×1 image). Its output are 20 images with a resolution of 48×48 pixels each. This is indicated by the "_48×48×20" in the name of layer 2.

The output of layer 2 (so the 20 images of 48×48 pixels) is used as the input for four different layers of the neural net, namely layer 3, layer 7, layer 4 and layer 6. Layer 3 applies 16 different convolution to the 20 images and creates 16 images with a resolution of 48×48. The output of layer 3 is used by layer 5.

Layer 7 applies 16 different convolutions to the 20 images and creates 16 images with a resolution of 24×24.

Layer 4 applies 16 different convolutions to the 20 images and creates 16 images with a resolution of 48×48.

Layer 6 is an average pooling layer, that converts the 48×48 image into a 24×24 resolution image.

Etc.

Layer 11 combines the outputs of layer 9, layer 7, layer 8 and layer 10.

Etc.

Etc.

At the end of the neural network are layer 31 and layer 32. They correspond to neural layers that take a weighted sum of their inputs to finally come up with an estimation of delicate/tough (layer 31) and an estimation of wool/silk/cotton/jeans/linen/ . . . (layer 32).

The different layers can be summarized as follows with self-explanatory labeling (the first number designating the corresponding layer number in FIG. 3A):

1: 1_input_1_96×96×1
2: 2_convolution2d_1_48×48×20
3: 3_convolution2d_5_48×48×16
4: 4_convolution2d_3_48×48×16
5: 5_convolution2d_6_48×48×16
6: 6_averagepooling2d_1_24×24×16
7: 7_convolution2d_2_24×24×16
8: 8_convolution2d_4_24×24×16
9: 9_convolution2d_7_24×24×16
10: 10_convolution2d_8_24×24×16
11: 11_merge_1_24×24×64
12: 12_convolution2d_12_24×24×32
13: 13_convolution2d_10_24×24×32
14: 14_convolution2d_13_24×24×32
15: 15_averagepooling2d_2_12×12×32
16: 16_convolution2d_9_12×12×32
17: 17_convolution2d_11_12×12×32
18: 18_convolution2d_14_12×12×32
19: 19_convolution2d_15_12×12×32

20: 20_merge_2_12×12×128
21: 21_convolution2d_19_12×12×64
22: 22_convolution2d_17_12×12×64
23: 23_convolution2d_20_12×12×64
24: 24_averagepooling2d_3_6×6×64
25: 25_convolution2d_16_6×6×64
26: 26_convolution2d_18_6×6×64
27: 27_convolution2d_21_6×6×64
28: 28_convolution2d_22_6×6×64
29: 29_merge_3_6×6×256
30: 30_globalaveragepooling2d_1_1×1×256
31: 31_binary_1×1×2
32: 32_nary_1×1×36

Figure 4:
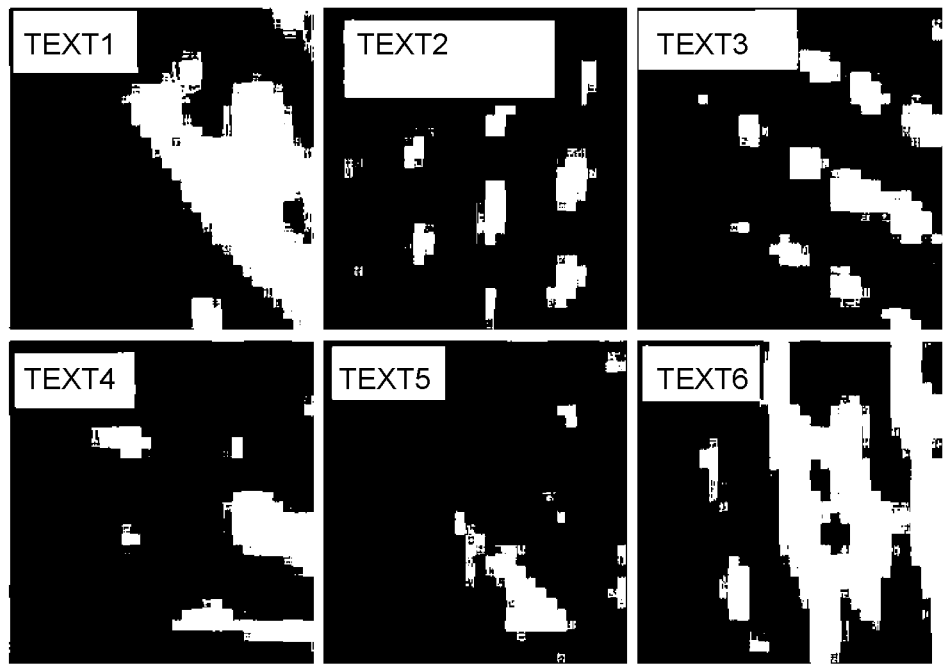

FIG. 4 shows various examples of sample images of textiles taken by the image sensor 5, and used as input of a CNN stored in the textile treatment device 1 to obtain a classification of the textile. As shown, different textiles have different structure, such as different weaving patterns.

The images which are shown in FIG. 4 result in mutually different classifications determined by the control unit of the textile treatment device:
TEXT1: cotton,
TEXT2: 65% polyester+35% cotton,
TEXT3: nylon,
TEXT4: jeans,
TEXT5: wool,
TEXT6: linen.

Images which are supplied as input to the CNN may correspond to grayscale images. However, it is also possible that color images are similarly used as input for the CNN.

The grayscale or color images of the image sensor may be directly supplied to the convolutional layer of the first stage of the CNN.

However, it is also possible that one or more filters are applied to the images generated by the image sensor, before the images are used as input for the CNN. Examples for such image processing filters include but are not limited to noise reduction, sharpening, gamma correction, softening, lens shading correction, lens deformation correction, lens chromatic aberration correction . . . .

Preferably, the textile treatment device 1 depicted in FIG. 1 includes an additional sensor 34. The additional sensor 34 corresponds to a motion sensor 34, which may be configured as a linear and/or rotary motion sensor. The motion sensor 34 may be a one or more axes motion sensor. The sensor 34 is in signal communication with the control unit 8.

The motion sensor 34 may be configured as an inertial motion sensor. The inertial motion sensor may include an accelerometer and/or a gyroscope.

The sensor output of the motion sensor 34 is representative of at least one motion parameter (e.g., orientation, displacement, velocity, and/or an acceleration). Depending on the sensor output of the motion sensor 34, the control unit 8 may control operation of the heatable soleplate 4 and/or operation of the steam generator 9.

By way of example, the heatable soleplate temperature may be raised at higher velocities and be decreased at a lower velocity.

Thereby, the heatable soleplate temperature may be raised above a fabric specific steady-state temperature (i.e. device is not moving) if sufficient velocity is detected.

Further, in order to avoid damages to the textile, the heatable soleplate temperature may be lowered to a "safe temperature" upon detection of prolonged absence of motion. These aspects will be described in more details in the following along with the flow chart of FIG. 10.

Additionally or alternatively, the control unit 8 uses the output of the motion sensor for controlling the least one operating parameter of the textile treatment device which is also controlled based on the classification of the textile. This allows for a more reliable control of the at least one operating parameter.

Figure 6:
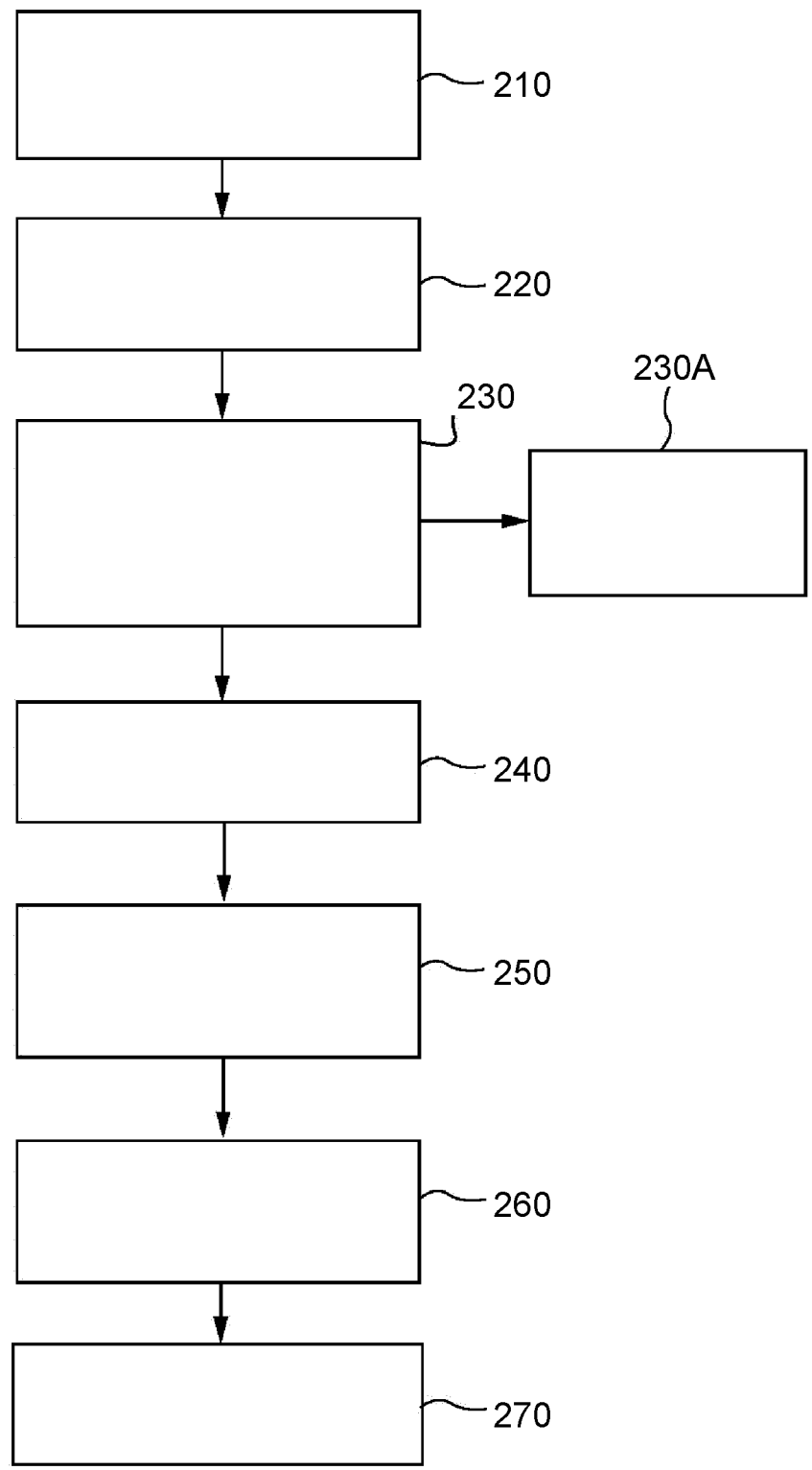
FIG. 6 depicts a first flowchart of a method according to the invention of operating a textile treatment device according to the invention.

FIG. 6 depicts a first flowchart of a method according to the invention of operating a textile treatment device according to the invention.

The textile treatment device corresponds to any textile treatment device described above.

An image of the textile to be treated is taken in step 210 using the image sensor. The image may be taken when the heatable soleplate of the textile treatment device is in planar and heat conductive contact with the textile to be treated.

A control unit, which is integrated within the textile treatment device executes in step 220 an algorithm, which is stored in the textile treatment device, using the image as an input of the algorithm.

The algorithm receives at its input, an image which has been acquired by the image sensor of the textile treatment device. Depending on the image, the control unit determines the classification of the textile by executing the algorithm.

The control unit controls in step 230, based on the obtained classification, at least one operating parameter of the textile treatment device.

The controlling step 230 of the at least one operating parameter may include controlling, using the classification of the textile, for example the temperature of the heatable soleplate 4. Thereby, it is possible to set the temperature of the heatable soleplate so that efficient treatment of the textile in step 230A is ensured and damaging of the textile is reliably avoided.

Additionally or alternatively, the step of controlling 230 the at least one operating parameter may include controlling, using the classification of the textile, an amount of steam to be supplied to the textile. This allows in step 230A an efficient treatment of the textile by using steam and reduces risks of damaging the textile.

As similarly described above, the accuracy and/or robustness of the textile classification can be improved by re-training the algorithm, for example by an external computing system.

In order to allow the external computing system to perform the operations for training again the algorithm, data are transmitted from the textile treatment device to the external computing system using a communication system 22 of the textile treatment device.

To this end, data are determined from:
  a user input received in step 240 via an interface 25 of the textile treatment device. The user input is indicative of a user-specified classification of the textile and/or indicative of a characteristic of the textile.
the image taken by the image sensor which is associated with the user-specified classification.

The data are transmitted in step 250 to the external computing system for re-training/optimizing the algorithm.

The external computing system performs in step 260 the operation for re-training the algorithm, using this data as a new set of training examples.

After the external computing system has completed these operations and that a corresponding new version of the algorithm is created, the textile treatment device receives in step 270 from the external computing system, the new version of the algorithm, in order to replace the algorithm that was initially stored in the textile treatment device by this new version of the algorithm.

The new version of the algorithm defines a computer program product taking the form of an executable file, an executable library, or a downloadable mobile application for mobile phone and/or smartphone. The computer program product contains instruction codes for obtaining a classification of a textile from an image of the textile. The instruction codes defines a convolutional neural network (CNN) having at least one convolutional layer, as described above.

Figure 10:
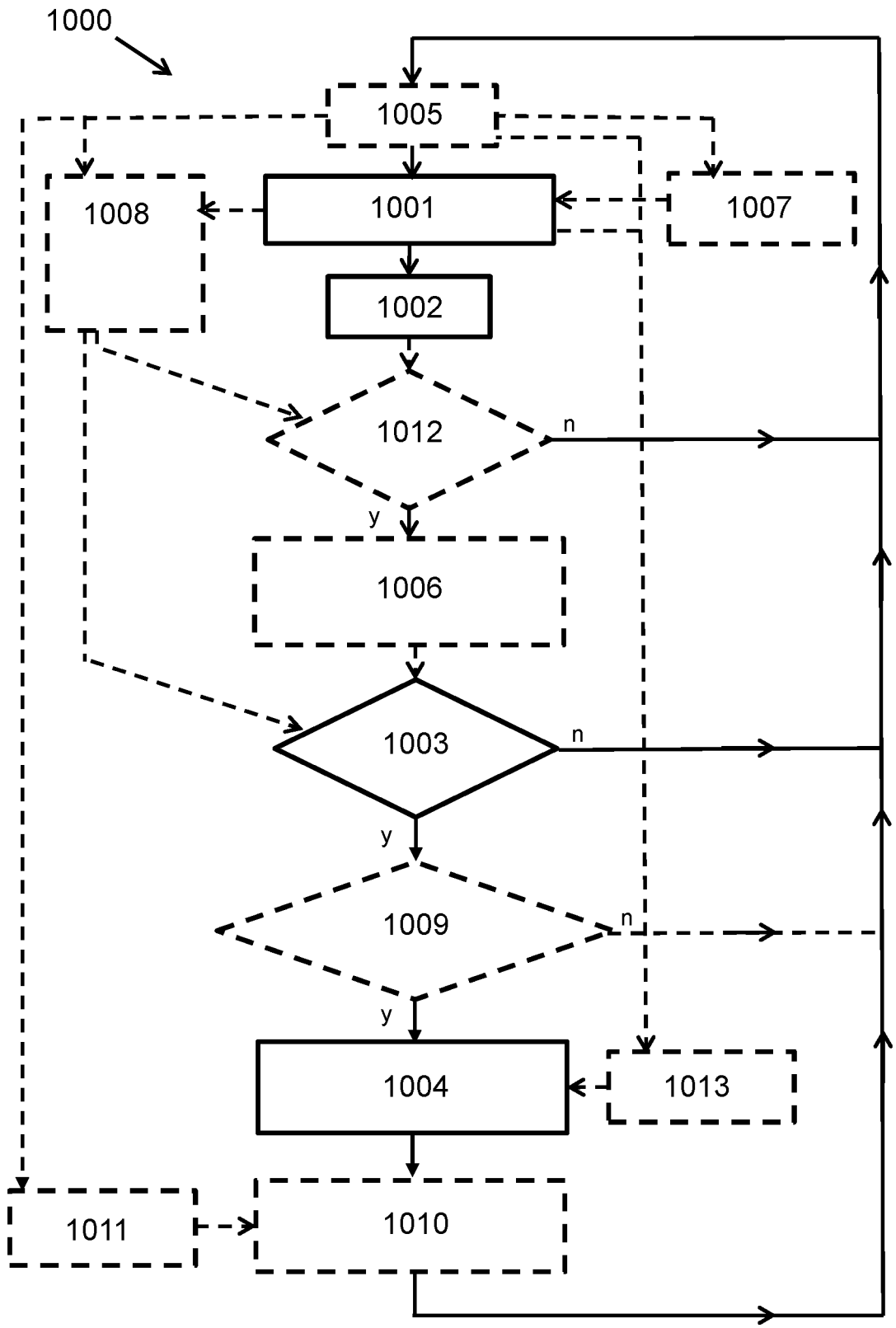
FIG. 10 depicts a second flowchart of a method according to the invention of operating a textile treatment device according to the invention.

FIG. 10 depicts a second flowchart of a method 1000 according to the invention of operating a textile treatment device according to the invention.

In this flow chart, steps/decisions steps represented in dotted lines corresponds to preferred or optional steps/decisions.

This method of treating a textile TXT is applicable to a textile treatment device as previously described along with FIGS. 1, 1a, Tb, 1h and comprising a heatable soleplate 4 intended to be in contact with the textile for treating the textile.

The method comprises:
a first step 1001 of setting a first temperature target TT1 for the heatable soleplate 4,
a step 1002 of detecting movement of said textile treatment device.

If the step 1002 of detecting movement did not detect any movement of said textile treatment device during more than a given first time duration D1, which is illustrated by the "y" branch of the decision step 1003, the method performs a step 1004 of actively decreasing the temperature of the heatable soleplate 4 up to reaching a first given temperature T1 having a value below said first temperature target TT1.

By "actively", it is meant that specific and proactive measures are taken to decrease temperature of the heatable soleplate 4. In other words, the decrease of temperature is caused by an active cooling-down of the soleplate temperature, and not by a passive cooling-down caused by the natural thermal exchange (or leakage) of the heatable soleplate 4 with its environment, such as with ambient air and/or contact with the textile.

Those steps improve the safety of the textile treatment device in case the textile treatment device would keep still, without any movement, for more than a given duration D1. By detecting this situation, the soleplate temperature is cooled down to avoid a too long contact between the soleplate and the textile (or garment) that might otherwise result in damaging the textile and/or creating risks of fire.

In particular, this method proves its efficiency in the situation where the temperature of the soleplate is set to a relatively higher temperature compared to nominal ironing temperature, considering the type of textile being treated, in particular textile classified as delicate, in order to have an even more efficient result of the ironing/steaming. Under such circumstances, it becomes crucial that safety measures are taken to actively and quickly cool-down the temperature of the soleplate if the textile treatment device is already without movement during more than a duration threshold D1 above which textile/garment would be damaged.

It is noted that "temperature target" refers to the desired soleplate temperature to be reached, by regulating electrical power provided to the soleplate in order to reach this targeted value of the soleplate temperature. Because soleplates have usually relative high thermal mass, reaching the temperature target is not instantaneous and may take a certain duration. In the flow chart of the method according to the invention, a step of setting the soleplate temperature to a given temperature target does not mean that at the exit of this step, the temperature target has been reached already.

If the step 1002 of detecting movement did detect some movement of said textile treatment device before the end of the given first time duration D1, which is illustrated by the "n" branch of the decision step 1003, the method returns to performing the first step 1001 of setting a first temperature target TT1 for the heatable soleplate 4.

By no movement, it is referred to a movement below a certain movement threshold, the movement threshold including a zero value.

For example, the first time duration D1 is in the range from a few seconds to a few minutes, preferably 30-90 seconds, preferably 60 seconds.

For example, the first temperature target TT1 is in the range 100-220 degree Celsius.

For example, the first given temperature T1 is in the range 120-170 degree Celsius, preferably in the range 140-150 degree Celsius.

Preferably, the temperature of soleplate is measured according to Standard IEC 60311.

It is noted that the first step 1001 can be done before the step 1002, or that the step 1002 can be done before the first step 1001.

Preferably, the method further comprises a step 1005 of detecting a classification of the textile being treated, wherein said classification is defined as:
a fabric type of the textile, or
a fabric level of delicateness for treating the textile.

This step 1005 is similar as the classification detection previously described along with the description. It is preferably performed before the first step 1001 of setting a first temperature target TT1 for the heatable soleplate 4.

Preferably, if the step 1002 of detecting movement did not detect any movement of said textile treatment device during more than a given second time duration D2, said second time duration D2 being less than said first time duration D1, which is illustrated by the "y" branch of the decision step 1012, the method performs a second step 1006 of setting a second temperature target TT2 for the heatable soleplate 4, said second temperature target TT2 being less than said first temperature target TT1.

This second step 1006 of setting a second temperature target TT2 for the heatable soleplate 4 constitutes an additional safety measure. Indeed, by setting the temperature target of the soleplate to a lower value compared to the first temperature target TT1, the soleplate will start to passively cool-down by natural thermal exchange (or leakage) of the heatable soleplate 4 with its environment, such as with ambient air and/or contact with the textile. Under this circumstances, and if at the end the textile treatment device remains without any movement up to reaching the first time duration D1, the step 1004 of actively decreasing the temperature of the heatable soleplate 4 could be done quicker, considering that when the step 1004 is performed, the soleplate temperature has already decreased passively before.

If the step 1002 of detecting movement did detect some movement of said textile treatment device before the end of the given second time duration D2, which is illustrated by the "n" branch of the decision step 1012, the method returns to performing the first step 1001 of setting a first temperature target TT1 for the heatable soleplate 4.

For example, the second time duration D2 is in the range from a few hundreds of milliseconds to a few tens of seconds, preferably 5-20 seconds, preferably 10 seconds.

It is noted that if the second time duration D2 is in the order of a few hundreds of milliseconds, this means that the step 1006 of setting a second temperature target TT2 for the heatable soleplate 4 is triggered almost instantaneously.

Preferably, the method comprises a step 1007 of associating a value to said first temperature target TT1 depending on said classification.

Preferably, the value of said first temperature target TT1 for the heatable soleplate 4 is as follows:
- in the range 100-180 degree Celsius, preferably 160 to 180 degree Celsius, if the fabric level of delicateness is classified as delicate,
- in the range 181-220 degree Celsius, preferably 190-210 degree Celsius, if the fabric level of delicateness is classified as tough.

Preferably, the method comprises a step 1013 of associating a value to said first given temperature T1 depending on said classification and said first temperature target TT1, for example as follows:
- in the range 120-150 degree Celsius, preferably 140-150 degree Celsius, if the fabric level of delicateness is classified as delicate, and the first temperature target TT1 is in the range 160-180 degree Celsius,
- in the range 140-170 degree Celsius, preferably 160-170 degree Celsius, if the fabric level of delicateness is classified as tough, and the first temperature target TT1 is in the range 181-220 degree Celsius.

Preferably, the method further comprises a step 1008 of associating a value to said first time duration D1 and/or said second time duration D2, depending on said first temperature target TT1 and/or said classification.

Since a preferred requirement is that the textile has to resist to heat without damage if the textile treatment device is not moving during this time duration D1 and/or D2, this requirement is more easily fulfilled if value of D1 and/or D2 are determined based on the first temperature target TT1 and/or said classification.

A delicate fabric can resist to heat damage for a longer time duration if the soleplate temperature is lower, and a tough fabric can resist to heat damage for a longer time duration if the soleplate temperature is higher.

For a given classification of textile, this textile can resist to heat damage for a time duration that depends on a maximum soleplate temperature, and this maximum soleplate temperature is relatively lower if dealing with a delicate fabric and relatively higher if dealing with a tough fabric.

Preferably, the step 1004 of actively decreasing the temperature of the heatable soleplate 4 is performed only if the temperature of the heatable soleplate 4 is above said first given temperature T1. This is illustrated by the "y" branch of the decision step 1009.

The reason for having this step is that at the end of the total duration D1 where the textile treatment device is not moving, the heatable soleplate 4 passively lost sufficient thermal energy by thermal exchange (or leakage) of the heatable soleplate 4 with its environment, such as with ambient air and/or contact with the textile. In that case, the temperature of the soleplate reached at the end of the total duration D1 is sufficiently low for not performing e step 1004 of actively decreasing the temperature of the heatable soleplate 4. This is illustrated by the "n" branch of the decision step 1009.

Preferably, the step 1004 of actively decreasing the temperature of the heatable soleplate 4 comprising injecting an amount of water in a steam chamber 10 being in thermal contact with said heatable soleplate 4.

Injecting an amount of water in a steam chamber 10 constitutes a fast and effective way to actively cool-down temperature of the heatable soleplate 4. By introducing water into the steam chamber of the soleplate, the latent heat of vaporization of water is utilized to lower the temperature of the soleplate, when the water turns into steam.

Moreover, this approach allows to re-use hardware feature of the textile treatment device, namely the steam chamber 10, that is used in other circumstances for generating steam over the textile, so is a cost-effective approach.

Preferably, injecting an amount of water in said steam chamber 10 comprises injecting water with a continuous flow rate.

Preferably, continuous flow rate has a value between 4-25 g/mn, preferably 15 g/mn.

Preferably, injecting an amount of water in said steam chamber 10 comprises injecting water with different successive flow rates.

Preferably, the different successive flow rates comprise a first flow rate in the range 2-10 g/mn during a first time duration in the range 20-60 seconds, followed by a second flow rate in the range 5-25 g/mn during a second time duration in the range 10-40 seconds.

The value of those ranges for the water flow, either continuous or consecutive, is an optimal compromise between:
- too little amount of water introduced in the steam chamber that would not allow a sufficient fast decrease of the soleplate temperature, which in turn might damage the textile,
- too high amount of water introduced in the steam chamber which would for sure allow a fast decrease of the soleplate temperature, but would create a non-friendly user experience by lot of steam being generated around the textile treatment device, and might also result in an harmful fast calcification of the steam chamber.

The amount of water injected in the steam chamber depends on the mass and temperature of the soleplate, since during the active decrease of soleplate temperature, the power to soleplate is preferably interrupted.

The amount of water used for actively decreasing the soleplate temperature depends on the mass of the soleplate, the initial temperature TT1 of the soleplate, and the desired final temperature T1 of the soleplate. Those parameters allow to determine the heat energy needed to be removed through water evaporation by the soleplate. Typically, the soleplate has a mass between 0.3 kg to 0.6 kg.

Preferably, the method further comprises a step 1010 of passively decreasing the temperature of the heatable soleplate 4 up to reaching a second given temperature T2 having a value less than said first given temperature T1.

This step is advantageous to counter situation where a rebound in soleplate temperature at the end of active cooling could happen due to local heat concentration or uneven temperature distribution in the soleplate.

Preferably, the method further comprising a step 1011 of associating a value to said second temperature T2, said value depending on said classification.

Preferably, the value of said second temperature T2 is in the range 105-145 degree Celsius if the fabric level of delicateness is classified as delicate, and in the range 125-165 degree Celsius if the fabric level of delicateness is classified as tough.

The invention also relates to a computer program product taking the form of an executable file, or an executable library, or a downloadable mobile application for mobile phone and/or smartphone, the computer program product containing instruction codes for implementing the method described above along with FIG. 10.

The various steps of the method 1000 according to the invention can be implemented in a textile treatment device as depicted in FIGS. 9A, 9B, 9C, 9D and comprising means for actively decreasing the temperature of the heatable soleplate 4.

In addition to already provided description along with FIGS. 9A, 9B, 9C, 9D, the control unit 8 is adapted to trigger said means for actively decreasing the temperature of the heatable soleplate 4 if the motion sensor 34 did not detect any movement of said textile treatment device during more than a given first time duration D1, for actively decreasing the temperature of the heatable soleplate 4 up to reaching a first given temperature T1 having a value below said first temperature target TT1.

The value and range for T1 and TT1 have been described previously along with the method 1000 according to the invention.

Preferably, the means for actively decreasing the temperature of the heatable soleplate 4 comprise:
 the steam chamber 10 being in thermal contact with the heatable soleplate 4,
 the water supply 9a,
 a pump P2 controllable by the control unit 8, for pumping water from said water supply 9a into said steam chamber 10.

The pumping of water by the pump P2 is done with a continuous flow rate or successive different flow rates as described above.

Preferably, the textile treatment device also comprises a one-way valve OV1 arranged between said water supply 9a and said steam chamber 10, in order to prevent back flow of steam when water is injected in said steam chamber 10.

It is noted that this one-way valve OV1 could also be integrated within the pump P2.

Above-described means for actively decreasing the temperature of the heatable soleplate 4 implemented in a textile treatment device as depicted in FIG. 1 can also be implemented similarly in the textile treatment devices as previously described along with FIGS. 1A, 1B and 1H.

In the following, some aspects of the invention will be provided along with FIGS. 11 to 22, which are related to the thermal insulation of elements at the proximity of the heatable soleplate 4.

Those aspects of the invention apply to any portable textile treatment device having a heatable soleplate 4 comprising a soleplate opening H through which an image sensor is used to taking an image of the textile to be treated.

In particular, those aspects of the invention apply to the portable textile treatment devices described along with FIGS. 1, 1A, 1B, 1C, 1D, 1E, 1G, 1H and 5.

In the portable textile treatment devices according to the invention depicted along with FIGS. 11 to 22, the image sensor 5 (or 5b) is comprised in a module MD for taking an image of the textile to be treated through the soleplate opening H.

The module MD (and the control unit 8) is integrated within the portable textile treatment device.
Those portable textile treatment devices further comprises thermal insulation means arranged in-between the heatable soleplate 4 and the module MD for insulating the module MD from heat dissipated by the heatable soleplate 4.

Figure 11:
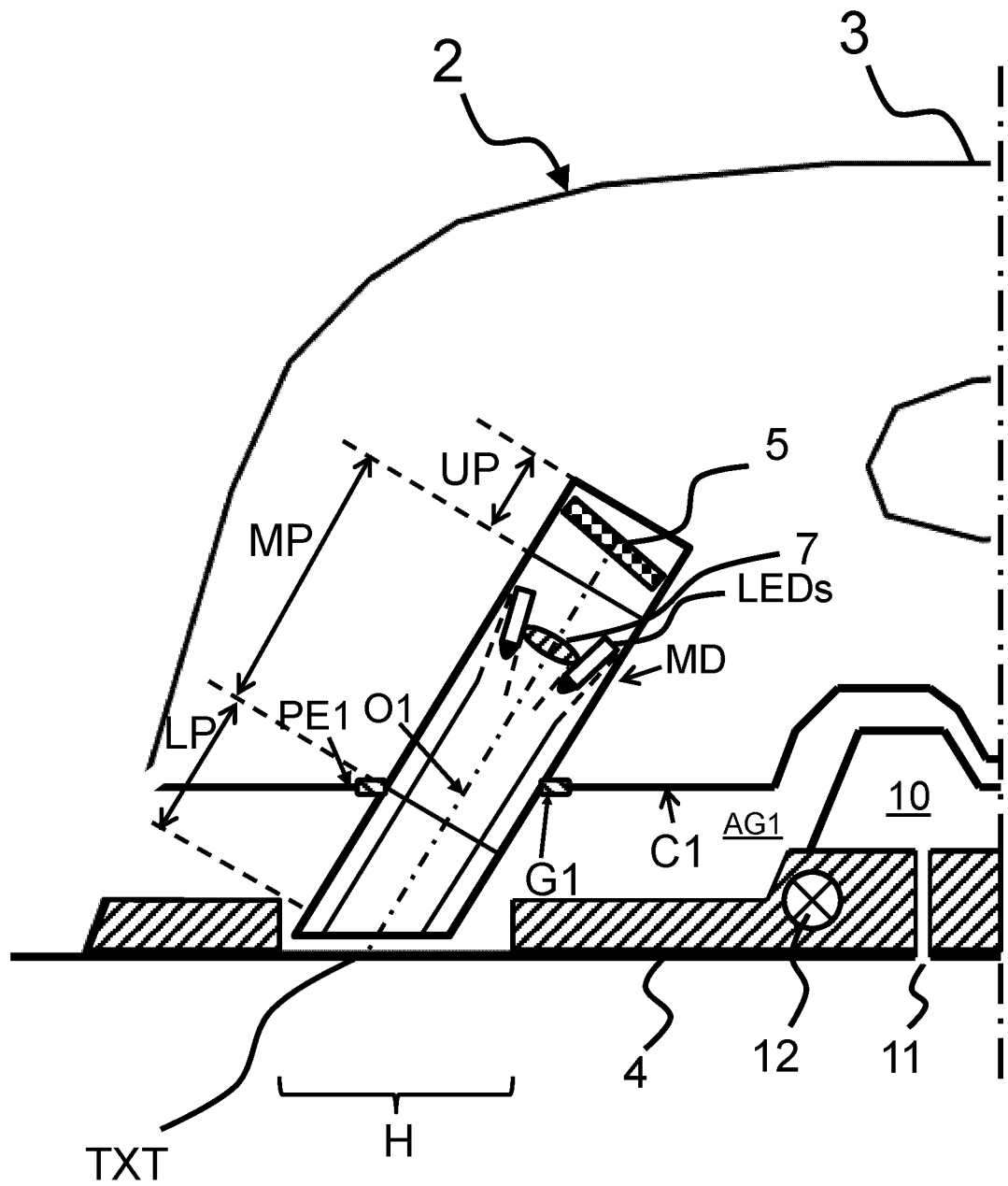
FIG. 11 depicts a third implementation of a device according to the invention.

FIG. 11 depicts a third implementation of a device according to the invention. This implementation is based on the implementation of FIG. 8, with the following differences:
the sensor 5 is integrated in the module MD.
preferably, the optical system 7 is also integrated in the module MD. In case an illumination system is used, the LEDs forming the illumination system are preferably also integrated in the module MD.

The module MD preferably takes the form of an elongated casing (for example a tubular shape) for conveniently arranging all necessary optical components inside.

The module MD comprises a lower portion LP, a middle portion MP and an upper portion UP.
Preferably, those three portions are made of the following material:
 the lower portion LP is made of a material having a low thermal conductivity: this limits the absorption by the lower portion of the module MD of the heat dissipated by the heatable soleplate 4,
 the middle portion MP is made of a material having a high thermal conductivity: this facilitates the dissipation of heat that would have accumulated in the module MD,
 the upper portion UP is made of a material having a low thermal conductivity: this limits the absorption by the upper part of the module MD of the heat dissipated by the heatable soleplate 4.

Alternatively, those three portions are made of the following material:
 the lower portion LP is made of a material having a high thermal conductivity,
 the middle portion MP is made of a material having a high thermal conductivity,
 the upper portion UP is made of a material having a high thermal conductivity.

Alternatively, those three portions are made of the following material:
 the lower portion LP is made of metal low thermal conductivity material,
 the middle portion MP is made of metal high thermal conductivity metal material,
 the upper portion UP is made of metal high thermal conductivity metal material.

Those three portions are for example assembled by using screws (not shown). For example, at least two of those three portions are molded as one element.

Preferably, a value for the low thermal conductivity is between 0.1 to 6 W/mK.

Preferably, a value for the high thermal conductivity is between 50 to 130 W/mK.

For example, any plastic material having a low thermal conductivity (or a high thermal resistance) can be used, such as Polyphenylene sulfide (PPS), and more specifically PPS having the reference Fortron 1140L4.

For example, any metal material having a high thermal conductivity (or a low thermal resistance) can be used, such as zinc alloy, in particular zinc alloy having the reference Zamak 3.

For example, any ceramic material having a low thermal conductivity (or a high thermal resistance) can be used, such as Steatite.

In the implementation of FIG. 11, the thermal insulation means comprise a first plastic cover C1 extending over the heatable soleplate 4. The first plastic cover C1 comprises a first opening O1, and the module MD extends into the first opening O1. The thermal insulation means also comprise a first gasket G1 arranged between the module MD and a first periphery PE1 of the first opening O1.

The first plastic cover C1 partially blocks the heat dissipated by convection by the heatable soleplate 4. The heat received by convection by the module MD is thus reduced.

In case steam is generated by the device, the first gasket G1 prevents (residual) steam that would enter the soleplate opening (H) from circulating around the middle portion MP and the upper portion UP of the module MD. This thus prevents that those portions get heated by steam.

Preferably, the thermal insulation means further comprise a first air gap AG1 arranged between the heatable soleplate 4 and the first plastic cover C1.

The first air gap AG1 creates an air insulation layer that further blocks the heat dissipated by convection by the heatable soleplate 4.

Figure 12:
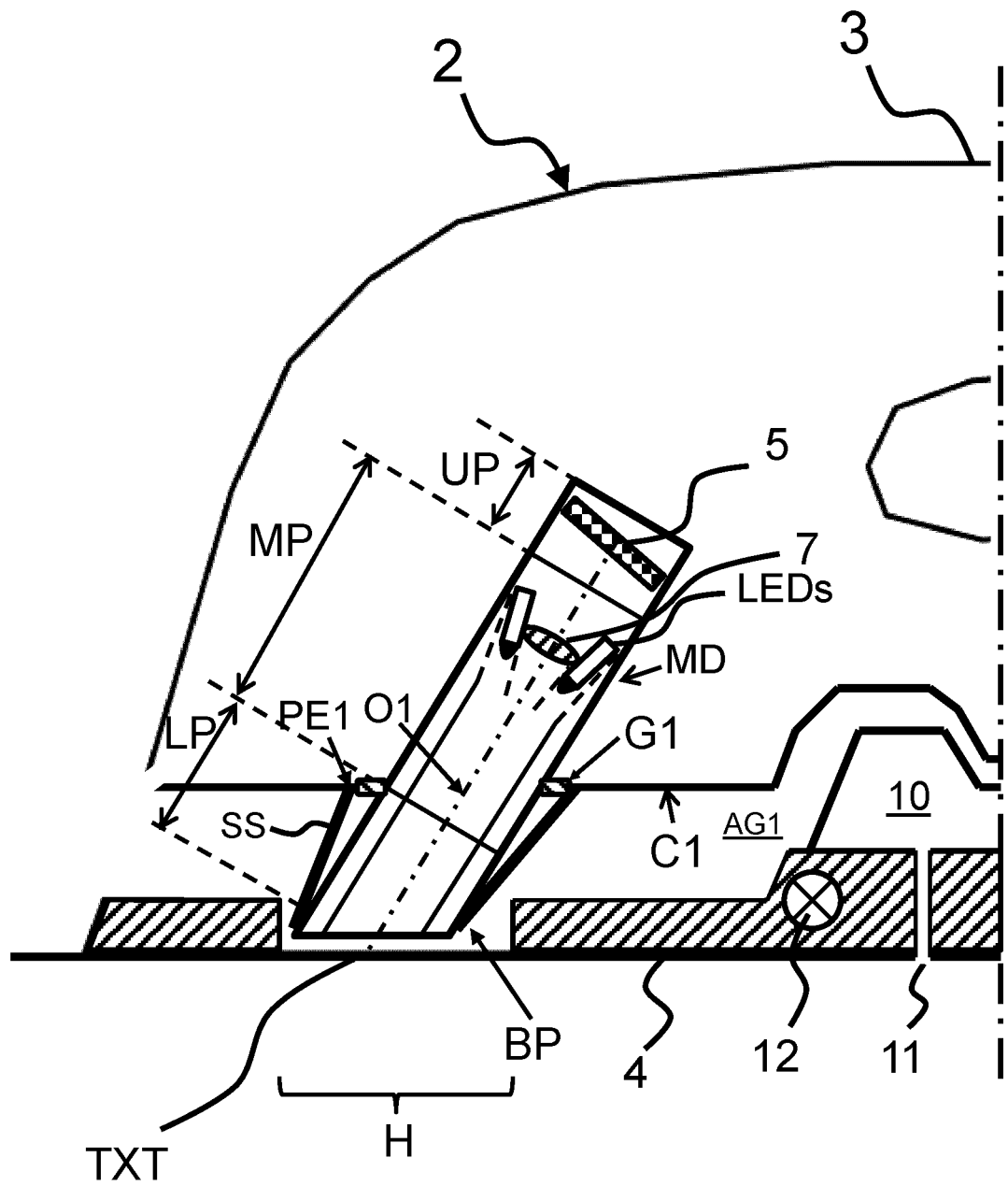
FIG. 12 depicts a fourth implementation of a device according to the invention.

FIG. 12 depicts a fourth implementation of a device according to the invention. This implementation is based on the implementation of FIG. 11, wherein the thermal insulation means further comprise a sheath SS arranged around the lower portion LP, for creating an air layer between the lower portion LP and the sheath SS.

The sheath SS creates an air insulation layer around the lower portion LP that further blocks the heat dissipated by convection by the heatable soleplate 4.

Moreover, in case steam is generated by the device, the sheath SS also shields the lower portion LP from being heated by (residual) steam that would enter the air gap between the soleplate and first plastic cover. Less thermal energy is thus absorbed by the module MD.

For example the sheath SS extends between a bottom periphery BP of the lower portion LP, and the first periphery PET of the first opening O1.

Preferably, the sheath SS may be integrally moulded with the first gasket G1, which facilitates the assembly around the module MD.

Figure 13:
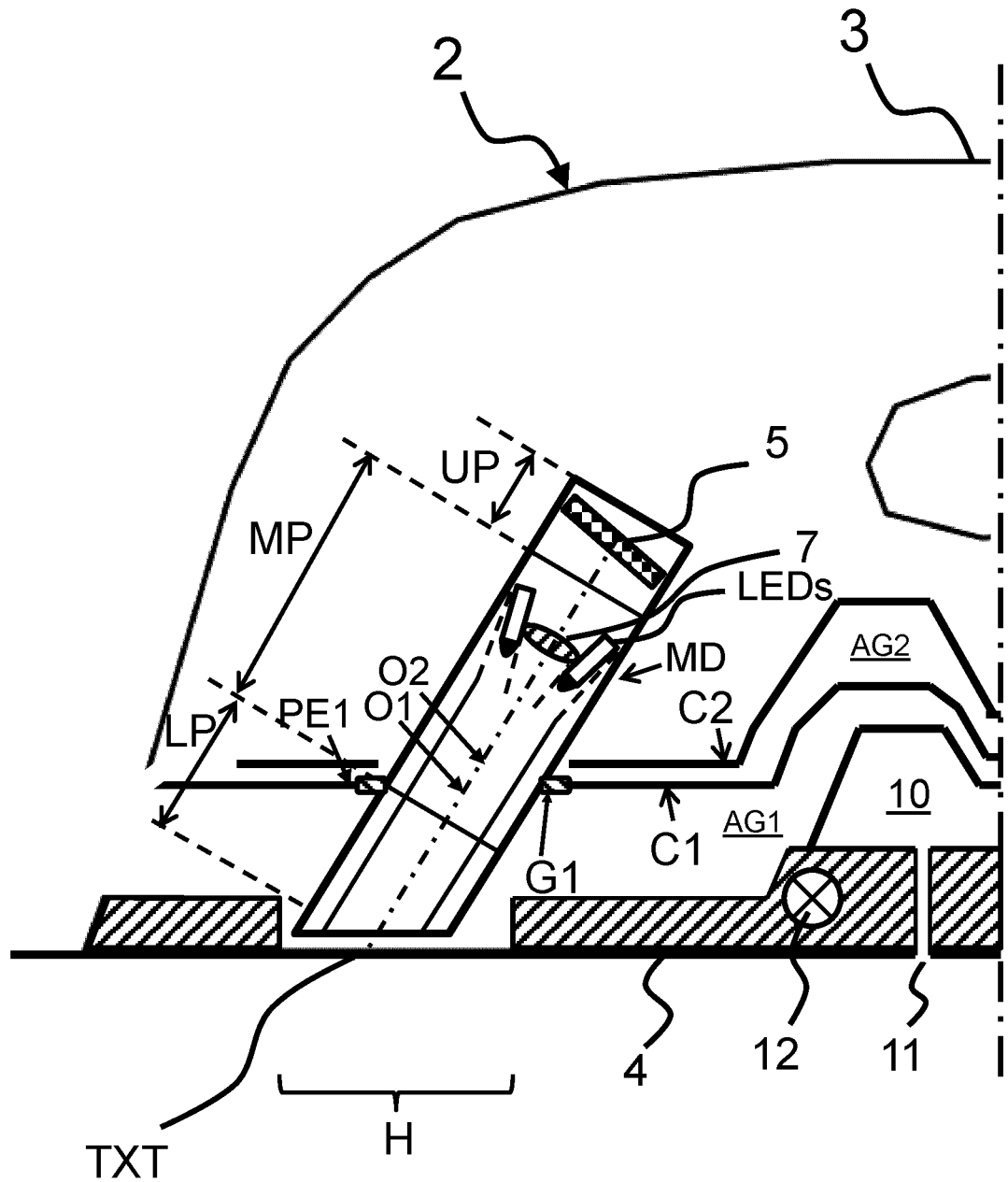
FIG. 13 depicts a fifth implementation of a device according to the invention.

FIG. 13 depicts a fifth implementation of a device according to the invention. This implementation is based on the implementation of FIG. 11, wherein the thermal insulation means further comprise a second plastic cover C2 extending over the first plastic cover C1. The second plastic cover C2 comprises a second opening O2. The module MD extends into the second opening O2.

The second plastic cover C2 partially blocks the heat dissipated by convection from the first plastic cover C1. The heat received by convection by the module MD is thus reduced.

Figure 14:
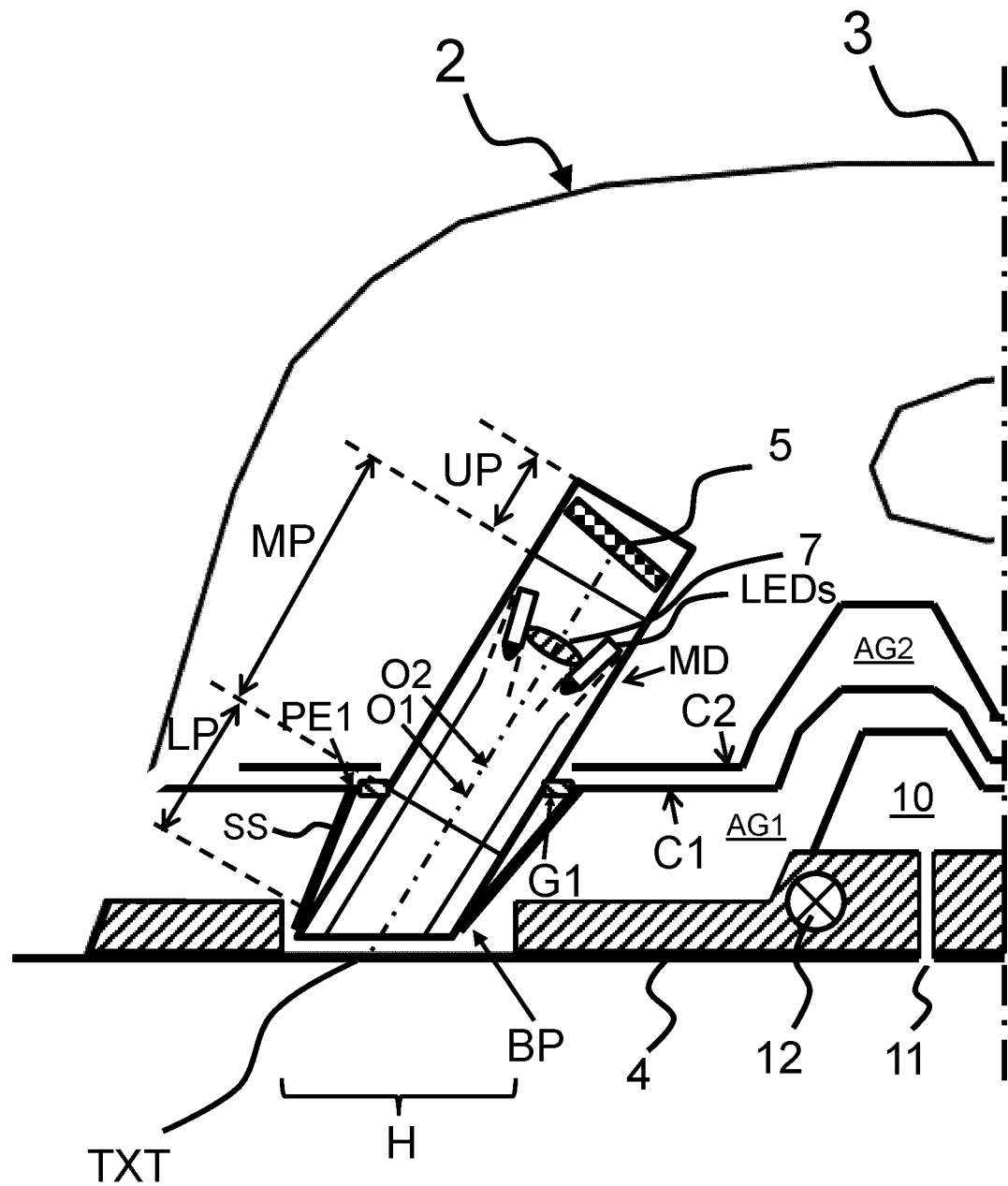
FIG. 14 depicts a sixth implementation of a device according to the invention.

FIG. 14 depicts a sixth implementation of a device according to the invention. This implementation is based on the implementation of FIG. 13, wherein the thermal insulation means further comprise the sheath SS arranged around the lower portion LP, for creating an air layer between the lower portion LP and the sheath SS, as described previously. Preferably, the sheath SS may be integrally moulded with the first gasket G1, which facilitates the assembly around the module MD.

Figure 15:
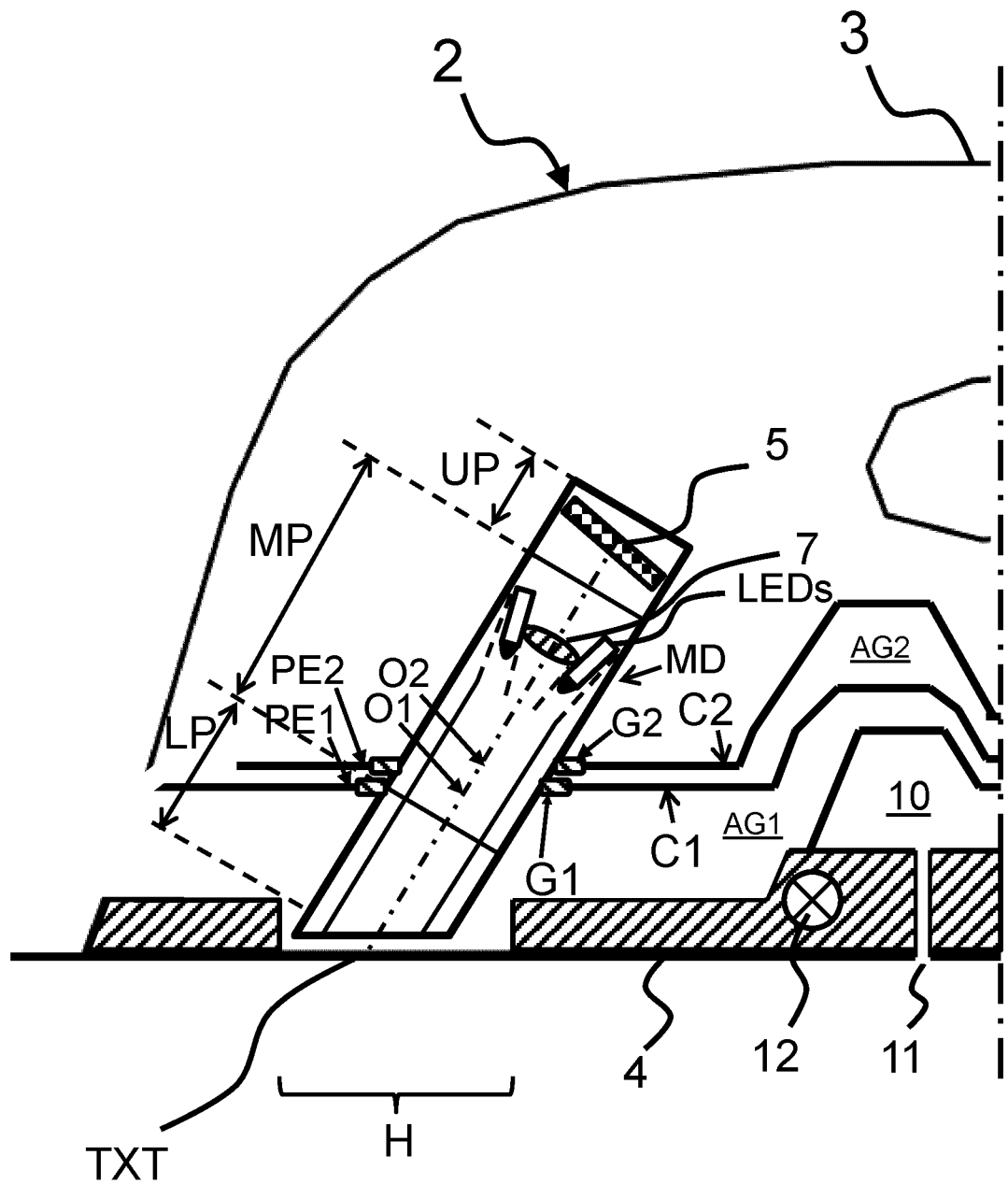
FIG. 15 depicts a seventh implementation of a device according to the invention.

FIG. 15 depicts a seventh implementation of a device according to the invention. This implementation is based on the implementation of FIG. 13, wherein the thermal insulation means further comprise a second gasket G2 arranged between the module MD and a second periphery PE2 of the second opening O2.

Preferably, the thermal insulation means further comprise a second air gap AG2 being arranged between the first plastic cover C1 and the second plastic cover C2.

The second air gap AG2 creates an air insulation layer that further blocks the heat dissipated by convection from the first plastic cover C1.

In case steam is generated by the device, the second gasket G2 prevents (residual) steam that would enter the second air gap (AG2) from circulating around the middle portion MP and upper portion UP of the module.

Figure 16:
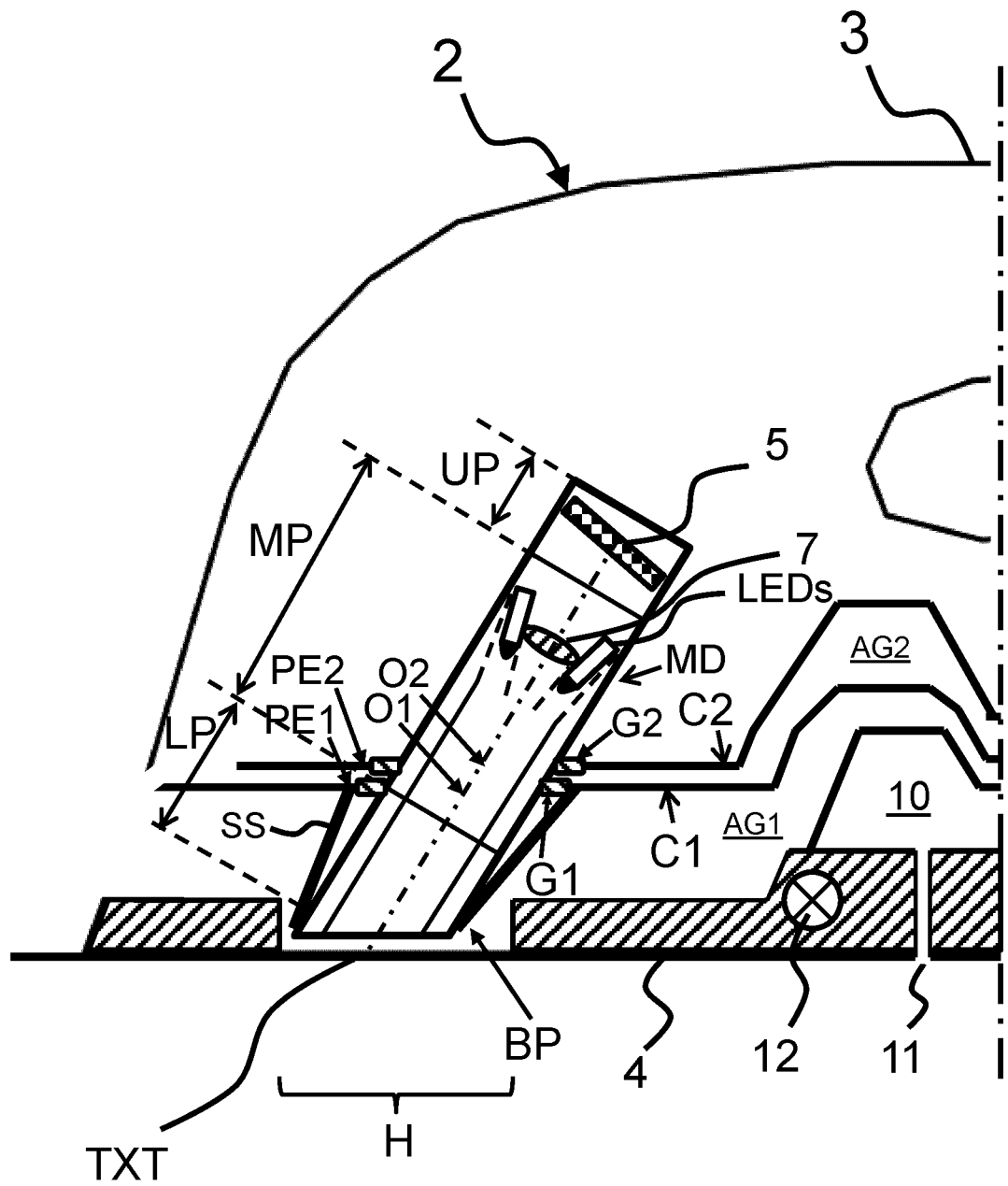
FIG. 16 depicts an eight implementation of a device according to the invention.

FIG. 16 depicts an eight implementation of a device according to the invention. This implementation is based on the implementation of FIG. 15, wherein the thermal insulation means further comprise the sheath SS arranged around the lower portion LP, for creating an air layer between the lower portion LP and the sheath SS, as described previously.

Preferably, the sheath SS may be integrally moulded with the first gasket G1, which facilitates the assembly around the module MD.

Figure 17A:
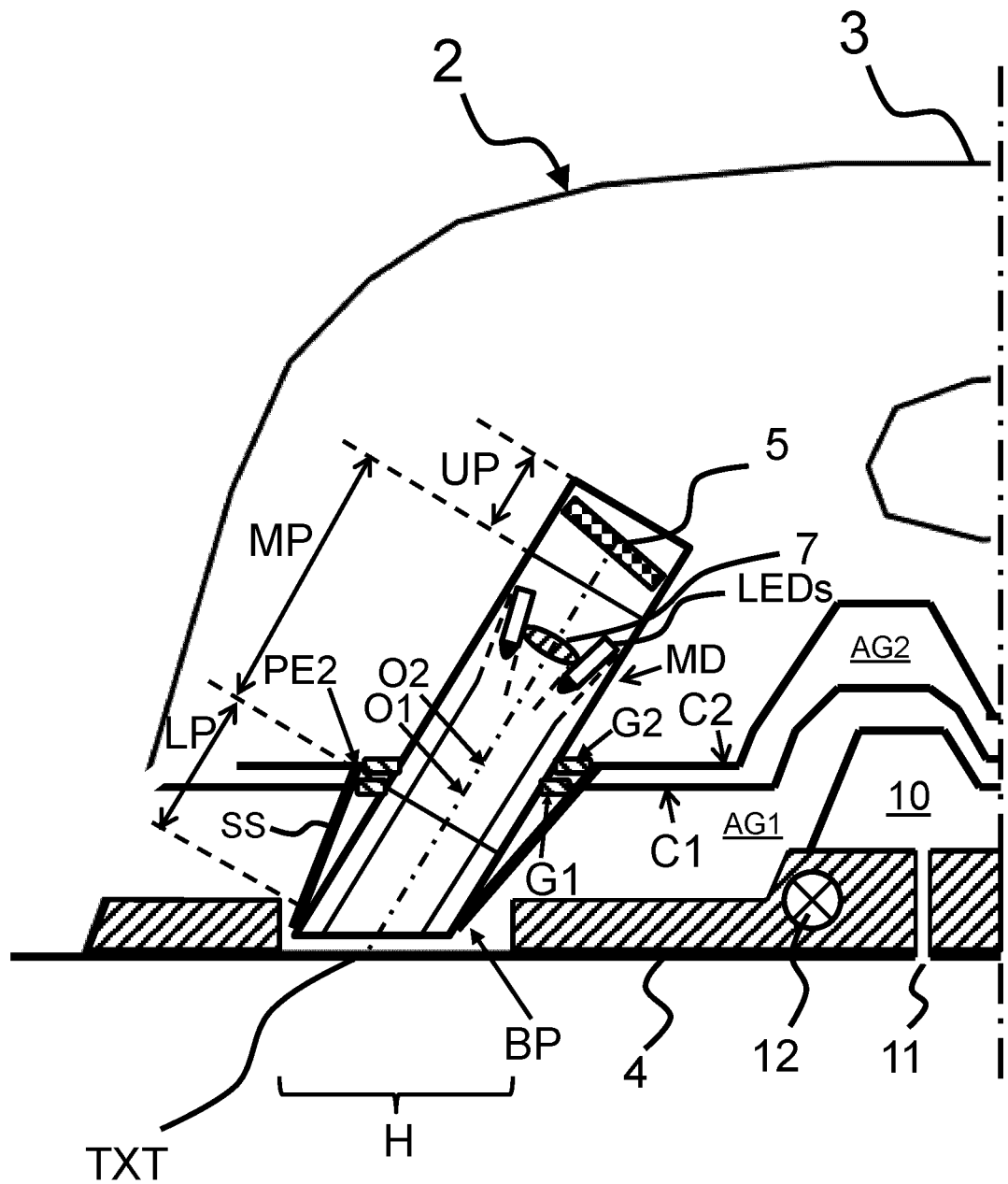
FIG. 17A depicts a ninth implementation of a device according to the invention.

FIG. 17A depicts a ninth implementation of a device according to the invention. This implementation is based on the implementation of FIG. 16. The lower portion LP further extends between the first opening O1 and the second opening O2. The sheath SS further extends around the lower portion LP between the first opening O1 and the second opening O2.

In case steam is generated by the device, the portion of the sheath SS extending between the first opening O1 and the second opening O2 prevents that the middle portion MP extending between the first opening O1 and the second opening O2 get heated by steam that would enter the second air gap AG2.

Preferably, the sheath SS may be integrally moulded with the first gasket G1 and/or the second gasket G2, which facilitates its assembly around the module MD.

Figure 17B:
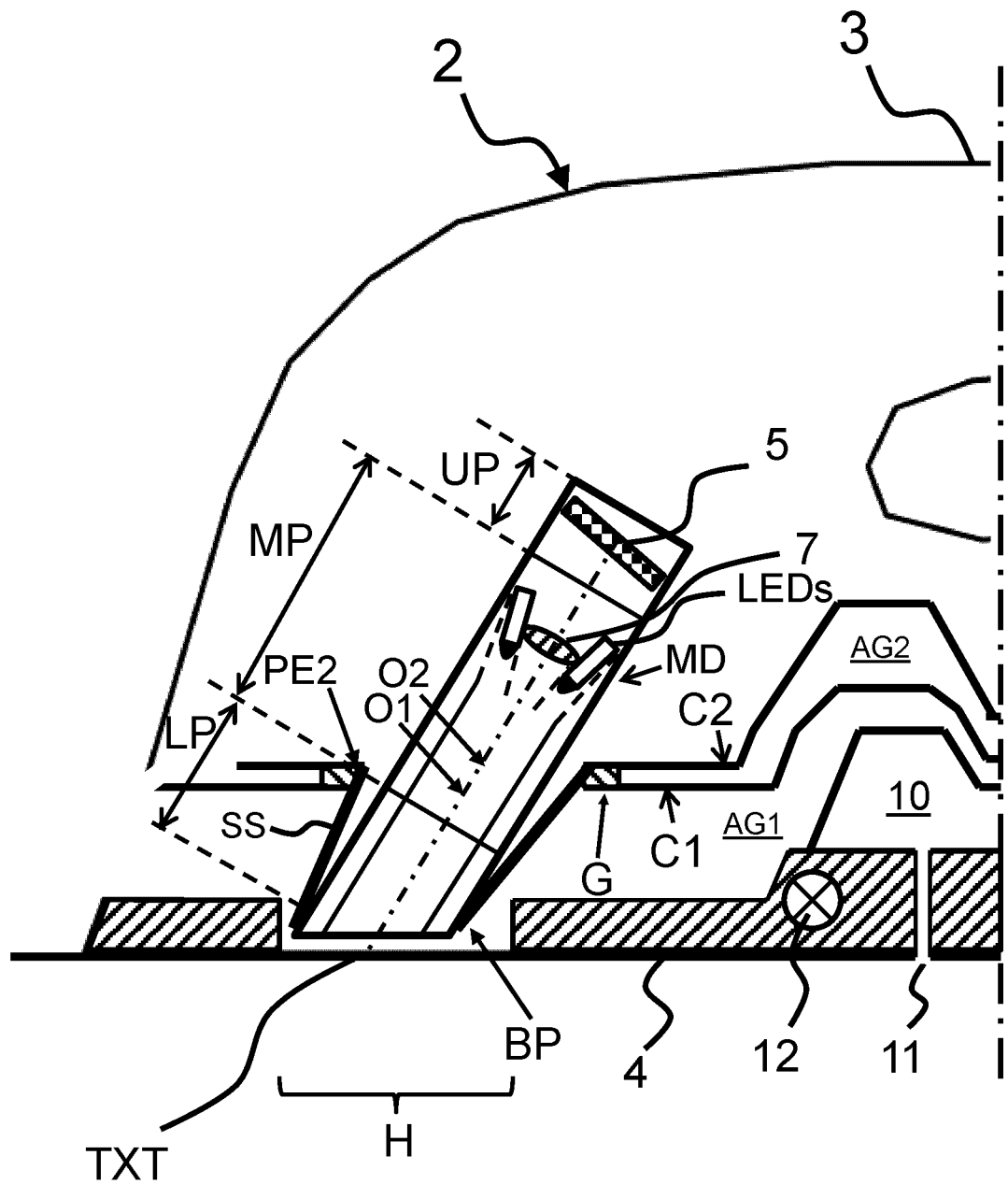
FIG. 17B depicts a tenth implementation of a device according to the invention.

FIG. 17B depicts a tenth implementation of a device according to the invention. This implementation is derived from the implementation of FIG. 17A. The first gasket G1 and the second gasket G2 of FIG. 17A are replaced by a unique gasket G arranged around the module MD. The gasket G is sandwiched between the first plastic cover C1 and the second plastic cover C2. The sheath SS is arranged around the lower portion LP for creating an air layer between the lower portion LP and said sheath SS.

Preferably, the sheath SS is arranged around the lower portion LP, between the bottom periphery BP and the gasket G.

Preferably, the sheath SS is integrally moulded with the gasket G, which facilitates the assembly around the module MD.

Alternatively, the sheath SS is arranged around the lower portion LP, between the bottom periphery BP and the first cover C1.

In terms of heat insulation, this tenth implementation is equivalent to the implementation of FIG. 17A, but is more advantageous in terms of assembling because the number of parts is less.

The sheath SS described above is preferably made of flexible material, being resilient, such as rubber. For example, the sheath SS is shaped as a bellows having a conical-truncated shape.

The gasket G1, G2 and G described above are preferably made of flexible material, being resilient, such as rubber. Since they are intended to extend around the module MD, their shape is preferably circular, for example flat ring-shaped or O-ring-shaped.

Figure 18:
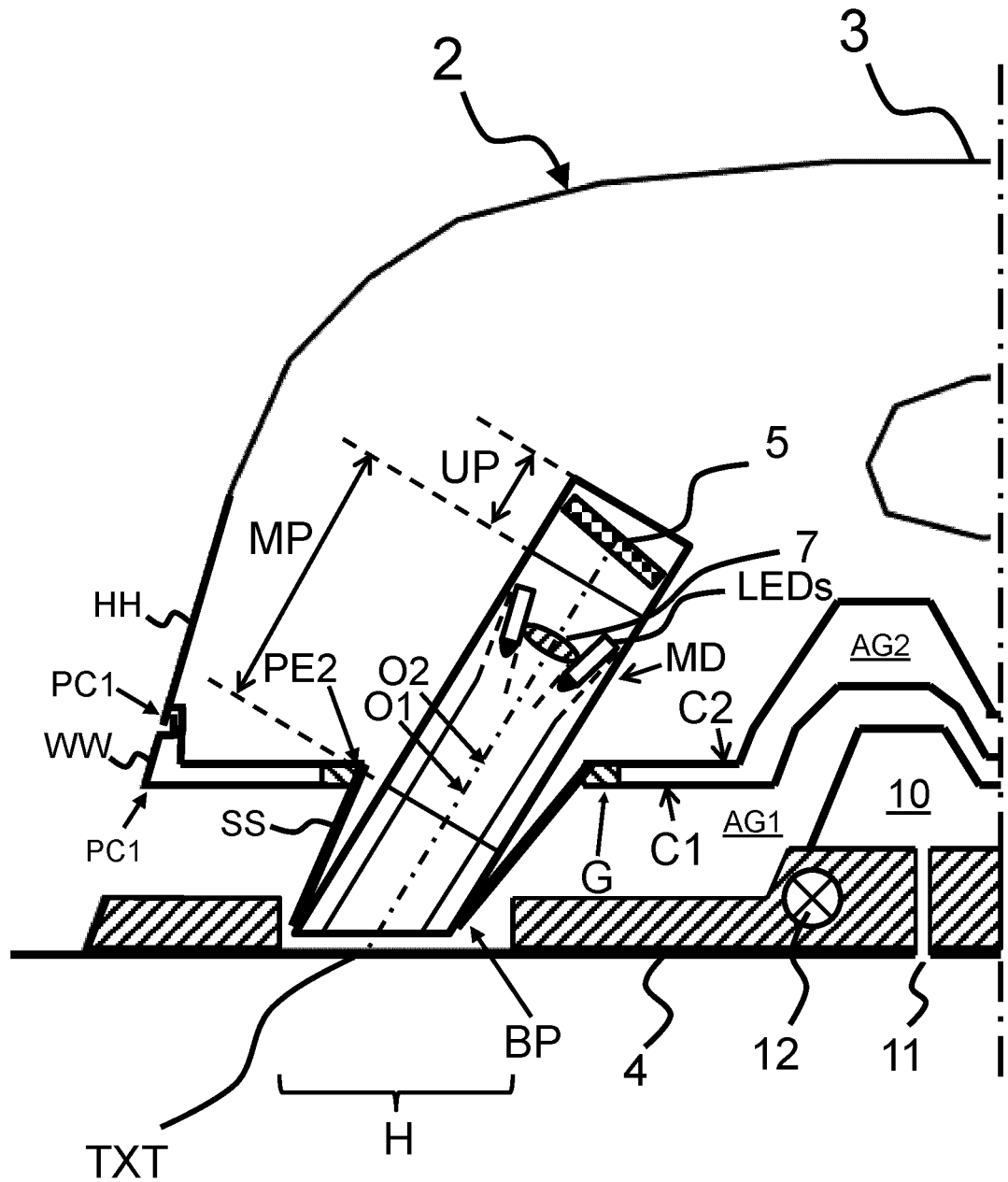
FIG. 18 depicts an eleventh implementation of a device according to the invention.

FIG. 18 depicts an eleventh implementation of a device according to the invention. This implementation is based on the implementation of FIG. 17B, but features that will be described in the following could similarly be used in any of the implementations described along with FIGS. 11 to 17A. The middle portion MP and an upper portion UP of the module MD both extend above the first plastic cover C1.

The thermal insulation means further comprise a wall WW of the first plastic cover C1. The wall WW extends upwards along a periphery PC1 of the first plastic cover C1. The portable textile treatment device further comprises a housing HH for enclosing the middle portion MP and the upper portion UP. The housing is preferably made of plastic material. The housing HH is assembled onto the wall WW, for example via an overlapping assembly.

In case steam is generated by the device, the wall WW prevents (residual) steam from entering inside the housing HH at the interface between the first plastic cover C1 and the housing HH. This thus prevents that the middle portion MP and the upper portion UP of the module MD get heated by steam.

Preferably, the housing HH and the second plastic cover C2 are moulded together as one part.

In any of the portable textile treatment device described along with FIG. 11 to 18, the portable textile treatment device preferably comprises mounting means for mounting the module MD in such a way that the module MD is not in direct (thermal) contact with the heatable soleplate 4.

Figure 19:
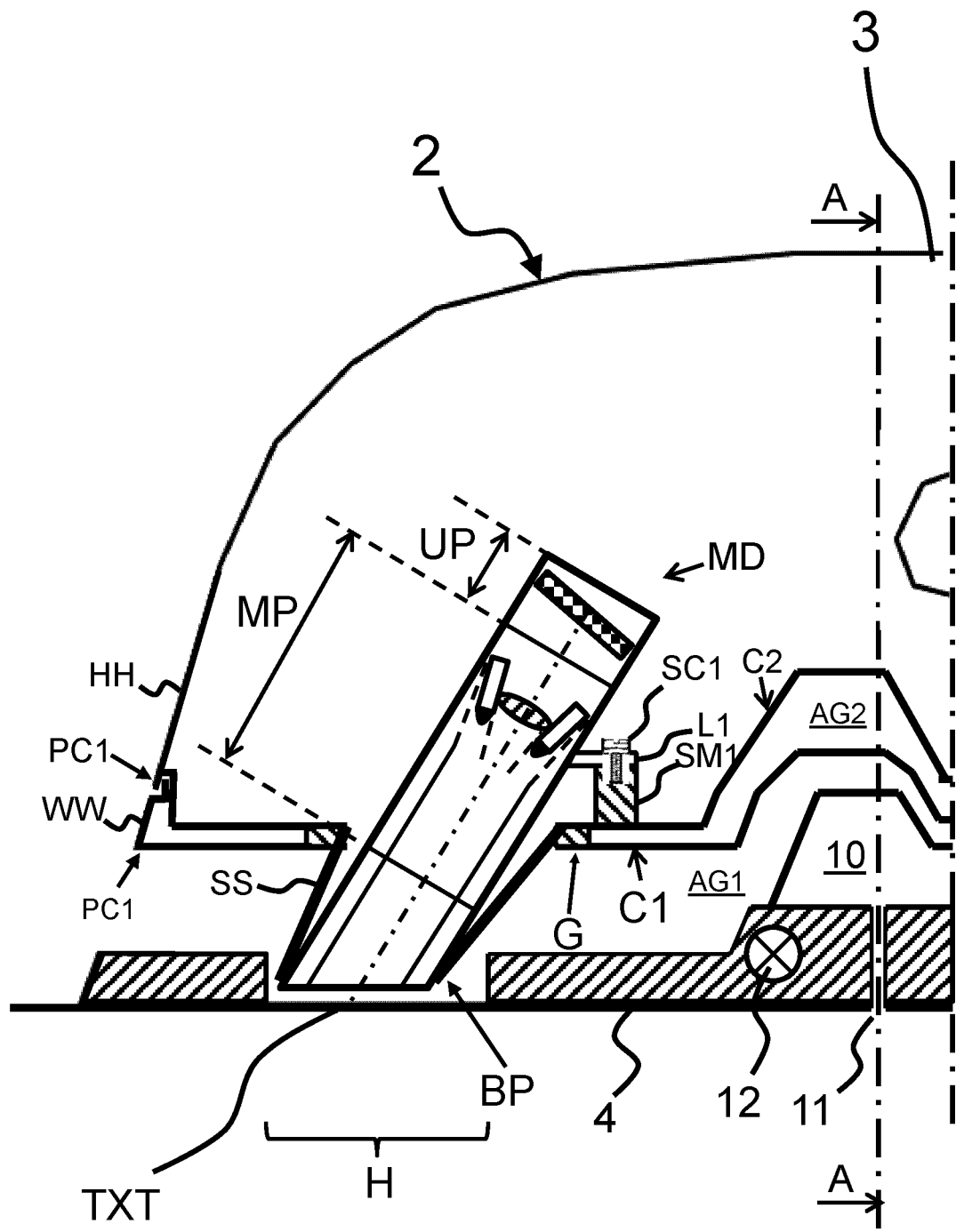
FIG. 19 depicts a twelfth implementation of a device according to the invention.

FIG. 19 depicts a twelfth implementation of a device according to the invention comprising such a mounting means. FIG. 19 is based on FIG. 18, and further illustrates those mounting means.

For example, the mounting means comprise a leg element L1 protruding from the side(s) of the module MD (for example protruding from the middle portion MP), as well as a supporting member SM1 protruding from the second cover C2 (or protruding from the housing HH). The leg element L1 is intended to be supported by (or attached to) the supporting member SM1. For example, the leg element L1 is attached to the supporting member SM1 via screw(s) SC1.

Thanks to those mounting means, the module MD is like "suspended" above the heatable soleplate 4, resulting in that the module MD does not have any direct contact with the heatable soleplate 4. Moreover, the module MD is only supported by the supporting member(s) SM1 which is at a relatively lower temperature compared to the temperature of the heatable soleplate 4, resulting in that the absorption of heat per conduction by the module MD is limited.

Overall, those mounting means allows the module MD to keep a relatively lower temperature (for example 70 degree Celcius) compared to a relatively higher temperature of the heatable soleplate (for example more than 200 degree Celcius).

Figure 20:
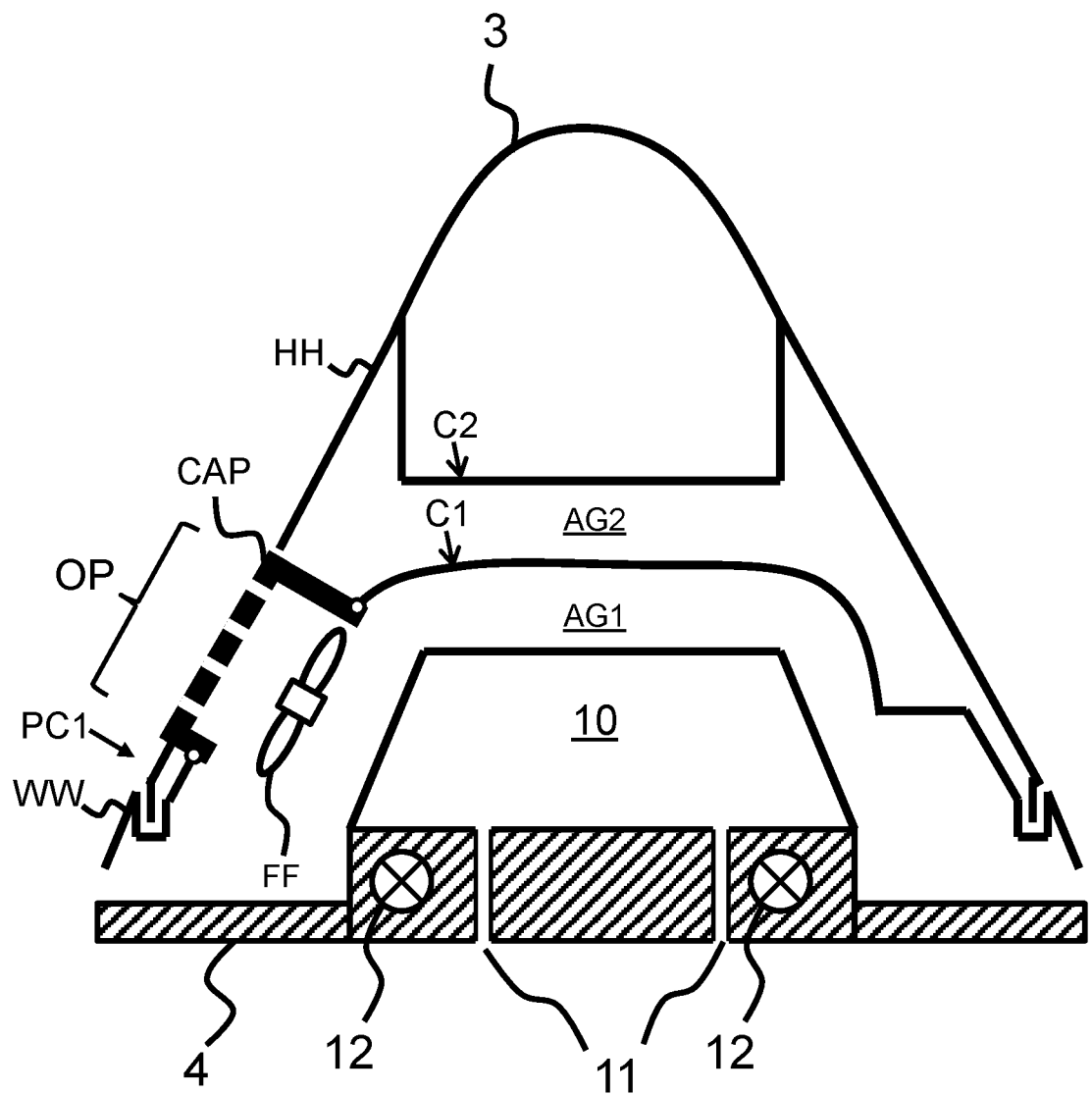
FIG. 20 depicts a thirteenth implementation of a device according to the invention.

FIG. 20 depicts a thirteenth implementation of a device according to the invention, FIG. 20 corresponds to a cross-sectional view according to axis AA of a device according to a device as depicted in FIG. 19.

In this embodiment, the portable textile treatment device further comprises an opening OP for ventilating air in the first air gap AG1 outside the portable textile treatment device.

Since the air inside the first air gap AG1 may be at a relatively high temperature, ventilating air of the first air gap AG1 outside the portable textile treatment device prevents that the module MD gets in turn over-heated.

For example, the opening OP is circular, or forms an elongated slot.

For example, the opening OP comprises a plurality of openings (as illustrated), such as a plurality of circular openings or a plurality of slots.

For example, the opening OP are arranged in a detachable cap CAP that is clipped on the housing HH, during manufacturing of the device.

Some gaskets (illustrated by two small circles) may also be arranged at the periphery of the cap to prevent air/steam entering the second air gap AG2.

Alternatively, the opening OP are arranged directly in the housing HH.

For example, the opening OP on a given side of the housing HH is spread over an area of at least 160 mm2.

For example, the plurality of openings comprise two openings, and each of those openings has an area of at least 80 mm2.

It is noted that in the same way that some opening OP are arranged facing the first air gap AG1, some opening OP could also be arranged (not shown) facing the second air gap AG2 for ventilating air of the second air gap AG2 outside the portable textile treatment device in order to further prevent that the module MD gets in turn over-heated.

Preferably, the portable textile treatment device further comprises a fan FF to extract air from the first air gap AG1. Using a fan allows to create a forced air circulation, so a better efficiency in terms of air circulation and temperature cooling of the first air gap AG1. Similarly, a fan FF could also be arranged to extract air from the second air gap AG2 (not shown). With a fan, the area over which the opening OP can be spread can be further reduced to a value below 160 mm2.

It is noted that FIG. 20 depicts opening OP arranged only on the left side, but opening OP could in a similar way be arranged on the right side (not shown) in order to improve the air circulation of the first air gap AG1 (and/or second air gap AG2).

Figure 21:
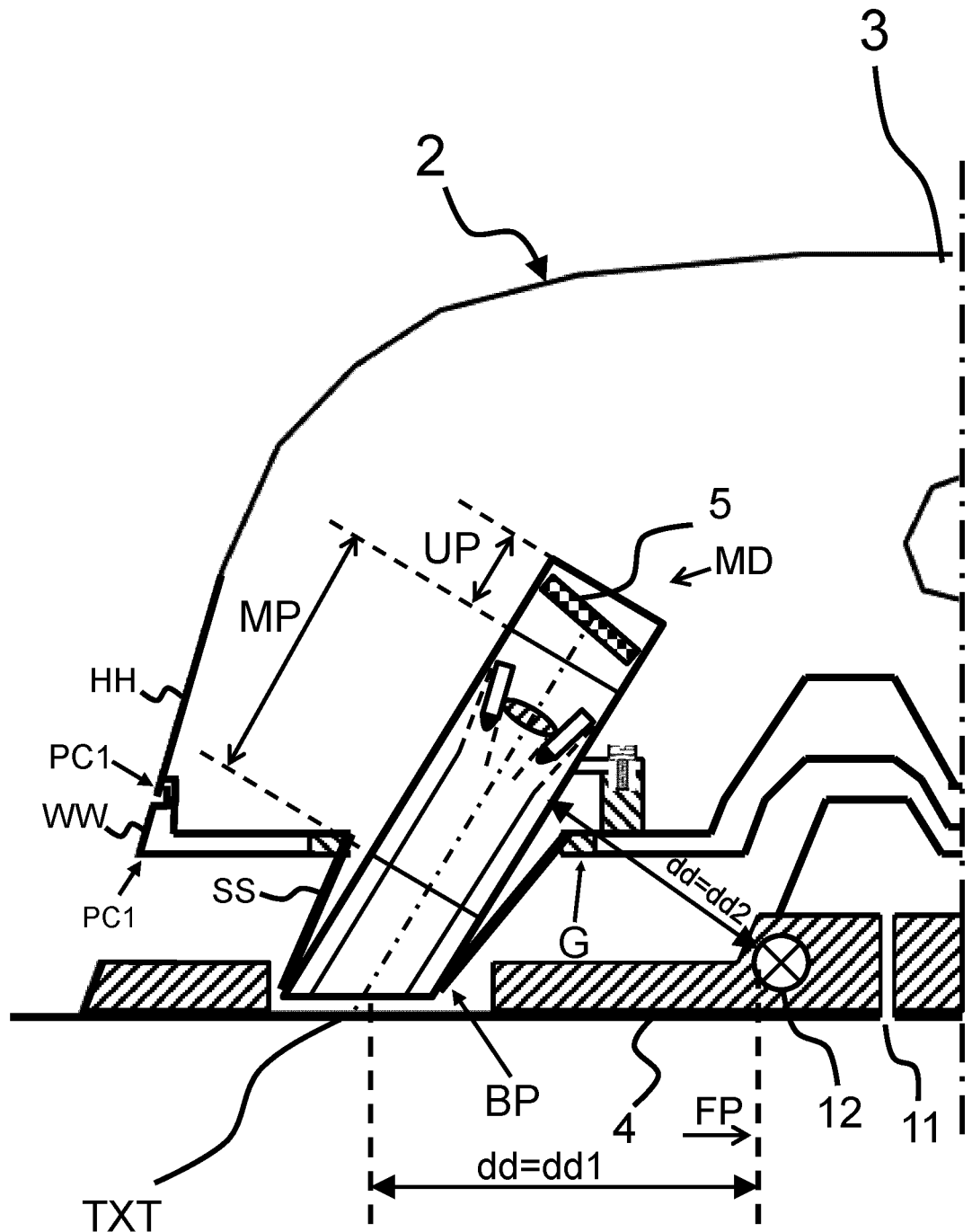
FIG. 21 depicts another view of the device depicted in FIG. 19.

In the following, some description will be provided related to the distance between the heating element 12 and the module MD. FIG. 21 is chosen as a basis to illustrate those aspects, but embodiments described along with anyone of FIGS. 11 to 20 could also be used similarly.

FIG. 21 depicts another view of the device depicted in FIG. 19. The heating element 12 extends in the heatable soleplate 4 up to a front position FP of the heatable soleplate 4. For example, the heating element 12 is U-shaped, and the front position FP corresponds to the bending of the U-shape.

The module MD is arranged in front of the front position FP at a distance dd from the front position FP being equal or greater than 20 mm.

This minimal value of dd guaranties that heat dissipated by the heatable soleplate 4 does not too easily reach the module MD, which could result in an over-heating of the module MD.

For example, the distance dd=dd1 is taken horizontally between the front position FP and the central bottom point of the module MD.

For example, the distance dd=dd2 is taken tangentially between the front position FP and the wall of the module MD.

The shortest distance of either dd1 or dd2 should be equal or greater than 20 mm.

Figure 22:
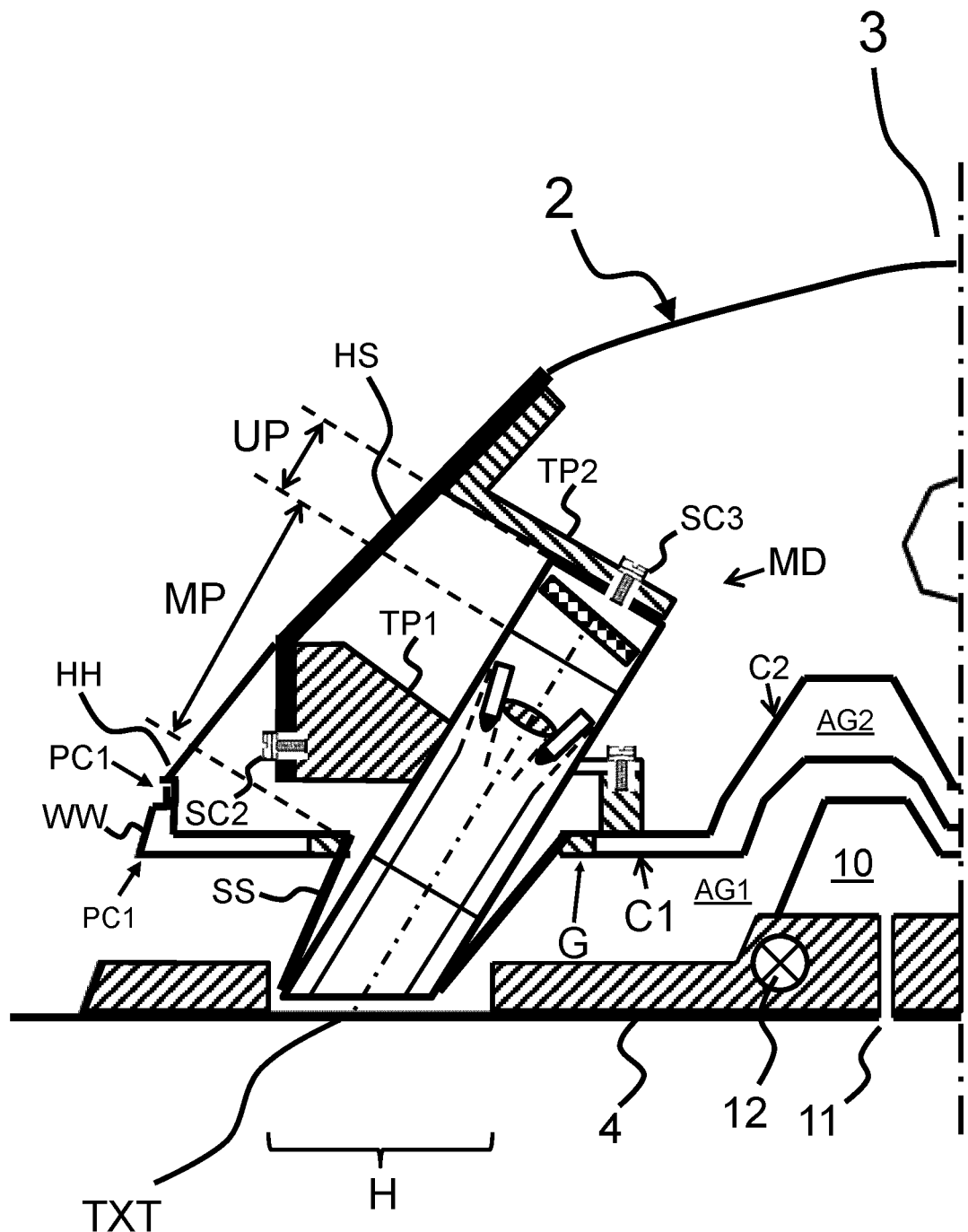
FIG. 22 depicts a fourteenth implementation of a device according to the invention.

For example, the distance dd is in the range [20; 60] mm.
For example, dd1 equals 46 mm, and dd2 equals 26 mm.
FIG. 22 depicts a fourteenth implementation of a device according to the invention. This implementation is based on the implementation of FIG. 21, but features that will be described in the following could similarly be used in any of the implementations described along with FIGS. 11 to 20.

The portable textile treatment device comprises a heat sink HS in thermal exchange with the module MD, for dissipating outside the portable textile treatment device, heat accumulated in the module MD.

Preferably, the middle portion MP is in thermal exchange with the heat sink HS via a first thermal path TP1.

Preferably, the upper portion UP, into which the image sensor 5 (or 5b) is arranged, is in thermal exchange with the heat sink HS via a second thermal path TP2. The second thermal path TP2 is separate from the first thermal path TP1.

The first thermal path TP1 is used to dissipate thermal energy from the module MD before this thermal energy reaches the upper portion UP.

Preferably, the first thermal path TP1 is made of metal alloy.

Preferably, the first thermal path TP1 is molded together with the middle portion MP.

Preferably, the first thermal path TP1 is attached to the heat sink HS via screw(s) SC2 (preferably with heat conductive paste or pad in between).

Preferably, the contact area between the first thermal path TP1 and the heat sink HS is at least 50 mm2.

The second thermal path TP2 is used to dissipate thermal energy from the module MD which has already reached the upper portion UP.

Preferably, the second thermal path TP2 is made of metal alloy.

Preferably, the second thermal path TP2 is attached to the upper portion UP via screw(s) SC3 (preferably with heat conductive paste or pad in between).

Preferably, the second thermal path TP2 is in thermal exchange with the heat sink HS by being pressed against the heat sink HS when the heat sink HS is assembled on the housing HH (preferably with heat conductive paste or pad in between).

Preferably, the contact area between the upper part UP and the second thermal path TP2 is at least 100 mm2.

Preferably, the contact area between the second thermal path TP2 and the heat sink HS is at least 240 mm2.

Preferably, the heat sink HS is mounted seamless with the housing HH. In other words, the heat sink HS forms at least part of an exterior surface of the device.

Preferably, the heat sink HS comprises some ribs (not shown) facing outside face the device in order to increase the heat dissipation.

Preferably, the heat sink HS is made of metallic material selected from a group such as stainless steel, aluminum alloy, zinc alloy or magnesium alloy.

Preferably, the minimum outer area of heat sink HS is at least 1200 mm2.

Preferably, in the embodiments described along with FIGS. 11 to 22, the module MD comprises a glass layer (not shown) attached at the bottom end of the module, in particular extending over the area defined by the bottom periphery BP. The glass layer is used to shield the image sensor 5 (or 5b) from dust and steam.

Although the invention has been described on the basis of using squared images taken by the image sensor, the invention applies similarly if non-squared images are used, such as rectangular images.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In particular, where the invention has been described based on an ironing device, it can be applied to any textile treatment device, such as a garment steamer. In the claims, the word "comprising" does not exclude other elements or steps, and the indefinite article "a" or "an" does not exclude a plurality. Any reference signs in the claims should not be construed as limiting the scope.

The invention claimed is:

1. A portable textile treatment device comprising:
    a heatable soleplate intended to be in contact with a textile for treating the textile, said heatable soleplate comprising a soleplate opening,
    a module comprising an image sensor for taking an image of the textile to be treated through said soleplate opening, and
    a control unit configured for:
        a) executing an algorithm stored in said portable textile treatment device, using the taken image as an input of said algorithm, to obtain a classification of the textile, wherein said classification is defined as a fabric type of the textile, or a fabric level of delicateness for treating the textile, and
        b) controlling, based on said classification, at least one operating parameter of the portable textile treatment device, wherein:
    the module and the control unit are integrated within the portable textile treatment device,
    the image sensor comprises an active surface sensitive to light which is oriented with respect to the surface of the heatable soleplate, with an absolute value of an orientation angle being in the range from 15 to 70 degrees,
    the portable textile treatment device further comprises thermal insulation means arranged in-between said heatable soleplate and said module for insulating said module from heat dissipated by said heatable soleplate.

2. The portable textile treatment device according to claim 1, wherein said thermal insulation means comprise:
    a first plastic cover extending over said heatable soleplate, said first plastic cover comprising a first opening, said module extending into said first opening,
    a first gasket arranged between said module and a first periphery of said first opening.

3. The portable textile treatment device according to claim 2, wherein said thermal insulation means further comprise:
    a first air gap is arranged between said heatable soleplate and said first plastic cover.

4. The portable textile treatment device according to claim 3, further comprising an opening for ventilating air in said first air gap outside the portable textile treatment device.

5. The portable textile treatment device according to claim 2, wherein said thermal insulation means further comprise:
    a second plastic cover extending over said first plastic cover, said second plastic cover comprising a second opening, said module extending into said second opening.

6. The portable textile treatment device according to claim 5, wherein said thermal insulation means further comprise:
    a second gasket arranged between said module and a second periphery of said second opening.

7. The portable textile treatment device according to claim 5, wherein said thermal insulation means further comprise:
    a second air gap being arranged between said first plastic cover and said second plastic cover.

8. The portable textile treatment device according to claim 2, wherein said module comprises a lower portion extending between said soleplate opening and said first opening, said thermal insulation means further comprising a sheath arranged around said lower portion, for creating an air layer between said lower portion and said sheath.

9. The portable textile treatment device according to claim 8, wherein said lower portion further extends between said first opening and said second opening, said sheath further extending around said lower portion between said first opening and said second opening.

10. The portable textile treatment device according to claim 1, wherein said thermal insulation means further comprise:
- a first plastic cover extending over said heatable soleplate, said first plastic cover comprising a first opening, said module extending into said first opening,
- a second plastic cover extending over said first plastic cover, said second plastic cover comprising a second opening, said module extending into said second opening,
- a gasket arranged around said module, said gasket being sandwiched between said first plastic cover and said second plastic cover,
- a sheath arranged around a lower portion of said module, said lower portion extending between said soleplate opening and said first opening, for creating an air layer between said lower portion and said sheath.

11. The portable textile treatment device according to claim 2:
- wherein said module comprises a middle portion and an upper portion both extending above said first plastic cover,
- wherein said thermal insulation means further comprise a wall of said first plastic cover extending upwards along a periphery of said first plastic cover, further comprising a housing for enclosing said middle portion and said upper portion, said housing being assembled onto said wall.

12. The portable textile treatment device according to claim 1, comprising mounting means for mounting said module in such a way that said module is not in direct contact with said heatable soleplate.

13. The portable textile treatment device according to claim 1, further comprising a heating element extending in said heatable soleplate up to a front position of said heatable soleplate, said module being arranged in front of said front position at a distance from said front position being equal or greater than 20 mm.

14. The portable textile treatment device according to claim 1, comprising a heat sink in thermal exchange with said module, for dissipating outside the portable textile treatment device, heat accumulated in said module.

15. The portable textile treatment device according to claim 14, wherein:
- said middle portion is in thermal exchange with said heat sink via a first thermal path, and
- said upper portion, into which said image sensor is arranged, is in thermal exchange with said heat sink via a second thermal path, said second thermal path being separate from said first thermal path.

* * * * *